United States Patent
Goodman et al.

(10) Patent No.: US 7,809,004 B2
(45) Date of Patent: Oct. 5, 2010

(54) DATA PROCESSING SYSTEM AND PROCESSING UNIT HAVING AN ADDRESS-BASED LAUNCH GOVERNOR

(75) Inventors: Benjiman L. Goodman, Cedar Park, TX (US); Praveen S. Reddy, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 12/102,133

(22) Filed: Apr. 14, 2008

(65) Prior Publication Data

US 2008/0192761 A1    Aug. 14, 2008

Related U.S. Application Data

(63) Continuation of application No. 11/054,910, filed on Feb. 10, 2005, now Pat. No. 7,415,030.

(51) Int. Cl.
*H04L 12/28*    (2006.01)

(52) U.S. Cl. .......................... 370/401; 370/392

(58) Field of Classification Search ................ None
See application file for complete search history.

(56) References Cited

U.S. PATENT DOCUMENTS

| | | | |
|---|---|---|---|
| 5,717,691 A * | 2/1998 | Dighe et al. ............... 370/401 |
| 6,606,676 B1 | 8/2003 | Deshpande et al. | |
| 6,687,247 B1 * | 2/2004 | Wilford et al. ............... 370/392 |
| 7,096,323 B1 | 8/2006 | Conway et al. | |
| 7,162,590 B2 | 1/2007 | Pruvost et al. | |
| 7,389,388 B2 | 6/2008 | Cantin et al. | |
| 7,415,030 B2 | 8/2008 | Goodman et al. | |
| 2002/0078252 A1 * | 6/2002 | Fields et al. ................ 709/314 |
| 2003/0009637 A1 | 1/2003 | Arimilli et al. | |
| 2003/0154350 A1 | 8/2003 | Edirisooriya et al. | |
| 2006/0224833 A1 | 10/2006 | Guthrie et al. | |

OTHER PUBLICATIONS

Patterson and Hennessey; 'Computer Architecture—A Quantitative Approach'; 1996; Morgan Kaufmann Publishers; 2nd edition; p. 75.
Gu, Shawn; Notice of Allowance—U.S. Appl. No. 12/103,564; dated Feb. 17, 2010; 4 pp.

* cited by examiner

*Primary Examiner*—Phirin Sam
(74) *Attorney, Agent, or Firm*—Dillon & Yudell LLP

(57) ABSTRACT

A data processing system includes an interconnect fabric, a protected resource having a plurality of banks each associated with a respective one of a plurality of address sets, a snooper that controls access to the resource, one or more masters that initiate requests, and interconnect logic coupled to the one or more masters and to the interconnect fabric. The interconnect logic regulates a rate of delivery to the snooper via the interconnect fabric of requests that target any one the plurality of banks of the protected resource.

8 Claims, 37 Drawing Sheets

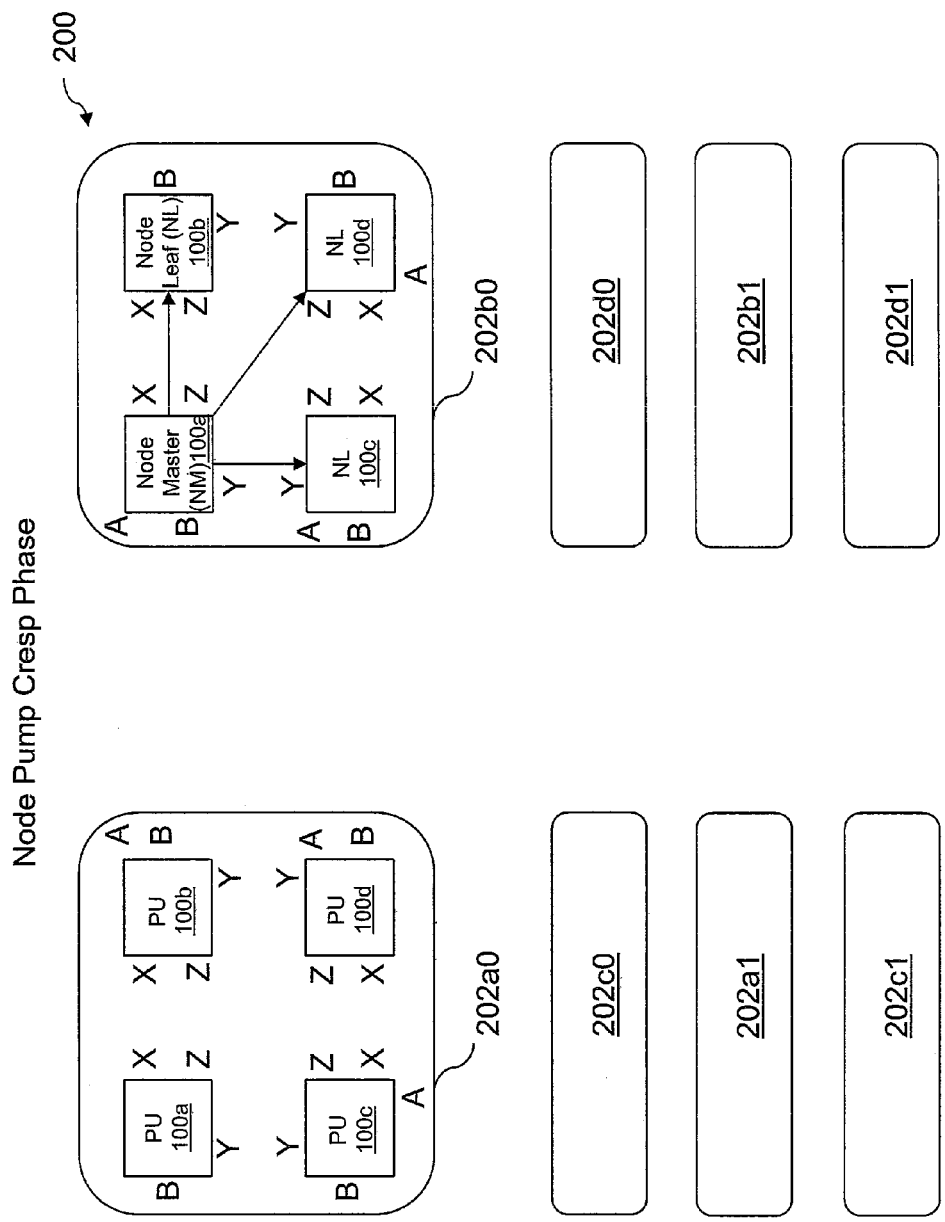

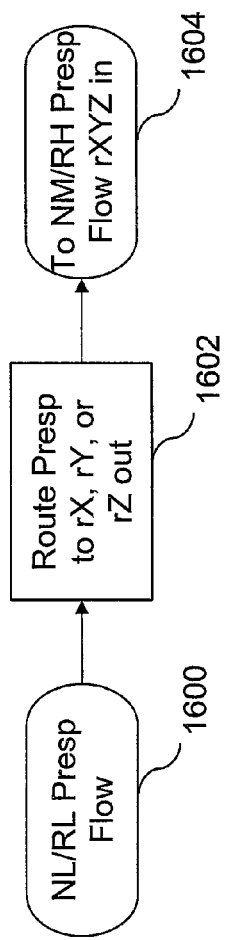
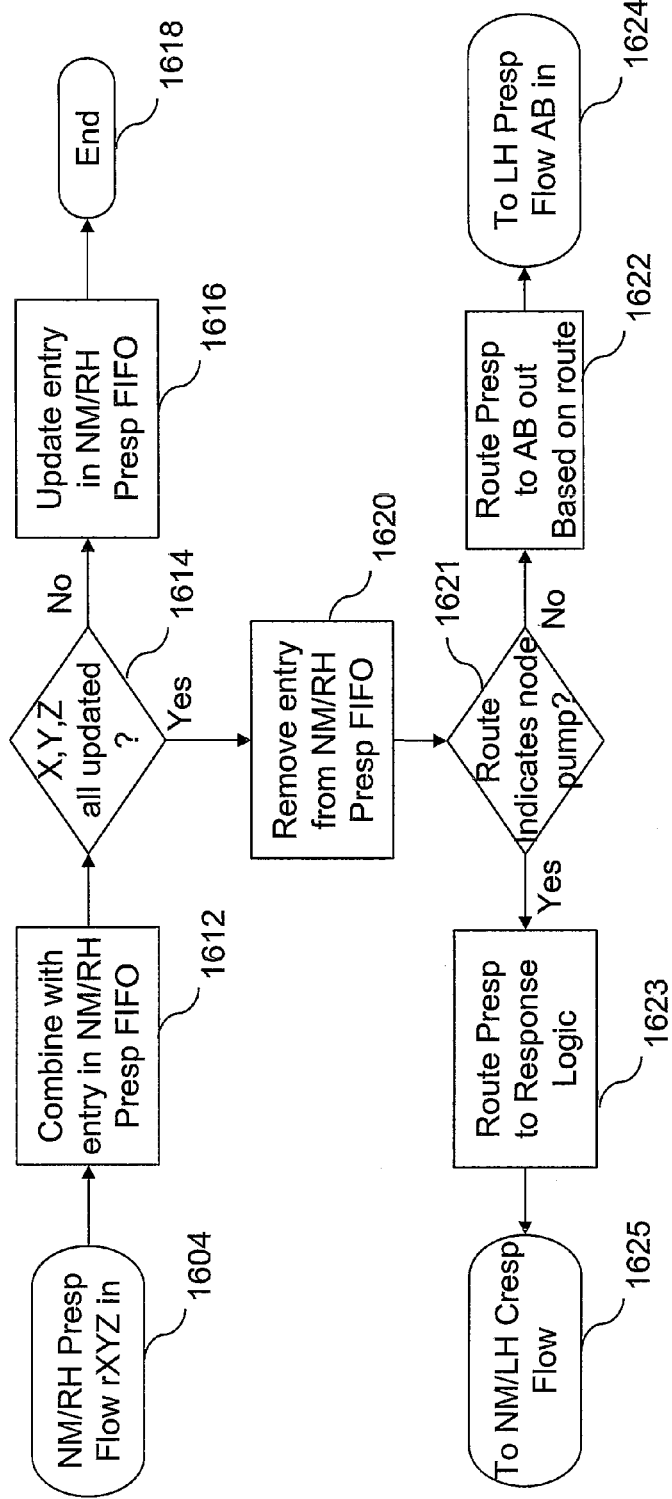
FIGURE 16A
FIGURE 16B

DATA PROCESSING SYSTEM AND PROCESSING UNIT HAVING AN ADDRESS-BASED LAUNCH GOVERNOR

CROSS-REFERENCE TO RELATED APPLICATION(S)

The present application is a continuation of U.S. patent application Ser. No. 11/054,910, filed on Feb. 10, 2005 now U.S. Pat. No. 7,415,030, entitled "Data Processing System, Method and Interconnect Fabric Having an Address-Based Launch Governor" which is also related to the following U.S. Patent Application(s), which are assigned to the assignee hereof and incorporated herein by reference in their entireties:

U.S. patent application Ser. No. 11/055,305, now U.S. Pat. No. 7,237,070; and

U.S. patent application Ser. No. 11/054,841.

BACKGROUND OF THE INVENTION

1. Technical Field

The present invention relates in general to data processing systems and, in particular, to an improved interconnect fabric for data processing systems.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

SUMMARY OF THE INVENTION

As the clock frequencies at which processing units are capable of operating have risen and system scales have increased, the latency of communication between processing units via the system interconnect has become a critical performance concern. To address this performance concern, various interconnect designs have been proposed and/or implemented that are intended to improve performance and scalability over conventional bused interconnects.

The present invention provides an improved data processing system, interconnect fabric and method of communication in a data processing system. In one embodiment, A data processing system includes a first processing node and a second processing node coupled by an interconnect fabric. The first processing node includes a plurality of first processing units coupled to each other for communication, and the second processing node includes a plurality of second processing units coupled to each other for communication. A first processing unit in the first processing node includes interconnect logic that processes a plurality of concurrently pending broadcast operations of differing broadcast scope. At least a first of the plurality of concurrently pending broadcast operations has a first scope limited to the first processing node, and at least a second of the plurality of concurrently pending broadcast operations has a second scope including the first processing node and the second processing node.

In another embodiment, a data processing system includes an interconnect fabric, a protected resource having a plurality of banks each associated with a respective one of a plurality of address sets, a snooper that controls access to the resource, one or more masters that initiate requests, and interconnect logic coupled to the one or more masters and to the interconnect fabric. The interconnect logic regulates a rate of delivery to the snooper via the interconnect fabric of requests that target any one the plurality of banks of the protected resource.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIGS. 5F-5H depict the information flow of the exemplary operation depicted in FIG. 4B;

FIGS. 16A-16C are flowcharts respectively depicting the partial response phase of an operation at a remote leaf, remote hub, local hub, and local master;

DETAILED DESCRIPTION OF ILLUSTRATIVE EMBODIMENT

I. Processing Unit and Data Processing System

Figure 1:
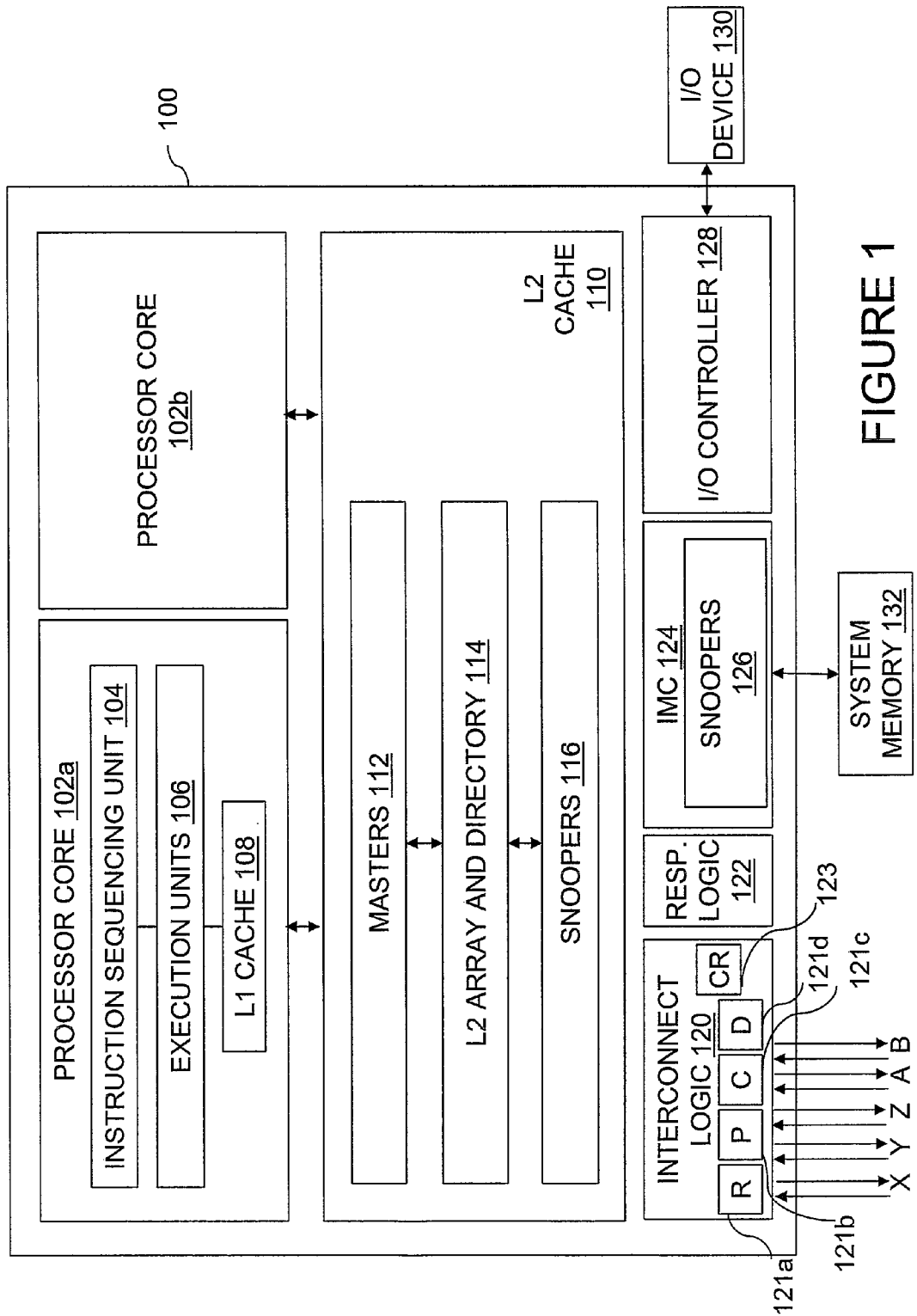
FIG. 1 is a high level block diagram of a processing unit in accordance with the present invention.

With reference now to the figures and, in particular, with reference to FIG. 1, there is illustrated a high level block diagram of an exemplary embodiment of a processing unit 100 in accordance with the present invention. In the depicted embodiment, processing unit 100 is a single integrated circuit including two processor cores 102a, 102b for independently processing instructions and data. Each processor core 102 includes at least an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block.

The operation of each processor core 102a, 102b is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102a, 102b and operations snooped on an interconnect fabric (described below) by snoopers 126.

In the illustrative embodiment, the cache memory hierarchy of processing unit 100 includes a store-through level one (L1) cache 108 within each processor core 102a, 102b and a level two (L2) cache 110 shared by all processor cores 102a, 102b of the processing unit 100. L2 cache 110 includes an L2 array and directory 114, masters 112 and snoopers 116. Masters 112 initiate transactions on the interconnect fabric and access L2 array and directory 114 in response to memory access (and other) requests received from the associated processor cores 102a, 102b. Snoopers 116 detect operations on the interconnect fabric, provide appropriate responses, and perform any accesses to L2 array and directory 114 required by the operations. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

As further shown in FIG. 1, processing unit 100 includes integrated interconnect logic 120 by which processing unit 100 may be coupled to the interconnect fabric as part of a larger data processing system. In the depicted embodiment, interconnect logic 120 supports an arbitrary number t1 of "first tier" interconnect links, which in this case include in-bound and out-bound X, Y and Z links. Interconnect logic 120 further supports an arbitrary number t2 of second tier links, designated in FIG. 1 as in-bound and out-bound A and B links. With these first and second tier links, each processing unit 100 may be coupled for bi-directional communication to up to t1/2+t2/2 (in this case, five) other processing units 100. Interconnect logic 120 includes request logic 121a, partial response logic 121b, combined response logic 121c and data logic 121d for processing and forwarding information during different phases of operations. In addition, interconnect logic 120 includes a configuration register 123 including a plurality of mode bits utilized to configure processing unit 100. As further described below, these mode bits preferably include: (1) a first set of one or more mode bits that selects a desired link information allocation for the first and second tier links; (2) a second set of mode bits that specify which of the first and second tier links of the processing unit 100 are connected to other processing units 100; (3) a third set of mode bits that determines a programmable duration of a protection window extension; and (4) a fourth set of mode bits that predictively selects a scope of broadcast for operations initiated by the processing unit 100 on an operation-by-operation basis from among a node-only broadcast scope or a system-wide scope, as described in above-referenced U.S. patent application Ser. No. 11/055,305.

Each processing unit 100 further includes an instance of response logic 122, which implements a portion of a distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 may issue operations and receive data on the X, Y, Z, A and B links in response to requests by I/O device 130.

Figure 2:
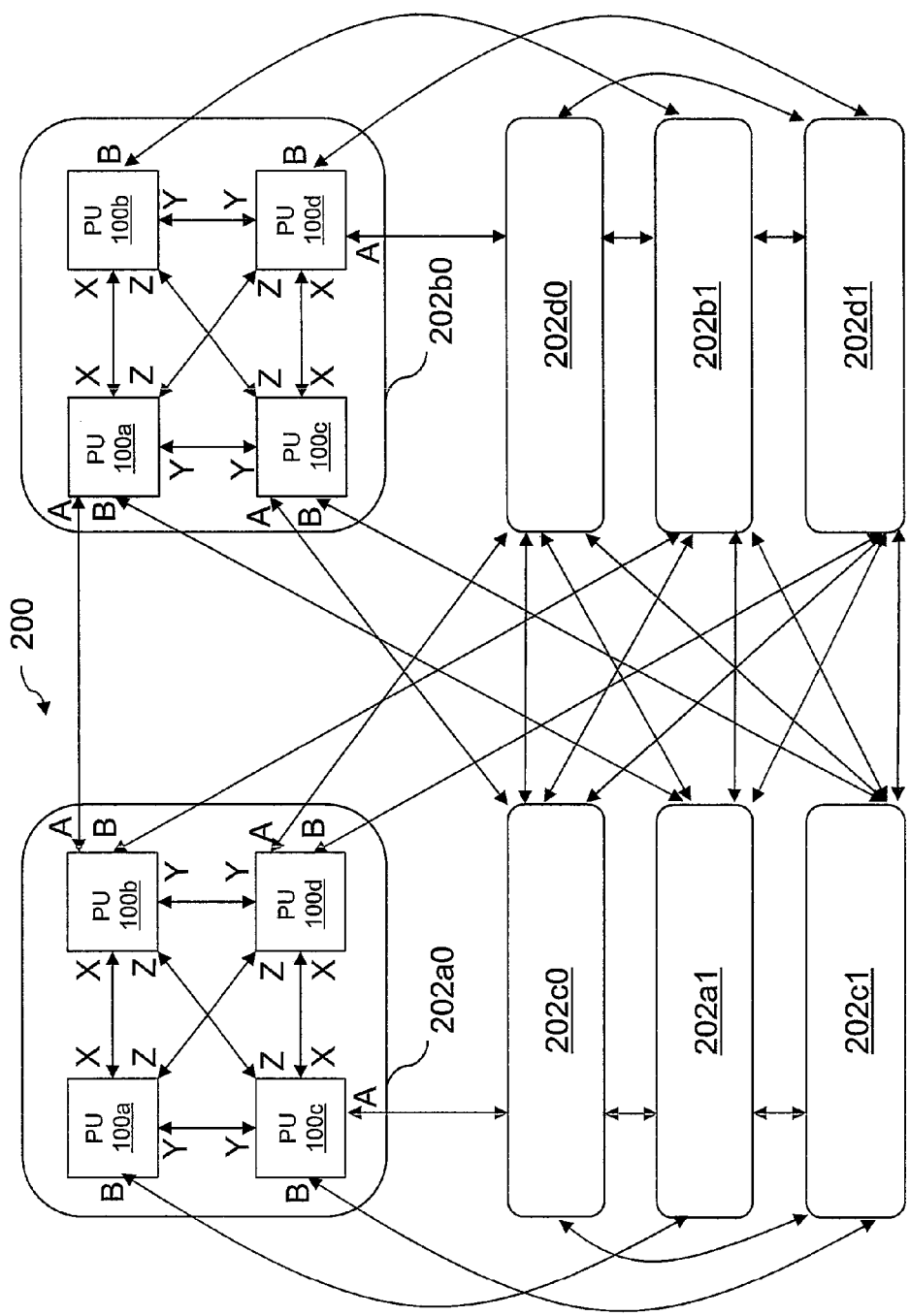
FIG. 2 is a high level block diagram of an exemplary data processing system in accordance with the present invention.

Referring now to FIG. 2, there is depicted a block diagram of an exemplary embodiment of a data processing system 200 formed of multiple processing units 100 in accordance with the present invention. As shown, data processing system 200 includes eight processing nodes 202a0-202d0 and 202a1-202d1, which in the depicted embodiment, are each realized as a multi-chip module (MCM) comprising a package containing four processing units 100. The processing units 100 within each processing node 202 are coupled for point-to-point communication by the processing units' X, Y, and Z links, as shown. Each processing unit 100 may be further coupled to processing units 100 in two different processing nodes 202 for point-to-point communication by the processing units' A and B links. Although illustrated in FIG. 2 with a double-headed arrow, it should be understood that each pair of X, Y, Z, A and B links are preferably (but not necessarily) implemented as two uni-directional links, rather than as a bi-directional link.

General expressions for forming the topology shown in FIG. 2 can be given as follows:

```
Node[ I ][ K ].chip[ J ].link[ K ] connects to
Node[ J ][ K ].chip[ I ].link[ K ], for all I ≠ J; and
Node[ I ][ K ].chip[ I ].link[ K ] connects to
Node[ I ][ not K ].chip[ I ].link[ not K ]; and
Node[ I ][ K ].chip[ I ].link[ not K ] connects either to:
    (1) Nothing in reserved for future expansion; or
    (2) Node[ extra ][ not K ].chip[ I ].link[ K ], in case in which
    all links are fully utilized (i.e., nine 8-way nodes forming a 72-way
    system); and where I and J belong to the set {a, b, c, d} and K
    belongs to the set {A, B}.
```

Of course, alternative expressions can be defined to form other functionally equivalent topologies. Moreover, it should be appreciated that the depicted topology is representative but not exhaustive of data processing system topologies embodying the present invention and that other topologies are possible. In such alternative topologies, for example, the number of first tier and second tier links coupled to each processing unit 100 can be an arbitrary number, and the number of processing nodes 202 within each tier (i.e., I) need not equal the number of processing units 100 per processing node 100 (i.e., J).

Even though fully connected in the manner shown in FIG. 2, all processing nodes 202 need not communicate each operation to all other processing nodes 202. In particular, as noted above, processing units 100 may broadcast operations with a scope limited to their processing node 202 or with a larger scope, such as a system-wide scope including all processing nodes 202.

Figure 19:
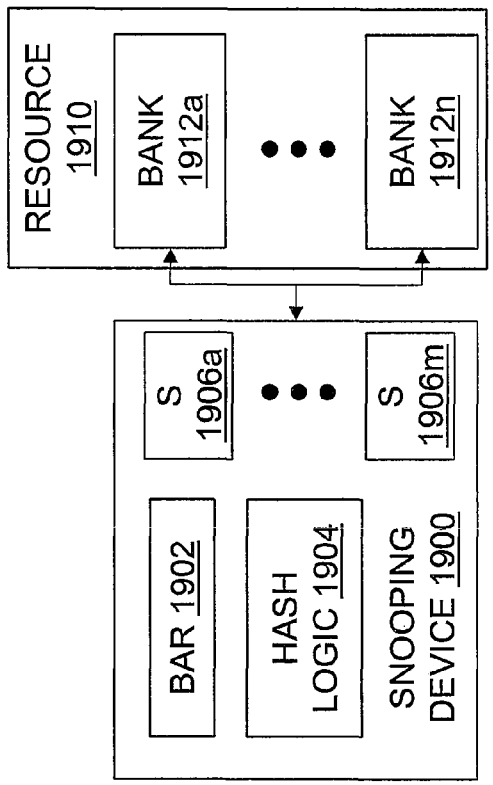
FIG. 19 is a more detailed block diagram of an exemplary snooping component of the data processing system of FIG. 2.

As shown in FIG. 19, an exemplary snooping device 1900 within data processing system 200, for example, an snoopers 116 of L2 (or lower level) cache or snoopers 126 of an IMC 124, may include one or more base address registers (BARs) 1902 identifying one or more regions of the real address space containing real addresses for which the snooping device 1900 is responsible. Snooping device 1900 may optionally further include hash logic 1904 that performs a hash function on real addresses falling within the region(s) of real address space identified by BAR 1902 to further qualify whether or not the snooping device 1900 is responsible for the addresses. Finally, snooping device 1900 includes a number of snoopers 1906a-1906m that access resource 1910 (e.g., L2 cache array and directory 114 or system memory 132) in response to snooped requests specifying request addresses qualified by BAR 1902 and hash logic 1904.

As shown, resource 1910 may have a banked structure including multiple banks 1912a-1912n each associated with a respective set of real addresses. As is known to those skilled in the art, such banked designs are often employed to support a higher arrival rate of requests for resource 1910 by effectively subdividing resource 1910 into multiple independently accessible resources. In this manner, even if the operating frequency of snooping device 1900 and/or resource 1910 are such that snooping device 1900 cannot service requests to access resource 1910 as fast as the maximum arrival rate of such requests, snooping device 1900 can service such requests without retry as long as the number of requests received for any bank 1912 within a given time interval does not exceed the number of requests that can be serviced by that bank 1912 within that time interval.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 2 or discussed further herein.

II. Exemplary Operation

Figure 3:
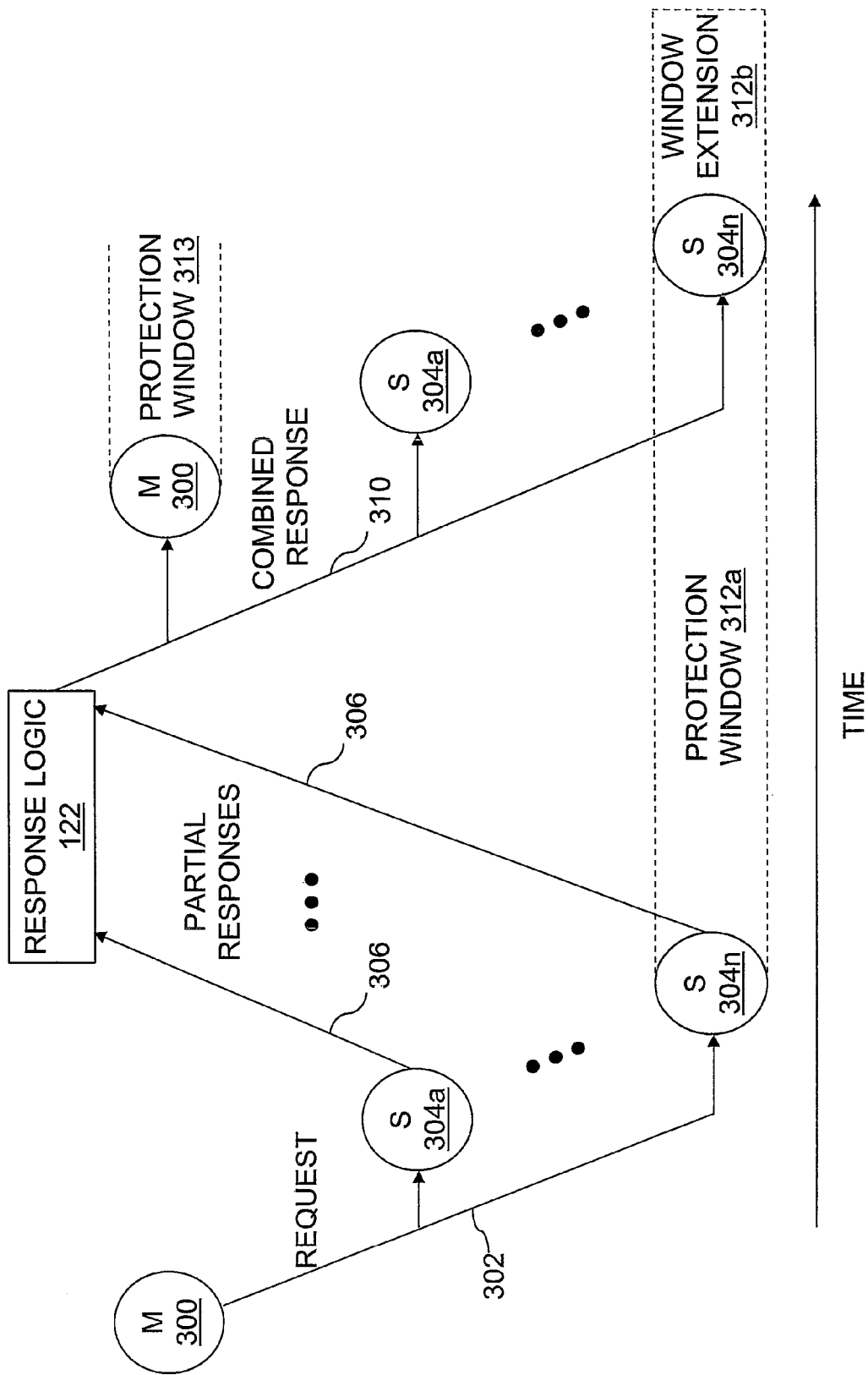
FIG. 3 is a time-space diagram of an exemplary operation including a request phase, a partial response phase and a combined response phase.

Referring now to FIG. 3, there is depicted a time-space diagram of an exemplary operation on the interconnect fabric of data processing system 200 of FIG. 2. The operation begins when a master 300 (e.g., a master 112 of an L2 cache 110 or a master within an I/O controller 128) issues a request 302 on the interconnect fabric. Request 302 preferably includes at least a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Further details regarding these operations and an exemplary cache coherency protocol that facilitates efficient handling of these operations may be found in the copending U.S. patent application Ser. No. 11/055,305 incorporated by reference above.

Request 302 is received by snoopers 304, for example, snoopers 116 of L2 caches 110 and snoopers 126 of IMCs 124, distributed throughout data processing system 200. In general, with some exceptions, snoopers 116 in the same L2 cache 110 as the master 112 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response 306 representing the response of at least that snooper 304 to request 302. A snooper 126 within an IMC 124 determines the partial response 306 to provide based, for example, upon whether the snooper 126 is responsible for the request address and whether it has resources available to service the request. A snooper 116 of an L2 cache 110 may determine its partial response 306 based on, for example, the availability of its L2 cache directory 114, the availability of a snoop logic instance within snooper 116 to handle the request, and the coherency state associated with the request address in L2 cache directory 114.

The partial responses 306 of snoopers 304 are logically combined either in stages or all at once by one or more instances of response logic 122 to determine a combined response (CR) 310 to request 302. In one preferred embodiment, which will be assumed hereinafter, the instance of response logic 122 responsible for generating combined response 310 is located in the processing unit 100 containing the master 300 that issued request 302. Response logic 122 provides combined response 310 to master 300 and snoopers 304 via the interconnect fabric to indicate the response (e.g., success, failure, retry, etc.) to request 302. If the CR 310 indicates success of request 302, CR 310 may indicate, for example, a data source for a requested memory block, a cache state in which the requested memory block is to be cached by master 300, and whether "cleanup" operations invalidating the requested memory block in one or more L2 caches 110 are required.

In response to receipt of combined response 310, one or more of master 300 and snoopers 304 typically perform one or more operations in order to service request 302. These operations may include supplying data to master 300, invalidating or otherwise updating the coherency state of data cached in one or more L2 caches 110, performing castout operations, writing back data to a system memory 132, etc. If required by request 302, a requested or target memory block may be transmitted to or from master 300 before or after the generation of combined response 310 by response logic 122.

In the following description, the partial response 306 of a snooper 304 to a request 302 and the operations performed by the snooper 304 in response to the request 302 and/or its combined response 310 will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the L2 cache directory 114 of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of ownership of the requested memory block to master 300 during a protection window 312a that extends from the time that snooper 304n determines its partial response 306 until snooper 304n receives combined response 310 and during a subsequent window extension 312b extending a programmable time beyond receipt by snooper 304n of combined response 310. During protection window 312a and window extension 312b, snooper 304n protects the transfer of ownership by providing partial responses 306 to other requests specifying the same request address that prevent other masters from obtaining ownership (e.g., a retry partial response) until ownership has been successfully transferred to master 300. Master 300 likewise initiates a protection window 313 to protect its ownership of the memory block requested in request 302 following receipt of combined response 310.

Because snoopers 304 all have limited resources for handling the CPU and I/O requests described above, several different levels of partial responses and corresponding CRs are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that is the LPC for the memory block, but is unable to currently service the request. Similarly, a snooper 116 in an L2 cache 110 may require an available instance of snoop logic and access to L2 cache directory 114 in order to handle a request. Absence of access to either (or both) of these resources results in a partial response (and corresponding CR) signaling an inability to service the request due to absence of a required resource.

III. Broadcast Flow of Exemplary Operations

Figure 4A:
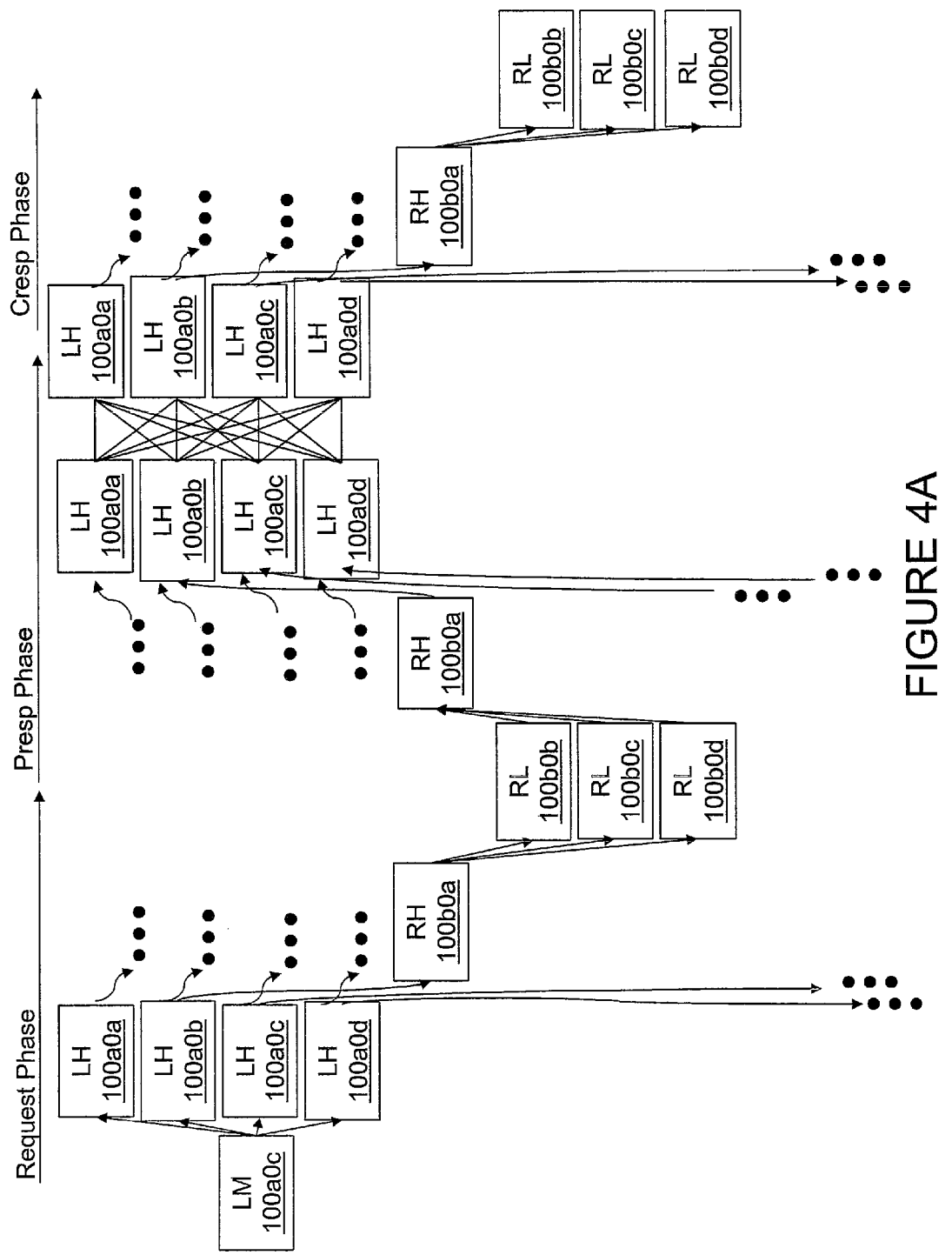
FIG. 4A is a time-space diagram of an exemplary operation of system-wide scope within the data processing system of FIG. 2.

Referring now to FIG. 4A, which will be described in conjunction with FIGS. 5A-5C, there is illustrated a time-space diagram of an exemplary operation flow of an operation of system-wide scope in data processing system 200 of FIG. 2. In these figures, the various processing units 100 within data processing system 200 are tagged with two locational identifiers—a first identifying the processing node 202 to which the processing unit 100 belongs and a second identifying the particular processing unit 100 within the processing node 202. Thus, for example, processing unit 100a0c refers to processing unit 100c of processing node 202a0. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4A, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

Figure 5A:
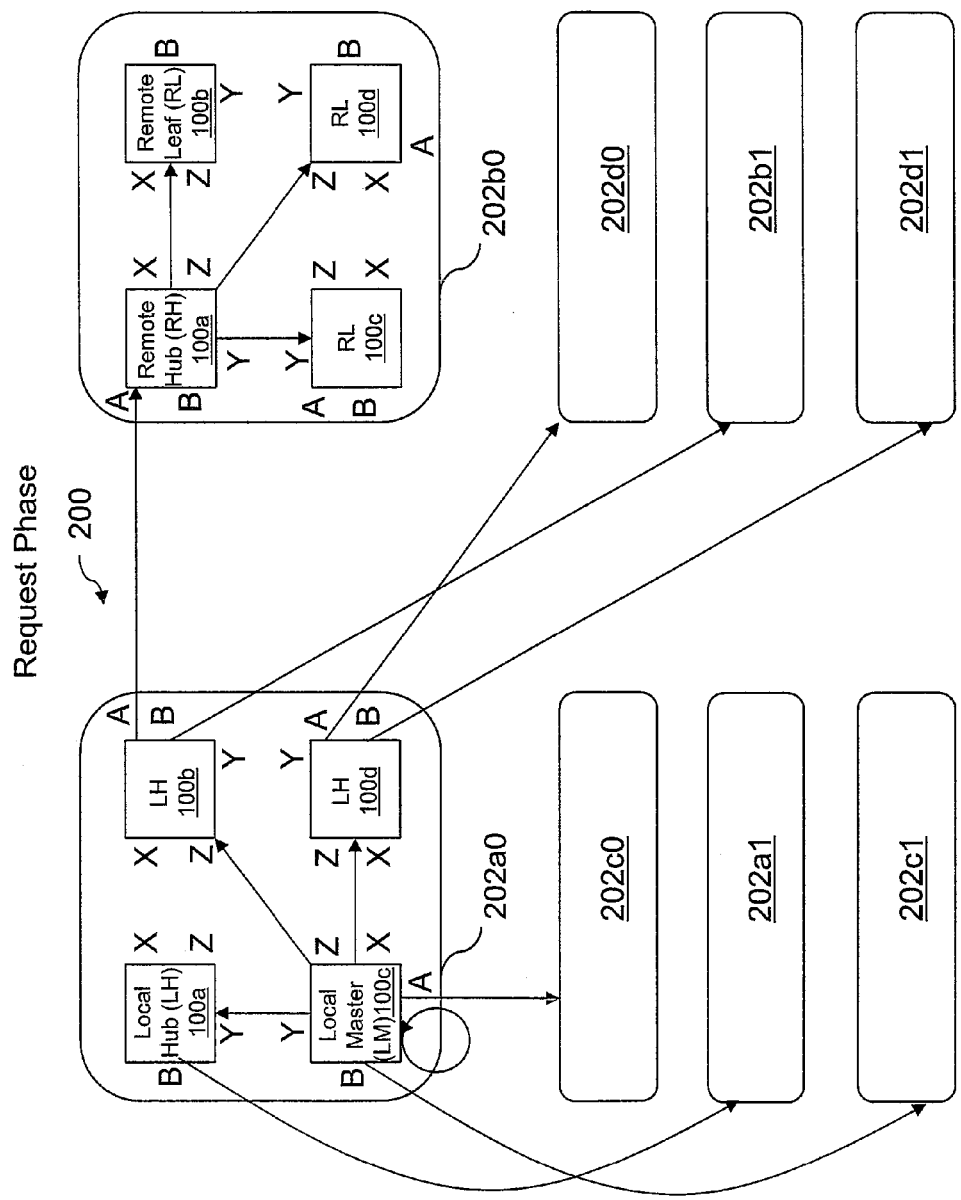
FIGS. 5A-5C depict the information flow of the exemplary operation depicted in FIG. 4A.

Still referring to FIG. 4A and referring additionally to FIG. 5A, the request phase begins when a local master 100a0c (i.e., processing unit 100c of processing node 202a0) performs a synchronized broadcast of a request, for example, a read request, to each of the local hubs 100a0a, 100a0b, 100a0c and 100a0d within its processing node 202a0. It should be noted that the list of local hubs includes local hub 100a0c, which is also the local master. As described further below, this internal transmission is advantageously employed to synchronize the operation of local hub 100a0c with local hubs 100a0a, 100a0b and 100a0d so that the timing constraints discussed below can be more easily satisfied.

In response to receiving the request, each local hub 100 that is coupled to a remote hub 100 by its A or B links transmits the operation to its remote hub(s) 100. Thus, local hub 100a0a makes no transmission of the operation on its outbound A link, but transmits the operation via its outbound B link to a remote hub within processing node 202a1. Local hubs 100a0b, 100a0c and 100a0d transmit the operation via their respective outbound A and B links to remote hubs in processing nodes 202b0 and 202b1, processing nodes 202c0 and 202c1, and processing nodes 202d0 and 202d1, respectively. Each remote hub 100 receiving the operation in turn transmits the operation to each remote leaf 100 in its processing node 202. Thus, for example, local hub 100b0a transmits the operation to remote leaves 100b0b, 100b0c and 100b0d. In this manner, the operation is efficiently broadcast to all processing units 100 within data processing system 200 utilizing transmission over no more than three links.

Figure 5B:
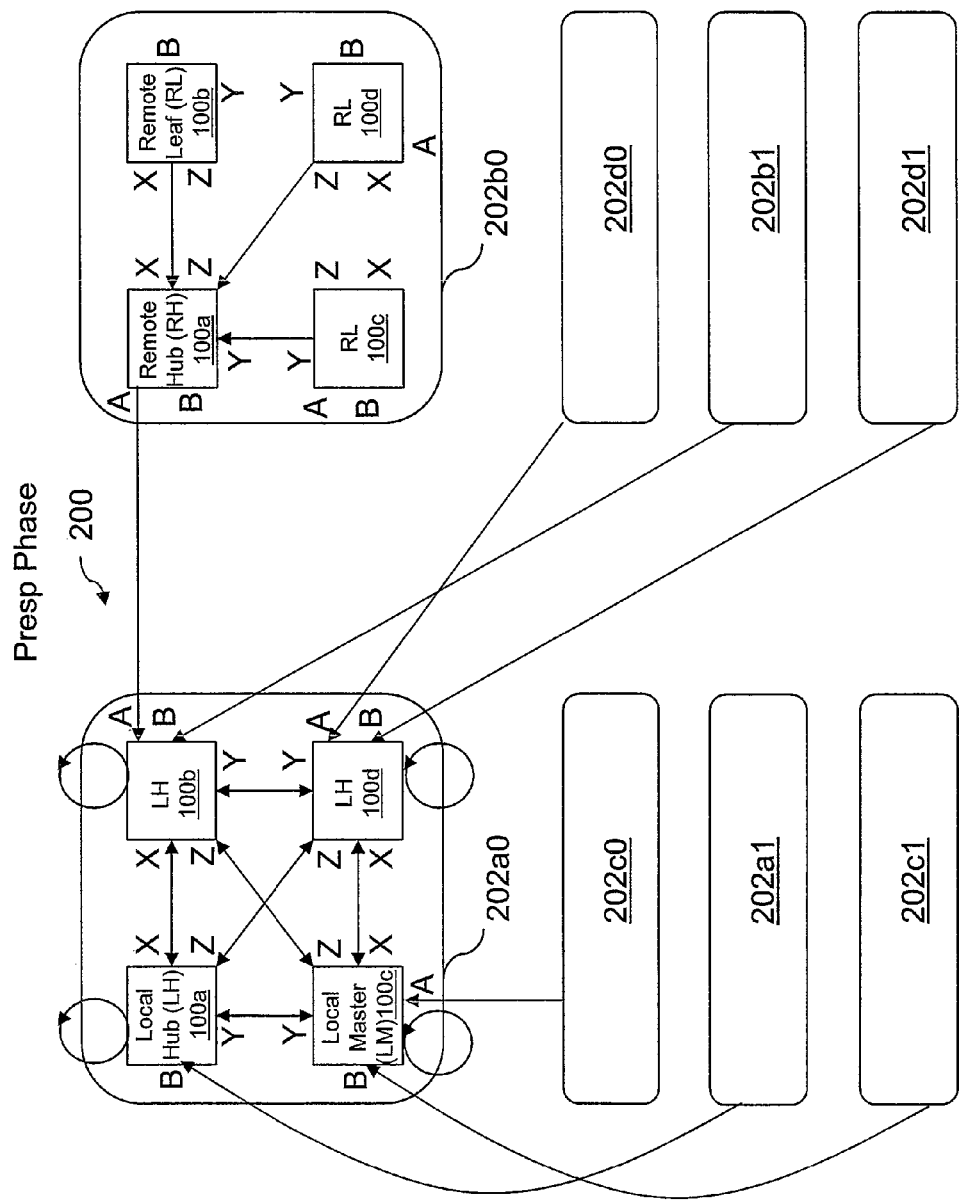

Following the request phase, the partial response (Presp) phase occurs, as shown in FIGS. 4A and 5B. In the partial response phase, each remote leaf 100 evaluates the operation and provides its partial response to the operation to its respective remote hub 100. For example, remote leaves 100b0b, 100b0c and 100b0d transmit their respective partial responses to remote hub 100b0a. Each remote hub 100 in turn transmits these partial responses, as well as its own partial response, to a respective one of local hubs 100a0a, 100a0b, 100a0c and 100a0d. Local hubs 100a0a, 100a0b, 100a0c and 100a0d then broadcast these partial responses, as well as their own partial responses, to each local hub 100 in processing node 202a0. It should be noted by reference to FIG. 5B that the broadcast of partial responses by the local hubs 100 within processing node 202a0 includes, for timing reasons, the self-broadcast by each local hub 100 of its own partial response.

As will be appreciated, the collection of partial responses in the manner shown can be implemented in a number of different ways. For example, it is possible to communicate an individual partial response back to each local hub from each other local hub, remote hub and remote leaf. Alternatively, for greater efficiency, it may be desirable to accumulate partial responses as they are communicated back to the local hubs. In order to ensure that the effect of each partial response is accurately communicated back to local hubs 100, it is preferred that the partial responses be accumulated, if at all, in a non-destructive manner, for example, utilizing a logical OR function and an encoding in which no relevant information is lost when subjected to such a function (e.g., a "one-hot" encoding).

Figure 5C:
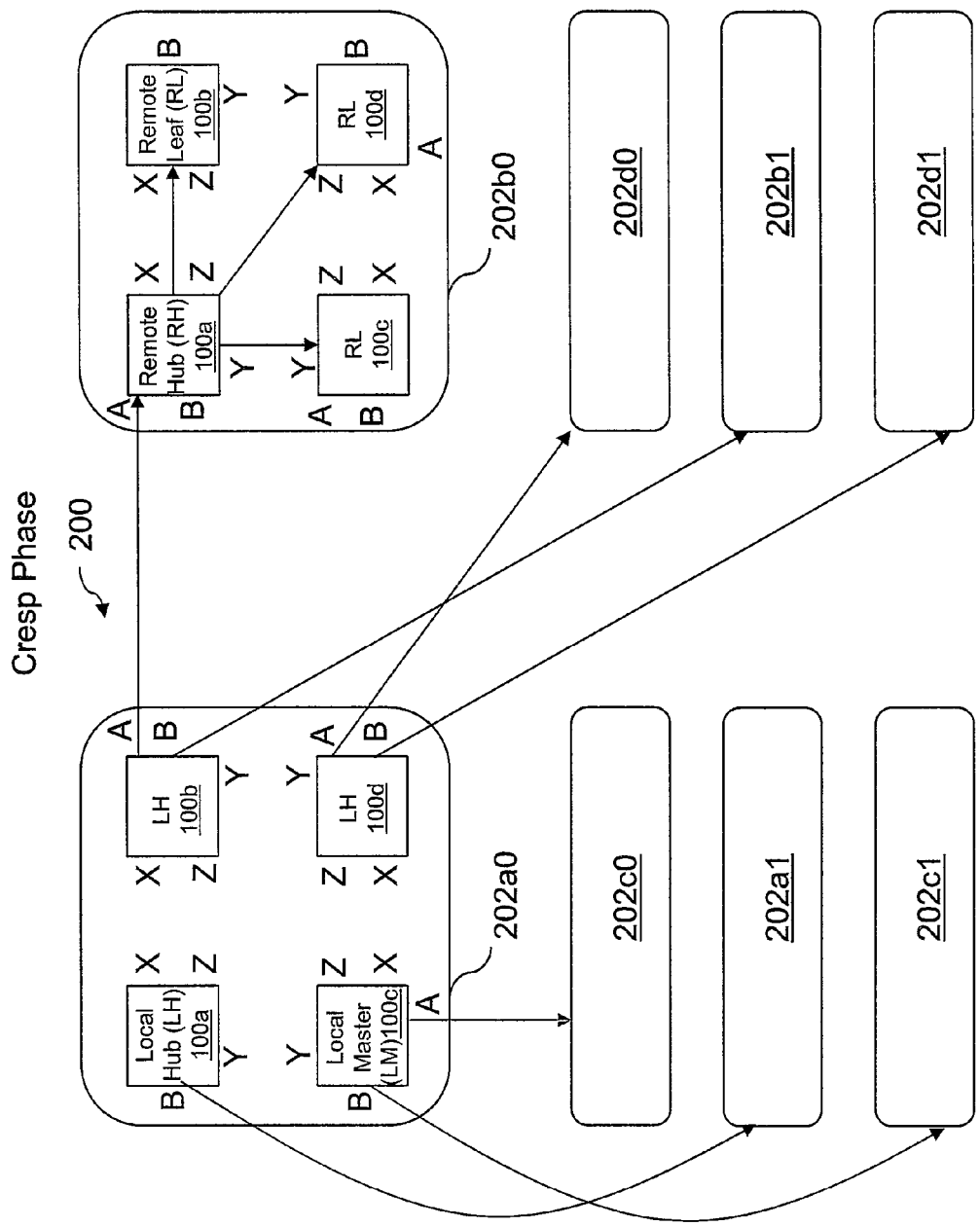

As further shown in FIG. 4A and FIG. 5C, response logic 122 at each local hub 100 within processing node 202a0 compiles the partial responses of the other processing units 100 to obtain a combined response representing the system-wide response to the request. Local hubs 100a0a-100a0d then broadcast the combined response to all processing units 100 following the same paths of distribution as employed for the request phase. Thus, the combined response is first broadcast to remote hubs 100, which in turn transmit the combined response to each remote leaf 100 within their respective processing nodes 202. For example, remote hub 100a0b transmits the combined response to remote hub 100b0a, which in turn transmits the combined response to remote leaves 100b0b, 100b0c and 100b0d.

Figure 5D:
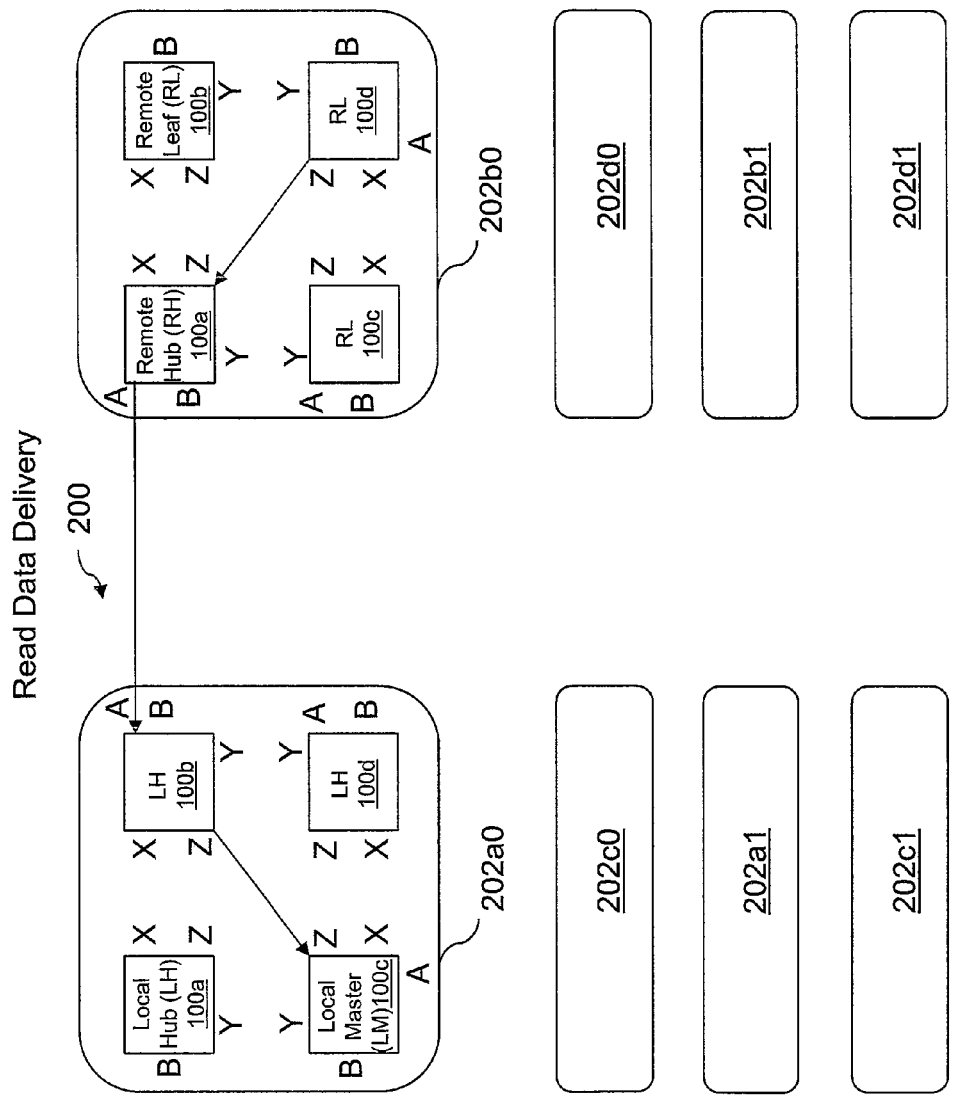
FIGS. 5D-5E depict an exemplary data flow for an exemplary system-wide broadcast operation in accordance with the present invention.
Figure 5E:
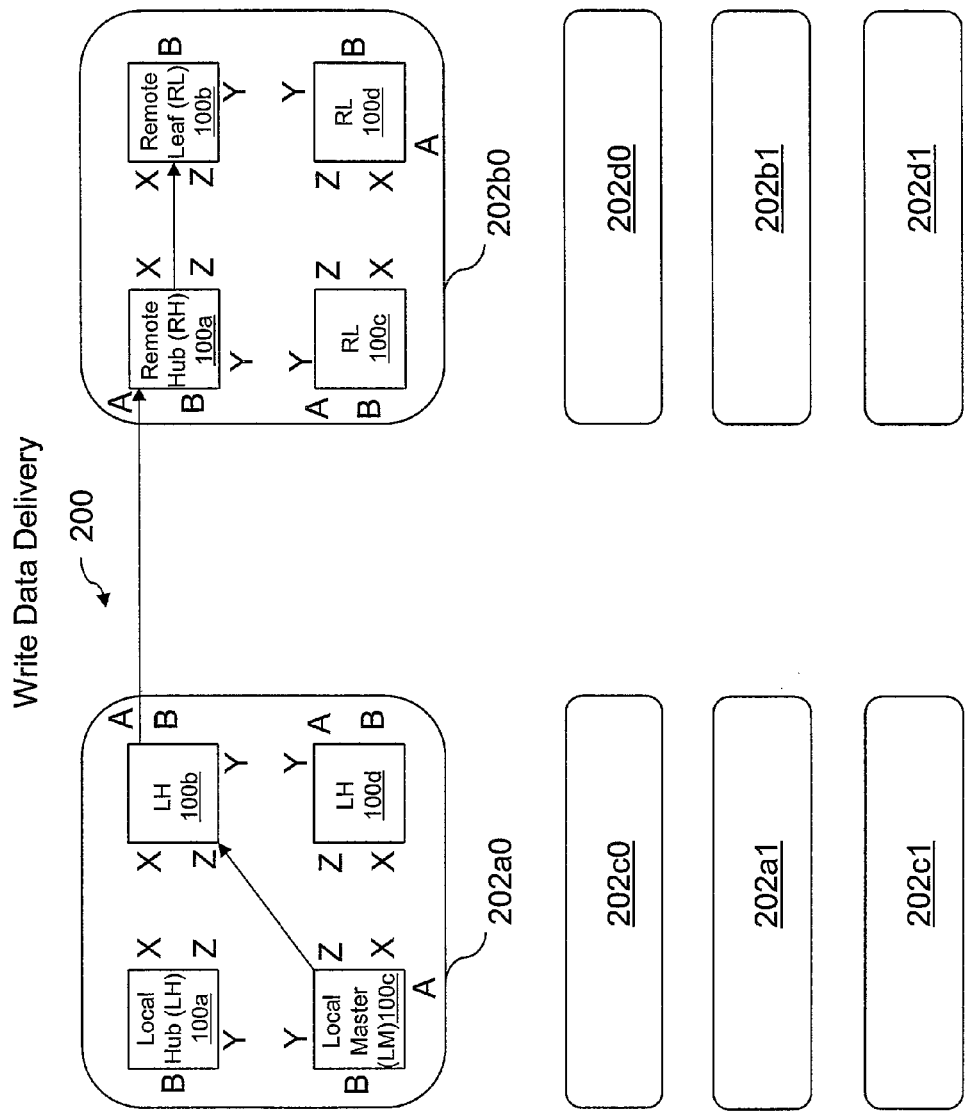

As noted above, servicing the operation may require an additional data phase, such as shown in FIG. 5D or 5E. For example, as shown in FIG. 5D, if the operation is a read-type operation, such as a read or RWITM operation, remote leaf 100b0d may source the requested memory block to local master 100a0c via the links connecting remote leaf 100b0d to remote hub 100b0a, remote hub 100b0a to local hub 100a0b, and local hub 100a0b to local master 100a0c. Conversely, if the operation is a write-type operation, for example, a cache castout operation writing a modified memory block back to the system memory 132 of remote leaf 100b0b, the memory block is transmitted via the links connecting local master 100a0c to local hub 100a0b, local hub 100a0b to remote hub 100b0a, and remote hub 100b0a to remote leaf 100b0b, as shown in FIG. 5E.

Figure 4B:
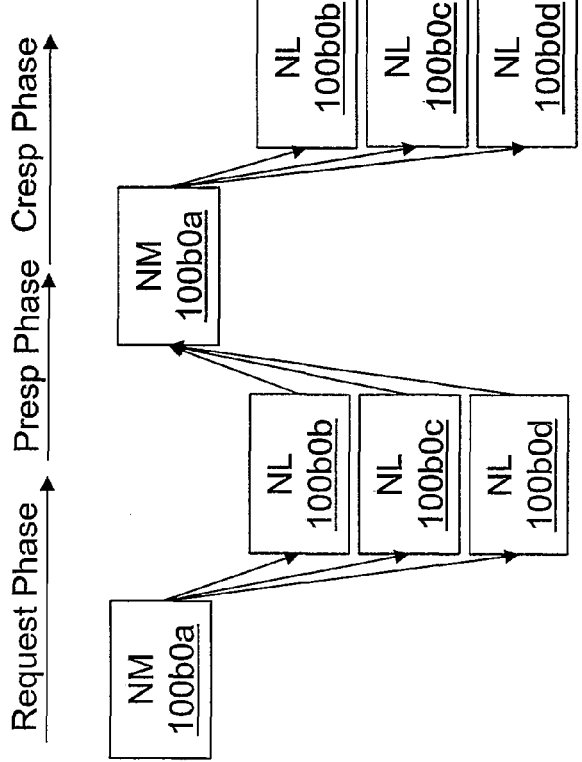
FIG. 4B is a time-space diagram of an exemplary operation of node-only scope within the data processing system of FIG. 2.

Referring now to FIG. 4B, which will be described in conjunction with FIGS. 5F-5H, there is illustrated a time-space diagram of an exemplary operation flow of an operation of node-only scope in data processing system 200 of FIG. 2. In these figures, the various processing units 100 within data processing system 200 are tagged with two locational identifiers—a first identifying the processing node 202 to which the processing unit 100 belongs and a second identifying the particular processing unit 100 within the processing node 202. Thus, for example, processing unit 100b0a refers to processing unit 100b of processing node 202b0. In addition, each processing unit 100 is tagged with a functional identifier indicating its function relative to the other processing units 100 participating in the operation. These functional identifiers include: (1) node master (NM), which designates the processing unit 100 that originates an operation of node-only scope, and (2) node leaf (NL), which designates a processing unit 100 that is in the same processing node 202 as the node master and that is not the node master.

As shown in FIG. 4B, the exemplary node-only operation has at least three phases as described above: a request (or address) phase, a partial response (Presp) phase, and a combined response (Cresp) phase. Again, these three phases preferably occur in the foregoing order and do not overlap. The operation may additionally have a data phase, which may optionally overlap with any of the request, partial response and combined response phases.

Figure 5F:
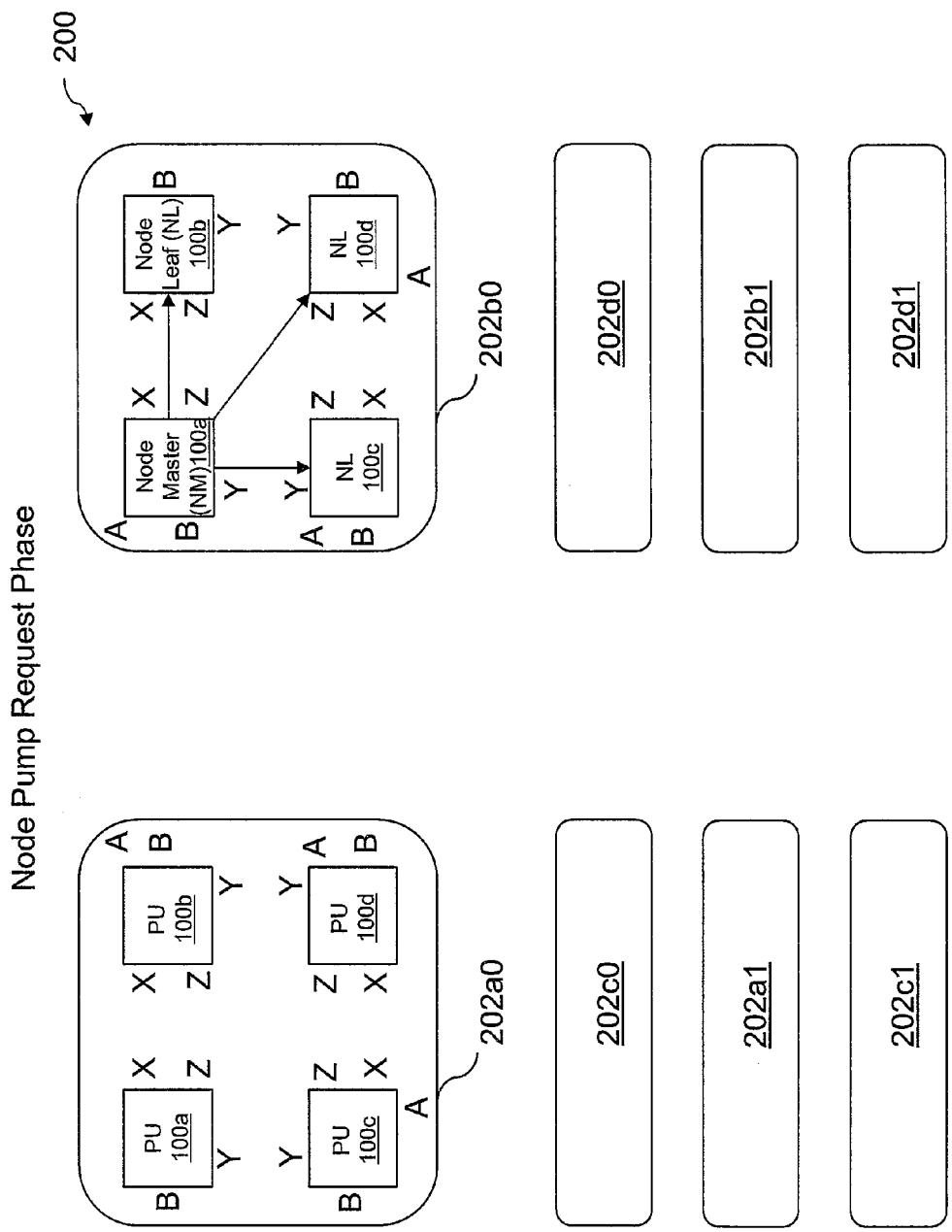

Still referring to FIG. 4B and referring additionally to FIG. 5F, the request phase begins when a node master 100b0a (i.e., processing unit 100a of processing node 202b0), which functions much like a remote hub in the operational scenario of FIG. 4A, performs a synchronized broadcast of a request, for example, a read request, to each of the node leaves 100b0b, 100b0c, and 100b0d within its processing node 202b0. It should be noted that, because the scope of the broadcast transmission is limited to a single node, no internal transmission of the request within node master 100b0a is employed to synchronize off-node transmission of the request.

Figure 5G:
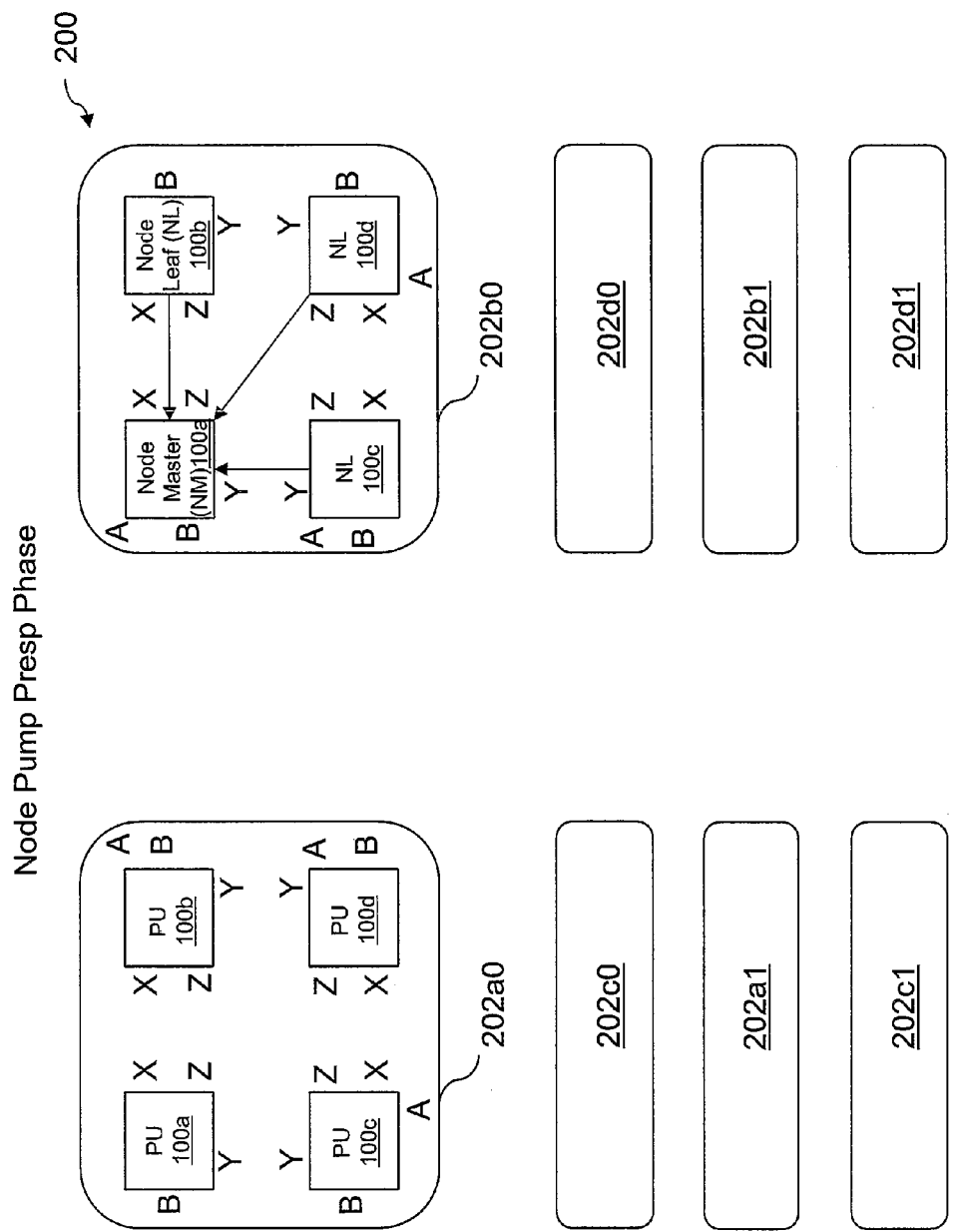

Following the request phase, the partial response (Presp) phase occurs, as shown in FIGS. 4B and 5G. In the partial response phase, each of node leaves 100b0b, 100b0c and 100b0d evaluates the operation and provides its partial response to the operation to node master 100b0a. Next, as further shown in FIG. 4B and FIG. 5H, response logic 122 at node master 100b0a within processing node 202b0 compiles the partial responses of the other processing units 100 to obtain a combined response representing the node-wide response to the request. Node master 100b0a then broadcasts the combined response to all node leaves 100b0b, 100b0c and 1000b0d utilizing the X, Y and Z links of node master 100b0a.

Figure 5I:
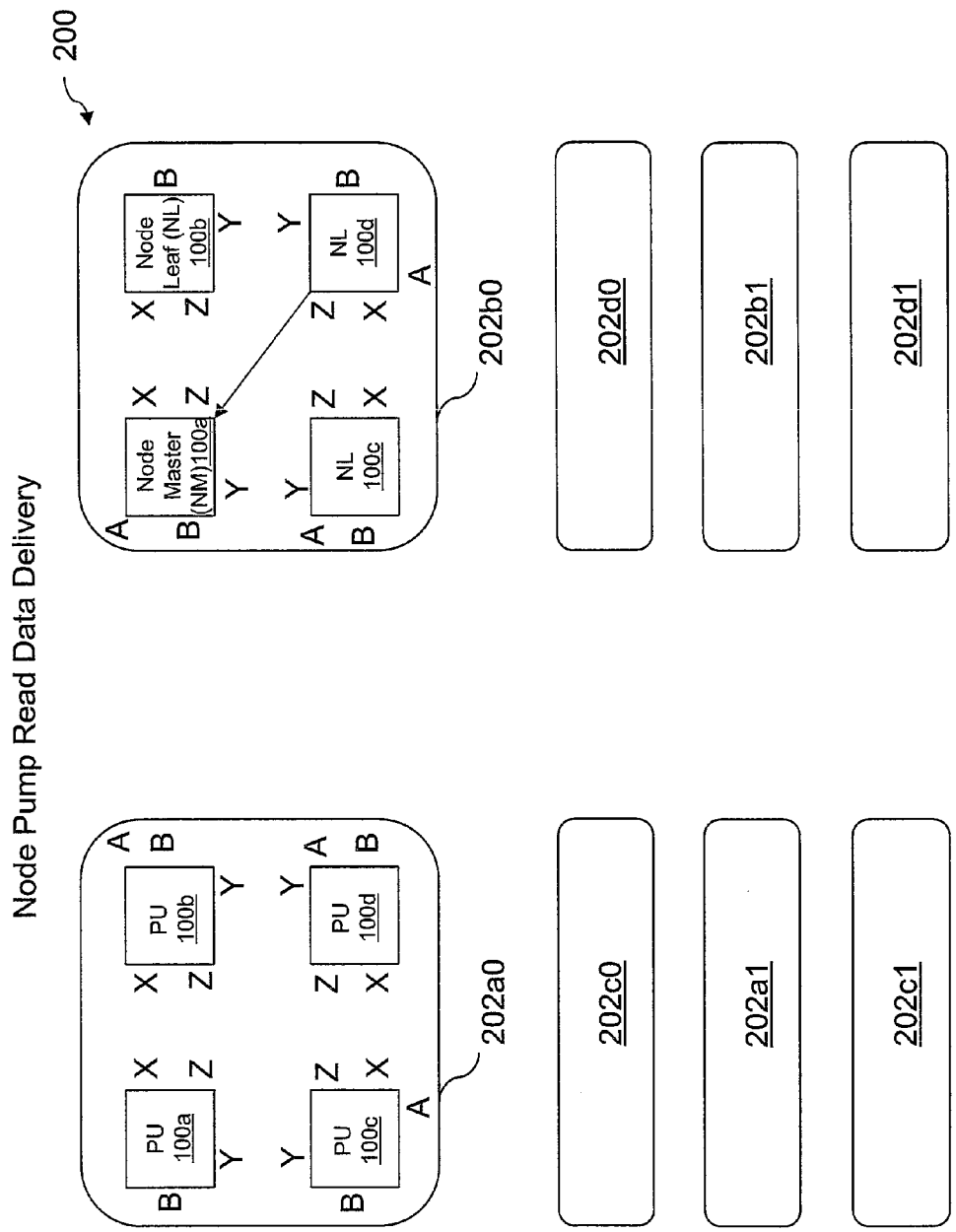
FIGS. 5I-5J depict an exemplary data flow for an exemplary node-only broadcast operation in accordance with the present invention.
Figure 5J:
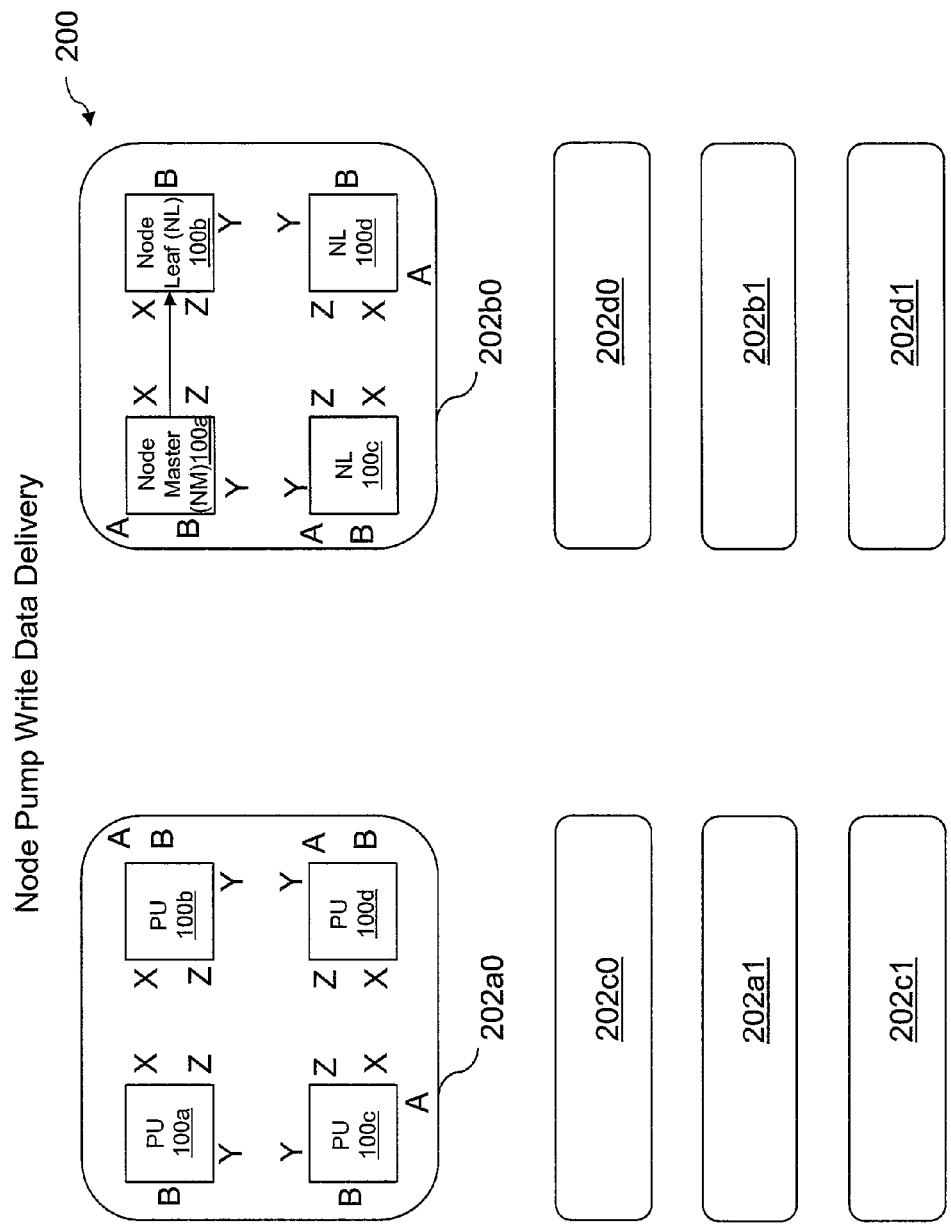

As noted above, servicing the operation may require an additional data phase, such as shown in FIG. 5I or 5J. For example, as shown in FIG. 5I, if the operation is a read-type operation, such as a read or RWITM operation, node leaf 100b0d may source the requested memory block to node master 100b0a via the Z link connecting node leaf 100b0d to node master 100b0a. Conversely, if the operation is a write-type operation, for example, a cache castout operation writing a modified memory block back to the system memory 132 of remote leaf 100b0b, the memory block is transmitted via the X link connecting node master 100b0a to node leaf 100b0b, as shown in FIG. 5J.

Of course, the two operations depicted in FIG. 4A and FIGS. 5A-5E and FIG. 4B and FIGS. 5F-5J are merely exemplary of the myriad of possible system-wide and node-only operations that may occur concurrently in a multiprocessor data processing system such as data processing system 200.

IV. Timing Considerations

Figure 6:
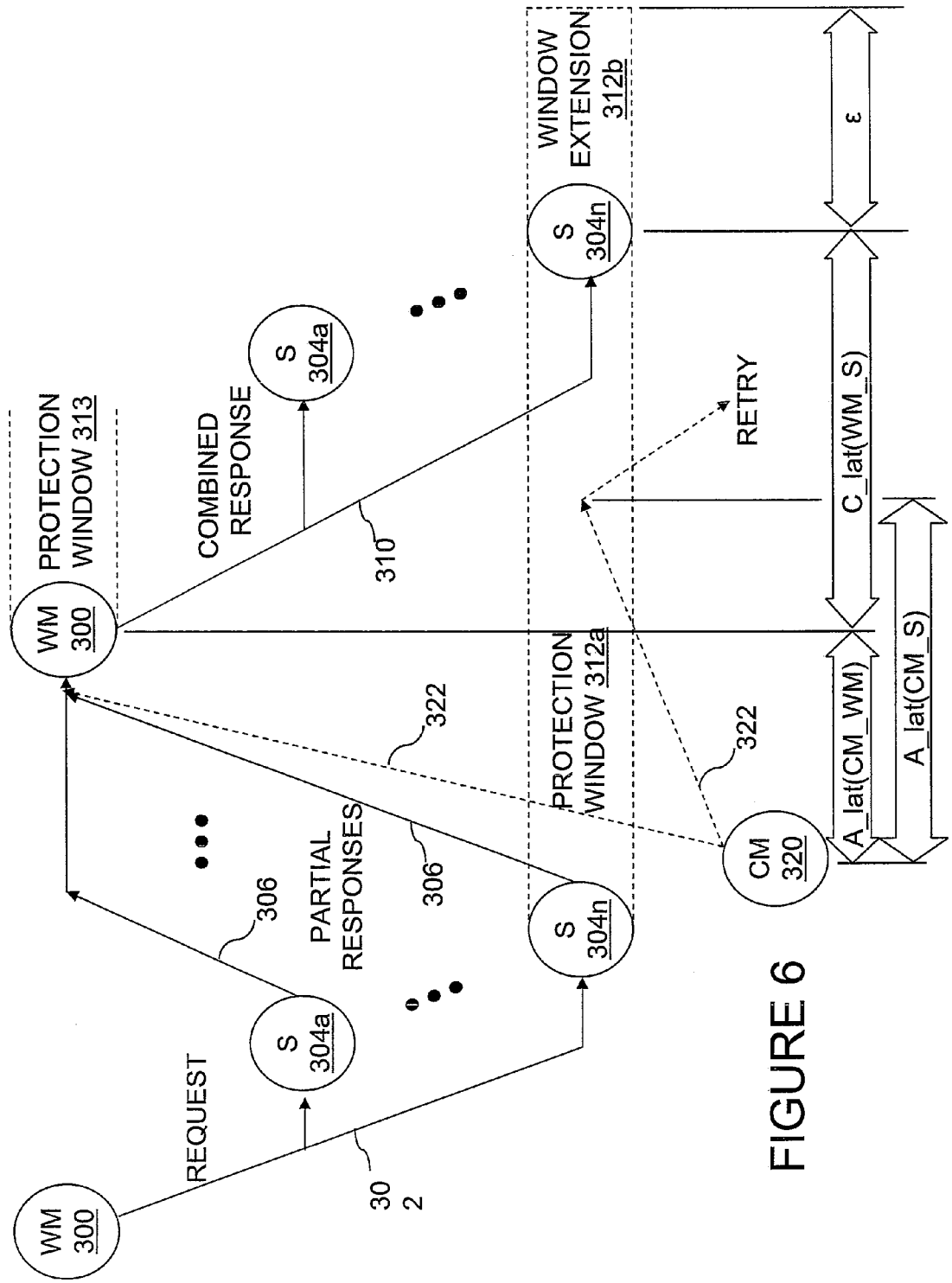
FIG. 6 is a time-space diagram of an exemplary operation, illustrating the timing constraints of an arbitrary data processing system topology.

As described above with reference to FIG. 3, coherency is maintained during the "handoff" of coherency ownership of a memory block from a snooper 304n to a requesting master 300 in the possible presence of other masters competing for ownership of the same memory block through protection window 312a, window extension 312b, and protection window 313. For example, as shown in FIG. 6, protection window 312a and window extension 312b must together be of sufficient duration to protect the transfer of coherency ownership of the requested memory block from snooper 304n to winning master (WM) 300 in the presence of a competing request 322 by a competing master (CM) 320. To ensure that protection window 312a and window extension 312b have sufficient duration to protect the transfer of ownership of the requested memory block from snooper 304n to winning master 300, the latency of communication between processing units 100 in accordance with FIGS. 4A and 4B is preferably constrained such that the following conditions are met:

$$A\_lat(CM\_S) \leq A\_lat(CM\_WM) + C\_lat(WM\_S) + \epsilon,$$

where A_lat(CM_S) is the address latency of any competing master (CM) 320 to the snooper (S) 304n owning coherence of the requested memory block, A_lat(CM_WM) is the address latency of any competing master (CM) 320 to the "winning" master (WM) 300 that is awarded coherency ownership by snooper 304n, C_lat(WM_S) is the combined response latency from the time that the combined response is received by the winning master (WM) 300 to the time the combined response is received by the snooper (S) 304n owning the requested memory block, and $\epsilon$ is the duration of window extension 312b.

If the foregoing timing constraint, which is applicable to a system of arbitrary topology, is not satisfied, the request 322 of the competing master 320 may be received (1) by winning master 300 prior to winning master 300 assuming coherency ownership and initiating protection window 312b and (2) by snooper 304n after protection window 312a and window extension 312b end. In such cases, neither winning master 300 nor snooper 304n will provide a partial response to competing request 322 that prevents competing master 320 from assuming coherency ownership of the memory block and reading non-coherent data from memory. However, to avoid this coherency error, window extension 312b can be programmably set (e.g., by appropriate setting of configuration register 123) to an arbitrary length ($\epsilon$) to compensate for latency variations or the shortcomings of a physical implementation that may otherwise fail to satisfy the timing constraint that must be satisfied to maintain coherency. Thus, by solving the above equation for $\epsilon$, the ideal length of window extension 312b for any implementation can be determined. For the data processing system embodiment of FIG. 2, it is preferred if $\epsilon$ has a duration equal to the latency of one first tier link chip-hop for broadcast operations having a scope including multiple processing nodes 202 and has a duration of zero for operations of node-only scope.

Several observations may be made regarding the foregoing timing constraint. First, the address latency from the competing master 320 to the owning snooper 304a has no necessary lower bound, but must have an upper bound. The upper bound is designed for by determining the worst case latency attainable given, among other things, the maximum possible oscillator drift, the longest links coupling processing units 100, the maximum number of accumulated stalls, and guaranteed worst case throughput. In order to ensure the upper bound is observed, the interconnect fabric must ensure non-blocking behavior.

Second, the address latency from the competing master 320 to the winning master 300 has no necessary upper bound, but must have a lower bound. The lower bound is determined by the best case latency attainable, given, among other things, the absence of stalls, the shortest possible link between processing units 100 and the slowest oscillator drift given a particular static configuration.

Although for a given operation, each of the winning master 300 and competing master 320 has only one timing bound for its respective request, it will be appreciated that during the course of operation any processing unit 100 may be a winning master for some operations and a competing (and losing) master for other operations. Consequently, each processing unit 100 effectively has an upper bound and a lower bound for its address latency.

Third, the combined response latency from the time that the combined response is generated to the time the combined response is observed by the winning master 300 has no necessary lower bound (the combined response may arrive at the winning master 300 at an arbitrarily early time), but must have an upper bound. By contrast, the combined response latency from the time that a combined response is generated until the combined response is received by the snooper 304$n$ has a lower bound, but no necessary upper bound (although one may be arbitrarily imposed to limit the number of operations concurrently in flight).

Fourth, there is no constraint on partial response latency. That is, because all of the terms of the timing constraint enumerated above pertain to request/address latency and combined response latency, the partial response latencies of snoopers 304 and competing master 320 to winning master 300 have no necessary upper or lower bounds.

V. Exemplary Link Information Allocation

The first tier and second tier links connecting processing units 100 may be implemented in a variety of ways to obtain the topology depicted in FIG. 2 and to meet the timing constraints illustrated in FIG. 6. In one preferred embodiment, each inbound and outbound first tier (X, Y and Z) link and each inbound and outbound second tier (A and B) link is implemented as a uni-directional 8-byte bus containing a number of different virtual channels or tenures to convey address, data, control and coherency information.

Figure 7C:
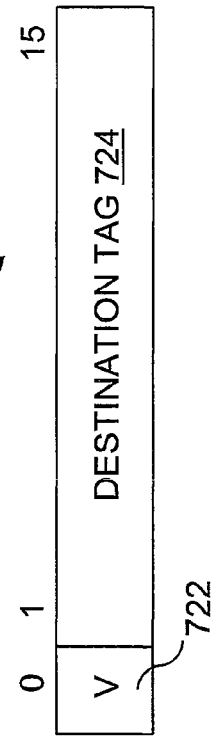
FIG. 7C is an exemplary embodiment of a partial response field for a write request that is included within the link information allocation.
Figure 7A:
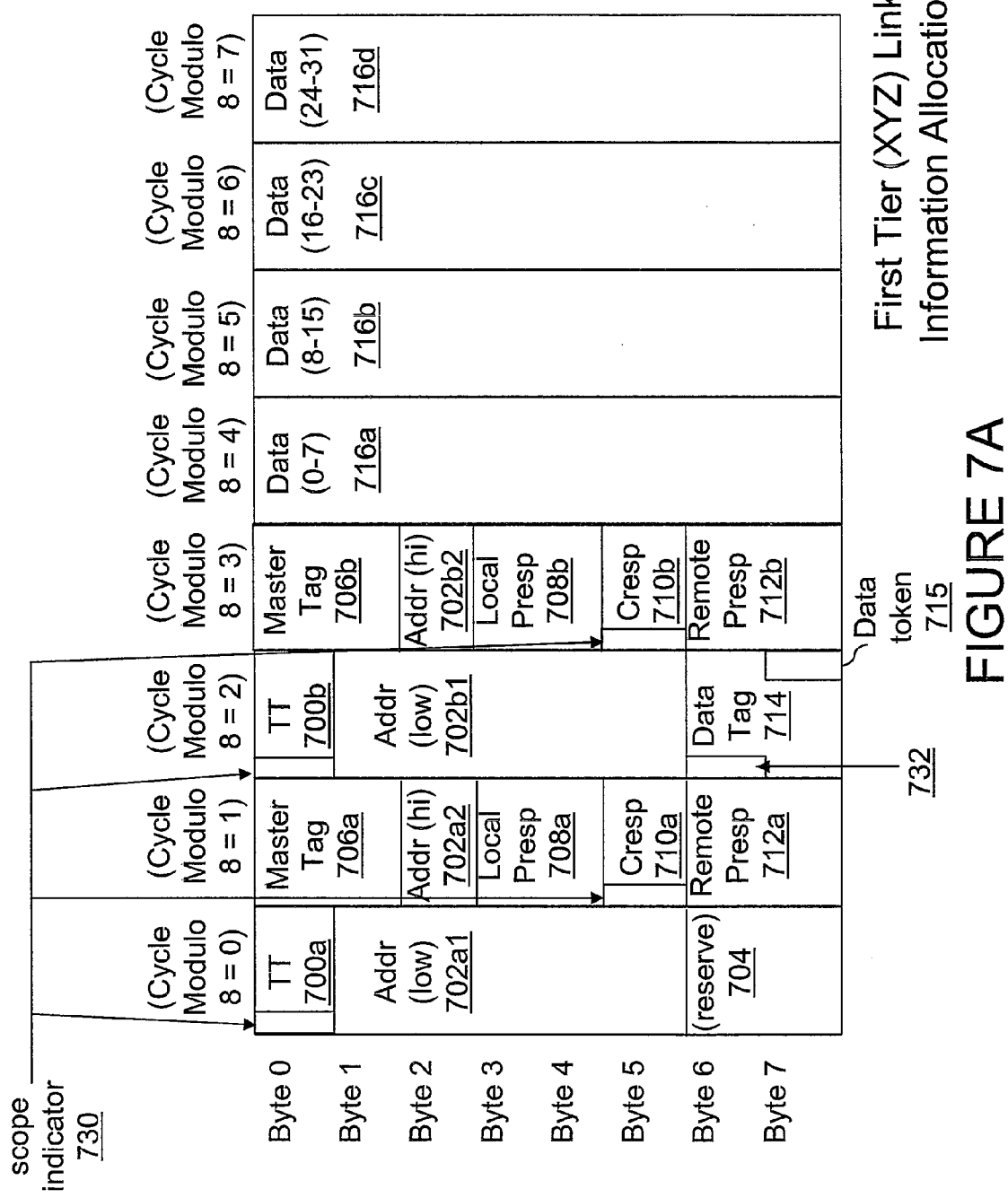
FIGS. 7A-7B illustrate a first exemplary link information allocation for the first and second tier links in accordance with the present invention.
Figure 7B:
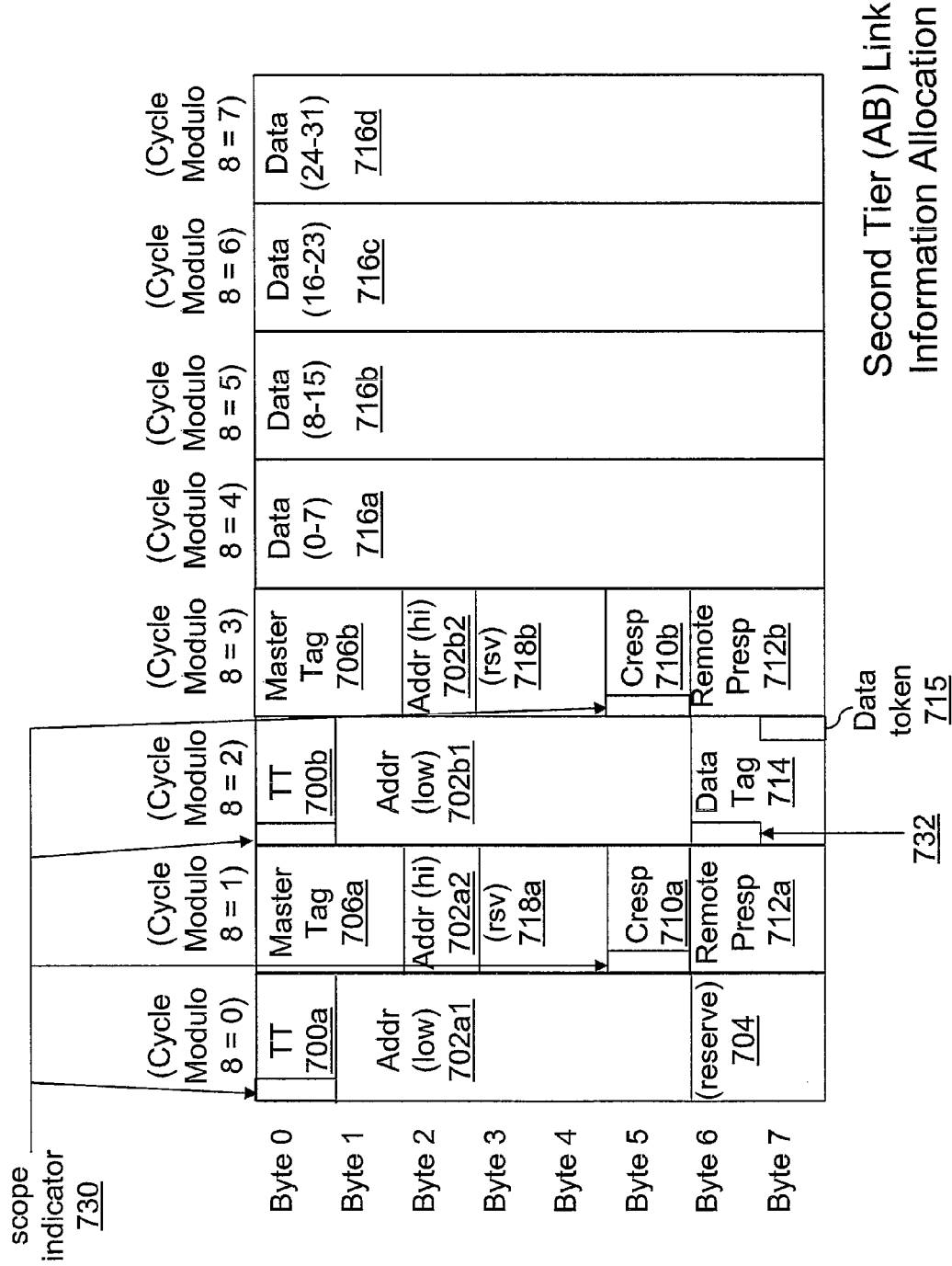

With reference now to FIGS. 7A-7B, there is illustrated a first exemplary time-sliced information allocation for the first tier X, Y and Z links and second tier A and B links. As shown, in this first embodiment information is allocated on the first and second tier links in a repeating 8 cycle frame in which the first 4 cycles comprise two address tenures transporting address, coherency and control information and the second 4 cycles are dedicated to a data tenure providing data transport.

Reference is first made to FIG. 7A, which illustrates the link information allocation for the first tier links. In each cycle in which the cycle number modulo 8 is 0, byte 0 communicates a transaction type 700$a$ (e.g., a read) of a first operation, bytes 1-5 provide the 5 lower address bytes 702$a$1 of the request address of the first operation, and bytes 6-7 form a reserved field 704. In the next cycle (i.e., the cycle for which cycle number modulo 8 is 1), bytes 0-1 communicate a master tag 706$a$ identifying the master 300 of the first operation (e.g., one of L2 cache masters 112 or a master within I/O controller 128), and byte 2 conveys the high address byte 702$a$2 of the request address of the first operation. Communicated together with this information pertaining to the first operation are up to three additional fields pertaining to different operations, namely, a local partial response 708$a$ intended for a local master in the same processing node 202 (bytes 3-4), a combined response 710$a$ in byte 5, and a remote partial response 712$a$ intended for a local master in a different processing node 202 (or in the case of a node-only broadcast, the partial response communicated from the node leaf 100 to node master 100) (bytes 6-7). As noted above, these first two cycles form what is referred to herein as an address tenure.

As further illustrated in FIG. 7A, the next two cycles (i.e., the cycles for which the cycle number modulo 8 is 2 and 3) form a second address tenure having the same basic pattern as the first address tenure, with the exception that reserved field 704 is replaced with a data tag 714 and data token 715 forming a portion of the data tenure. Specifically, data tag 714 identifies the destination data sink to which the 32 bytes of data payload 716$a$-716$d$ appearing in cycles 4-7 are directed.

Its location within the address tenure immediately preceding the payload data advantageously permits the configuration of downstream steering in advance of receipt of the payload data, and hence, efficient data routing toward the specified data sink. Data token 715 provides an indication that a downstream queue entry has been freed and, consequently, that additional data may be transmitted on the paired X, Y, Z or A link without risk of overrun. Again it should be noted that transaction type 700$b$, master tag 706$b$, low address bytes 702$b$1, and high address byte 702$b$2 all pertain to a second operation, and data tag 714, local partial response 708$b$, combined response 710$b$ and remote partial response 712$b$ all relate to one or more operations other than the second operation.

Each transaction type field 700 and combined response field 710 preferably includes a scope indicator 730 indicating whether the operation to which it belongs has a node-only (local) or system-wide (global) scope. As described in greater detail in cross-referenced U.S. patent application Ser. No. 11/055,305, which is incorporated by reference above, data tag 714 further includes a domain indicator 732 that may be set by the LPC to indicate whether or not a remote copy of the data contained within data payload 716$a$-716$d$ may exist.

FIG. 7B depicts the link information allocation for the second tier A and B links. As can be seen by comparison with FIG. 7A, the link information allocation on the second tier A and B links is the same as that for the first tier links given in FIG. 7A, except that local partial response fields 708$a$, 708$b$ are replaced with reserved fields 718$a$, 718$b$. This replacement is made for the simple reason that, as a second tier link, no local partial responses need to be communicated.

FIG. 7C illustrates an exemplary embodiment of a write request partial response 720, which may be transported within either a local partial response field 708$a$, 708$b$ or a remote partial response field 712$a$, 712$b$ in response to a write request. As shown, write request partial response 720 is two bytes in length and includes a 15-bit destination tag field 724 for specifying the tag of a snooper (e.g., an IMC snooper 126) that is the destination for write data and a 1-bit valid (V) flag 722 for indicating the validity of destination tag field 724.

Figure 8A:
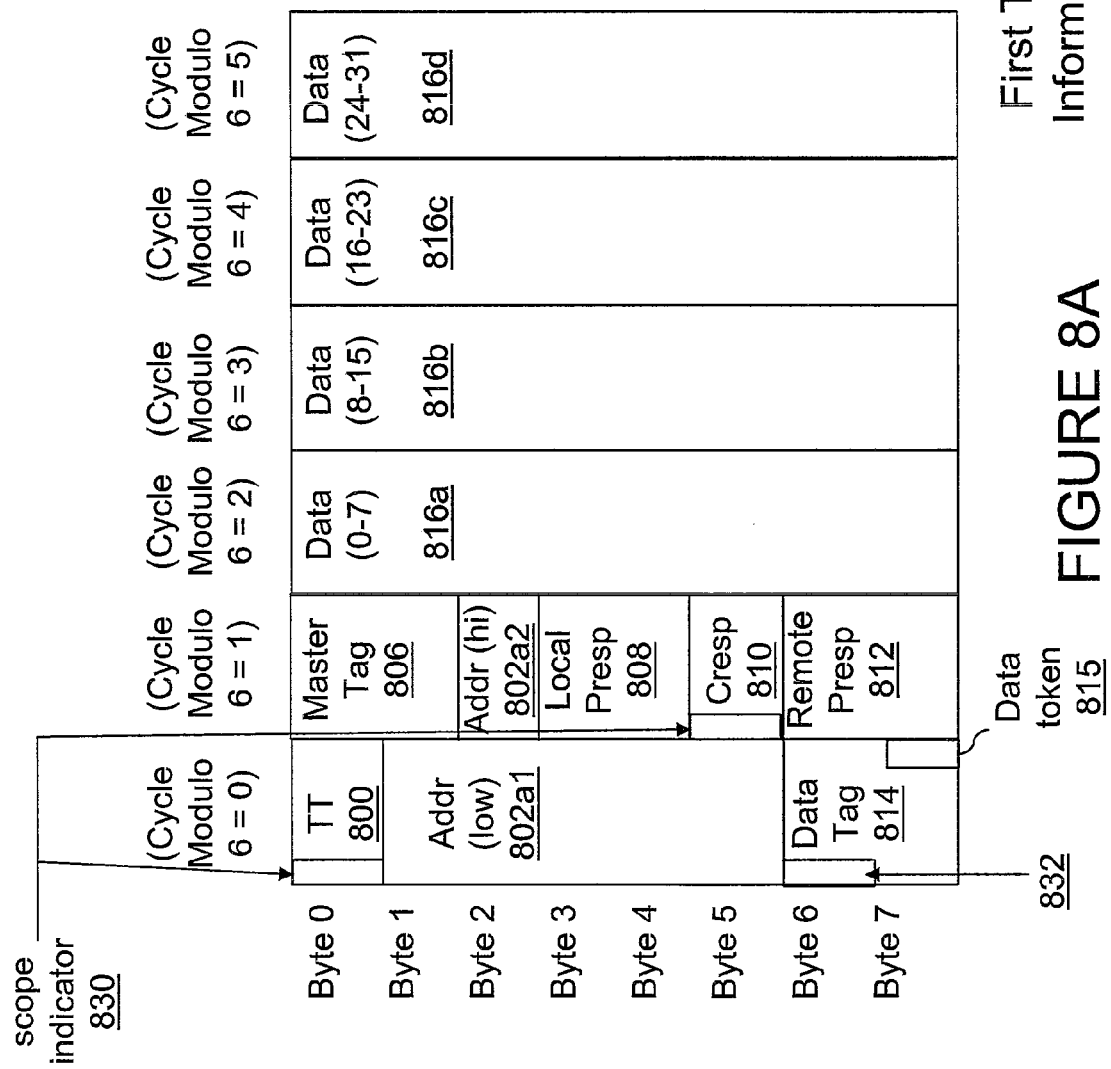
FIGS. 8A-8B depict a second exemplary link information allocation for the first and second tier links in accordance with the present invention.
Figure 8B:
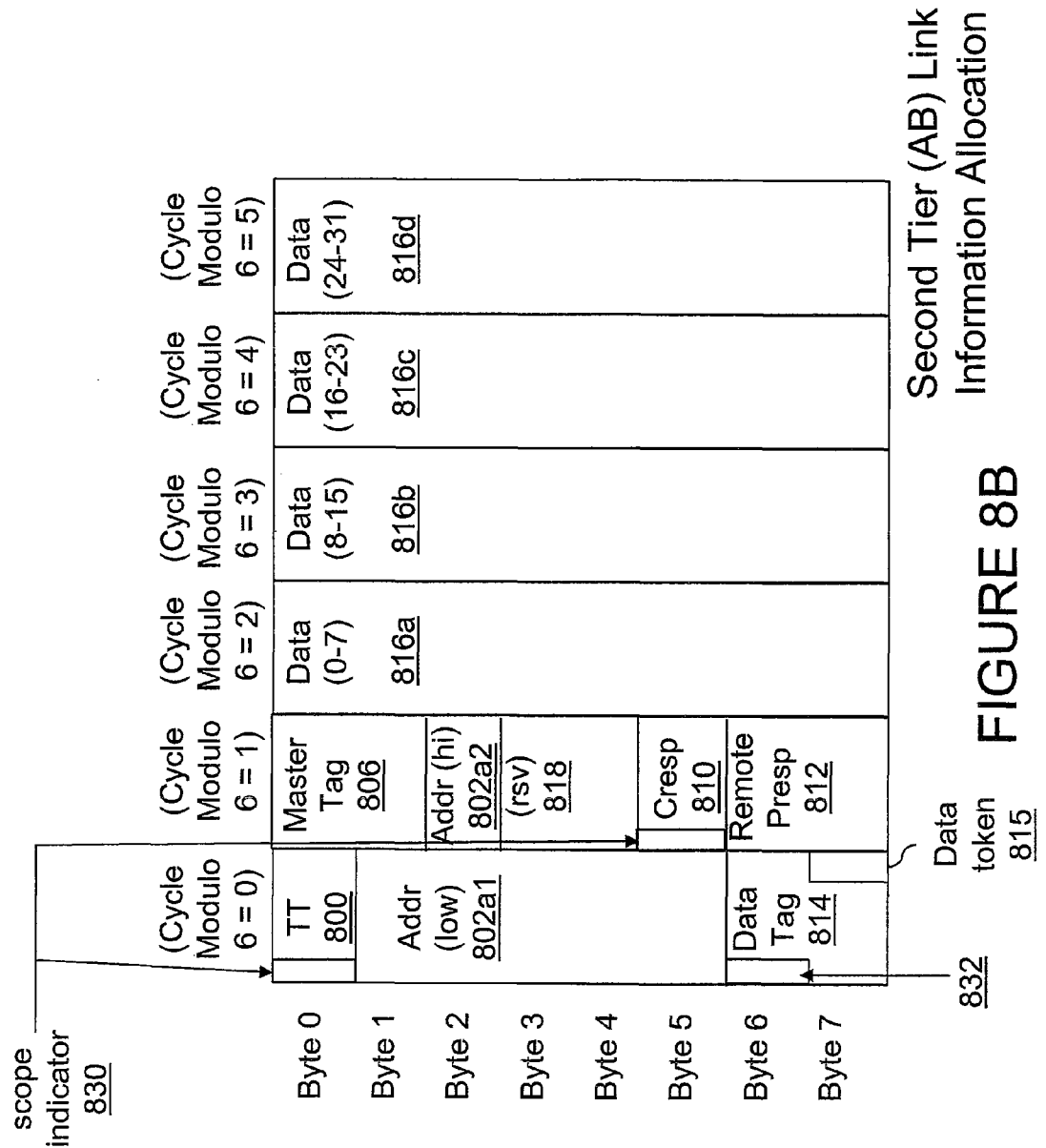

Referring now to FIGS. 8A-8B, there is depicted a second exemplary cyclical information allocation for the first tier X, Y and Z links and second tier A links. As shown, in the second embodiment information is allocated on the first and second tier links in a repeating 6 cycle frame in which the first 2 cycles comprise an address frame containing address, coherency and control information and the second 4 cycles are dedicated to data transport. The tenures in the embodiment of FIGS. 8A-8B are identical to those depicted in cycles 2-7 of FIGS. 7A-7B and are accordingly not described further herein. For write requests, the partial responses communicated within local partial response field 808 and remote partial response field 812 may take the form of write request partial response 720 of FIG. 7C.

It will be appreciated by those skilled in the art that the embodiments of FIGS. 7A-7B and 8A-8B depict only two of a vast number of possible link information allocations. The selected link information allocation that is implemented can be made programmable, for example, through a hardware and/or software-settable mode bit in a configuration register 123 of FIG. 1. The selection of the link information allocation is typically based on one or more factors, such as the type of anticipated workload. For example, if scientific workloads predominate in data processing system 200, it is generally more preferable to allocate more bandwidth on the first and second tier links to data payload. Thus, the second embodiment shown in FIGS. 8A-8B will likely yield improved performance. Conversely, if commercial workloads predominate in data processing system 200, it is generally more preferable to allocate more bandwidth to address, coherency and control information, in which case the first embodiment shown in FIGS. 7A-7B would support higher performance. Although the determination of the type(s) of anticipated workload and the setting of configuration register 123 can be performed by a human operator, it is advantageous if the determination is made by hardware and/or software in an automated fashion. For example, in one embodiment, the determination of the type of workload can be made by service processor code executing on one or more of processing units 100 or on a dedicated auxiliary service processor (not illustrated).

VI. Request Phase Structure and Operation

Figure 9:
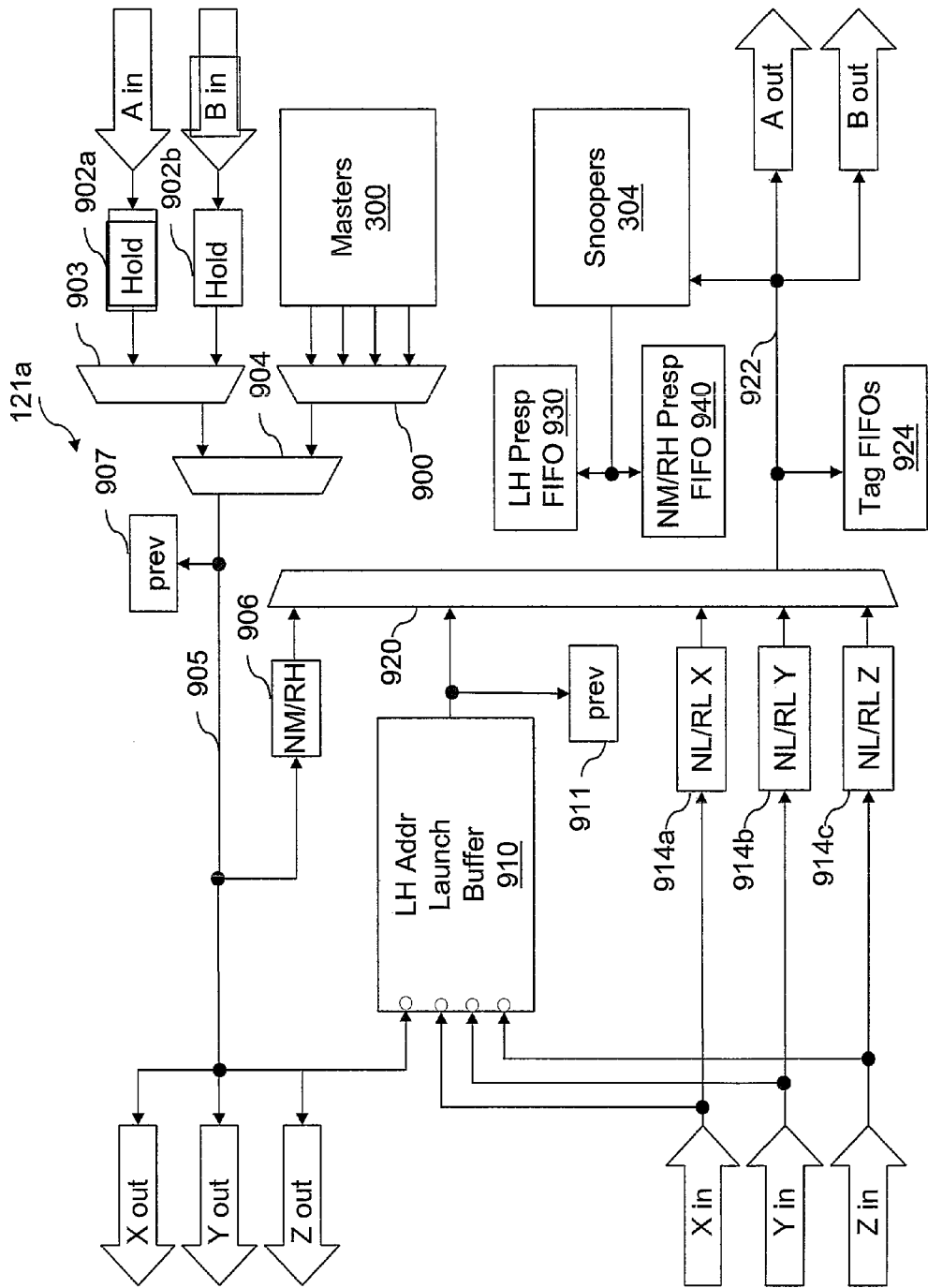
FIG. 9 is a block diagram illustrating a portion of the interconnect logic of FIG. 1 utilized in the request phase of an operation.

Referring now to FIG. 9, there is depicted a block diagram illustrating request logic 121a within interconnect logic 120 of FIG. 1 utilized in request phase processing of an operation. As shown, request logic 121a includes a master multiplexer 900 coupled to receive requests by the masters 300 of a processing unit 100 (e.g., masters 112 within L2 cache 110 and masters within I/O controller 128). The output of master multiplexer 900 forms one input of a request multiplexer 904. The second input of request multiplexer 904 is coupled to the output of a remote hub multiplexer 903 having its inputs coupled to the outputs of hold buffers 902a, 902b, which are in turn coupled to receive and buffer requests on the inbound A and B links, respectively. Remote hub multiplexer 903 implements a fair allocation policy, described further below, that fairly selects among the requests received from the inbound A and B links that are buffered in hold buffers 902a-902b. If present, a request presented to request multiplexer 904 by remote hub multiplexer 903 is always given priority by request multiplexer 904. The output of request multiplexer 904 drives a request bus 905 that is coupled to each of the outbound X, Y and Z links, a node master/remote hub (NM/RH) hold buffer 906, and the local hub (LH) address launch buffer 910. A previous request FIFO buffer 907, which is also coupled to request bus 905, preferably holds a small amount of address-related information for each of a number of previous address tenures to permit a determination of the address slice or resource bank 1912 to which the address, if any, communicated in that address tenure hashes. For example, in one embodiment, each entry of previous request FIFO buffer 907 contains a "1-hot" encoding identifying a particular one of banks 1912a-1912n to which the request address of an associated request hashed. For address tenures in which no request is transmitted on request bus 905, the 1-hot encoding would be all '0's.

The inbound first tier (X, Y and Z) links are each coupled to the LH address launch buffer 910, as well as a respective one of node leaf/remote leaf (NL/RL) hold buffers 914a-914c. The outputs of NM/RH hold buffer 906, LH address launch buffer 910, and NL/RL hold buffers 914a-914c all form inputs of a snoop multiplexer 920. Coupled to the output of LH address launch buffer 910 is another previous buffer 911, which is preferably constructed like previous request FIFO buffer 907. The output of snoop multiplexer 920 drives a snoop bus 922 to which tag FIFO queues 924, the snoopers 304 (e.g., snoopers 116 of L2 cache 110 and snoopers 126 of IMC 124) of the processing unit 100, and the outbound A and B links are coupled. Snoopers 304 are further coupled to and supported by local hub (LH) partial response FIFO queues 930 and node master/remote hub (NM/RH) partial response FIFO queue 940.

Although other embodiments are possible, it is preferable if buffers 902, 906, and 914a-914c remain short in order to minimize communication latency. In one preferred embodiment, each of buffers 902, 906, and 914a-914c is sized to hold only the address tenure(s) of a single frame of the selected link information allocation.

Figure 10:
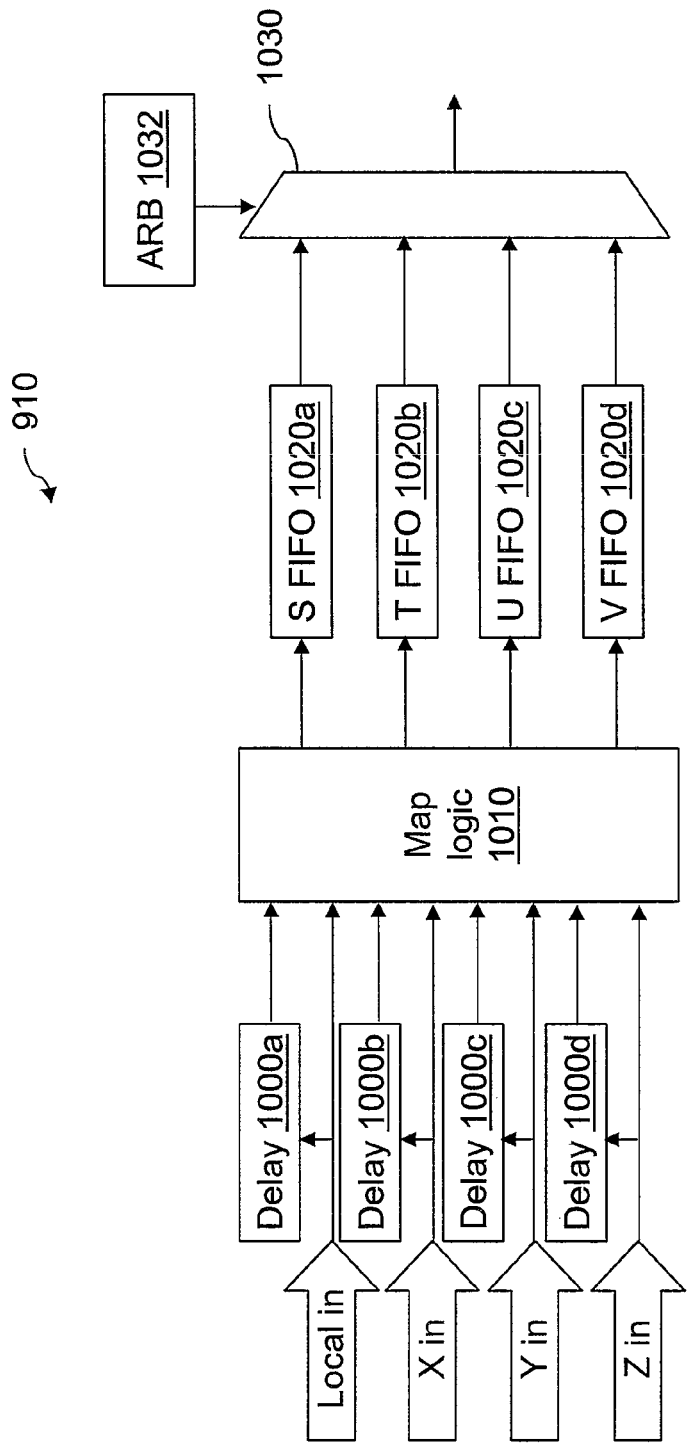
FIG. 10 is a more detailed block diagram of the local hub address launch buffer of FIG. 9.

With reference now to FIG. 10, there is illustrated a more detailed block diagram of local hub (LH) address launch buffer 910 of FIG. 9. As depicted, the local and inbound X, Y and Z link inputs of the LH address launch buffer 910 form inputs of a map logic 1010, which places requests received on each particular input into a respective corresponding position-dependent FIFO queue 1020a-1020d. In the depicted nomenclature, the processing unit 100a in the upper left-hand corner of a processing node/MCM 202 is the "S" chip; the processing unit 100b in the upper right-hand corner of the processing node/MCM 202 is the "T" chip; the processing unit 100c in the lower left-hand corner of a processing node/MCM 202 is the "U" chip; and the processing unit 100d in the lower right-hand corner of the processing node 202 is the "V" chip. Thus, for example, for local master/local hub 100ac, requests received on the local input are placed by map logic 1010 in U FIFO queue 1020c, and requests received on the inbound Y link are placed by map logic 1010 in S FIFO queue 1020a. Map logic 1010 is employed to normalize input flows so that arbitration logic 1032, described below, in all local hubs 100 is synchronized to handle requests identically without employing any explicit inter-communication.

Although placed within position-dependent FIFO queues 1020a-1020d, requests are not immediately marked as valid and available for dispatch. Instead, the validation of requests in each of position-dependent FIFO queues 1020a-1020d is subject to a respective one of programmable delays 1000a-1000d in order to synchronize the requests that are received during each address tenure on the four inputs. Thus, the programmable delay 1000a associated with the local input, which receives the request self-broadcast at the local master/local hub 100, is generally considerably longer than those associated with the other inputs. In order to ensure that the appropriate requests are validated, the validation signals generated by programmable delays 1000a-1000d are subject to the same mapping by map logic 1010 as the underlying requests.

The outputs of position-dependent FIFO queues 1020a-1020d form the inputs of local hub request multiplexer 1030, which selects one request from among position-dependent FIFO queues 1020a-1020d for presentation to snoop multiplexer 920 in response to a select signal generated by arbiter 1032. Arbiter 1032 implements a fair arbitration policy that is synchronized in its selections with the arbiters 1032 of all other local hubs 100 within a given processing node 202 so that the same request is broadcast on the outbound A links at the same time by all local hubs 100 in a processing node 202, as depicted in FIGS. 4 and 5A. Thus, given either of the exemplary link information allocation shown in FIGS. 7B and 8B, the output of local hub request multiplexer 1030 is timeslice-aligned to the address tenure(s) of an outbound A link request frame.

Because the input bandwidth of LH address launch buffer 910 is four times its output bandwidth, overruns of position-dependent FIFO queues 1020a-1020d are a design concern. In a preferred embodiment, queue overruns are prevented by implementing, for each position-dependent FIFO queue 1020, a pool of local hub tokens equal in size to the depth of the associated position-dependent FIFO queue 1020. A free local hub token is required for a local master to send a request to a local hub and guarantees that the local hub can queue the request. Thus, a local hub token is allocated when a request is issued by a local master 100 to a position-dependent FIFO queue 1020 in the local hub 100 and freed for reuse when arbiter 1032 issues an entry from the position-dependent FIFO queue 1020.

Figure 11:
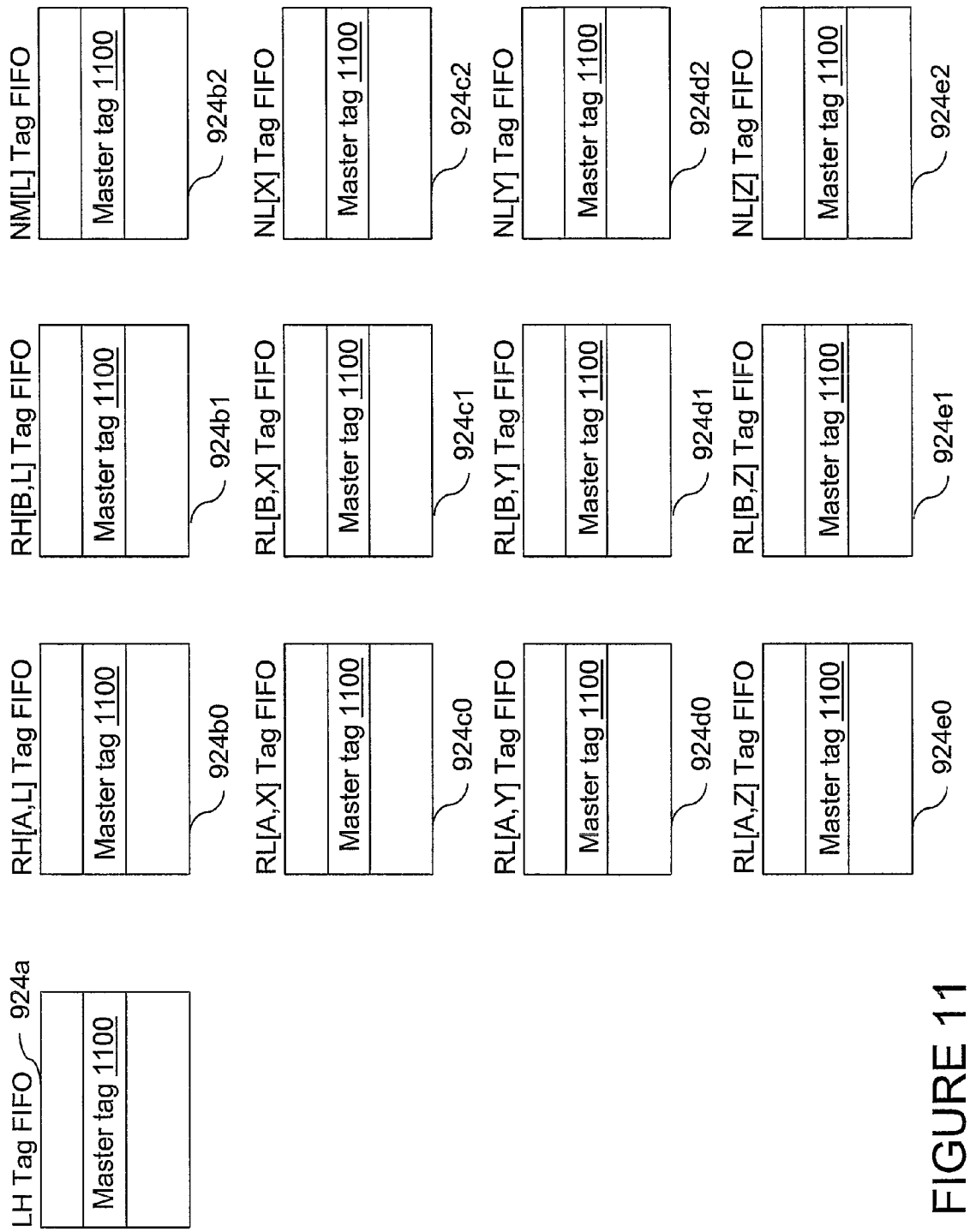
FIG. 11 is a more detailed block diagram of the tag FIFO queues of FIG. 9.

Referring now to FIG. 11, there is depicted a more detailed block diagram of tag FIFO queues 924 of FIG. 9. As shown, tag FIFO queues 924 include a local hub (LH) tag FIFO queue 924a, remote hub (RH) tag FIFO queues 924b0-924b1, node master (NM) tag FIFO queue 924b2, remote leaf (RL) tag FIFO queues 924c0-924c1, 924d0-924d1 and 924e0-924e1, and node leaf (NL) tag FIFO queues 924c2, 924d2 and 924e2. The master tag of a request of an operation of system-wide scope is deposited in each of tag FIFO queues 924a, 924b0-924b1, 924c0-924c1, 924d0-924d1 and 924e0-924e1 when the request is received at the processing unit(s) 100 serving in each of these given roles (LH, RH, and RL) for that particular request. Similarly, the master tag of a request of an operation of node-only scope is deposited in each of tag FIFO queues 924b2, 924c2, 924d2 and 924e2 when the request is received at the processing unit(s) 100 serving in each of these given roles (NM and NL) for that particular request. The master tag is retrieved from each of tag FIFO queues 924 when the combined response is received at the associated processing unit 100. Thus, rather than transporting the master tag with the combined response, master tags are retrieved by a processing unit 100 from its tag FIFO queue 924 as needed, resulting in bandwidth savings on the first and second tier links. Given that the order in which a combined response is received at the various processing units 100 is identical to the order in which the associated request was received, a FIFO policy for allocation and retrieval of the master tag can advantageously be employed.

LH tag FIFO queue 924a includes a number of entries, each including a master tag field 1100 for storing the master tag of a request launched by arbiter 1032. Each of tag FIFO queues 924b0-924b1 similarly includes multiple entries, each including at least a master tag field 1100 for storing the master tag of a request of system-wide scope received by a remote hub 100 via a respective one of the inbound A and B links. Tag FIFO queues 924c0-924c1, 924d0-924d1 and 924e0-924e1 are similarly constructed and each hold master tags of requests of system-wide scope received by a remote leaf 100 via a unique pairing of inbound first and second tier links. For requests of node-only broadcast scope, NM tag FIFO queues 924b2 holds the master tags of requests originated by the node master 100, and each of NL tag FIFO queues 924c2, 924d2 and 924e2 provides storage for the master tags of requests received by a node leaf 100 on a respective one of the first tier X, Y and Z links.

Figure 13A:
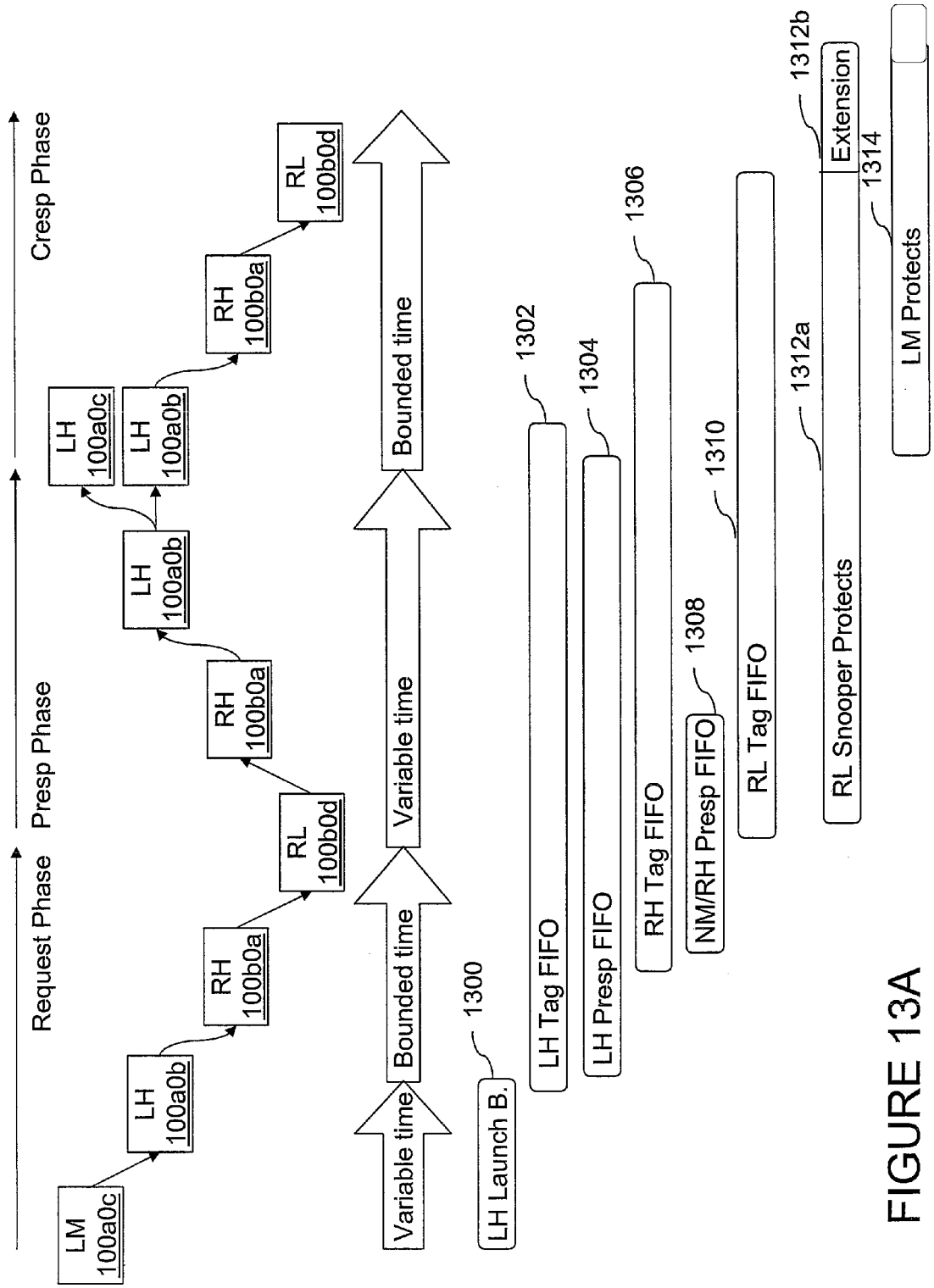
FIGS. 13A-13B are time-space diagrams respectively illustrating the tenures of a system-wide broadcast operation and a node-only broadcast operation with respect to the data structures depicted in FIG. 9.
Figure 13B:
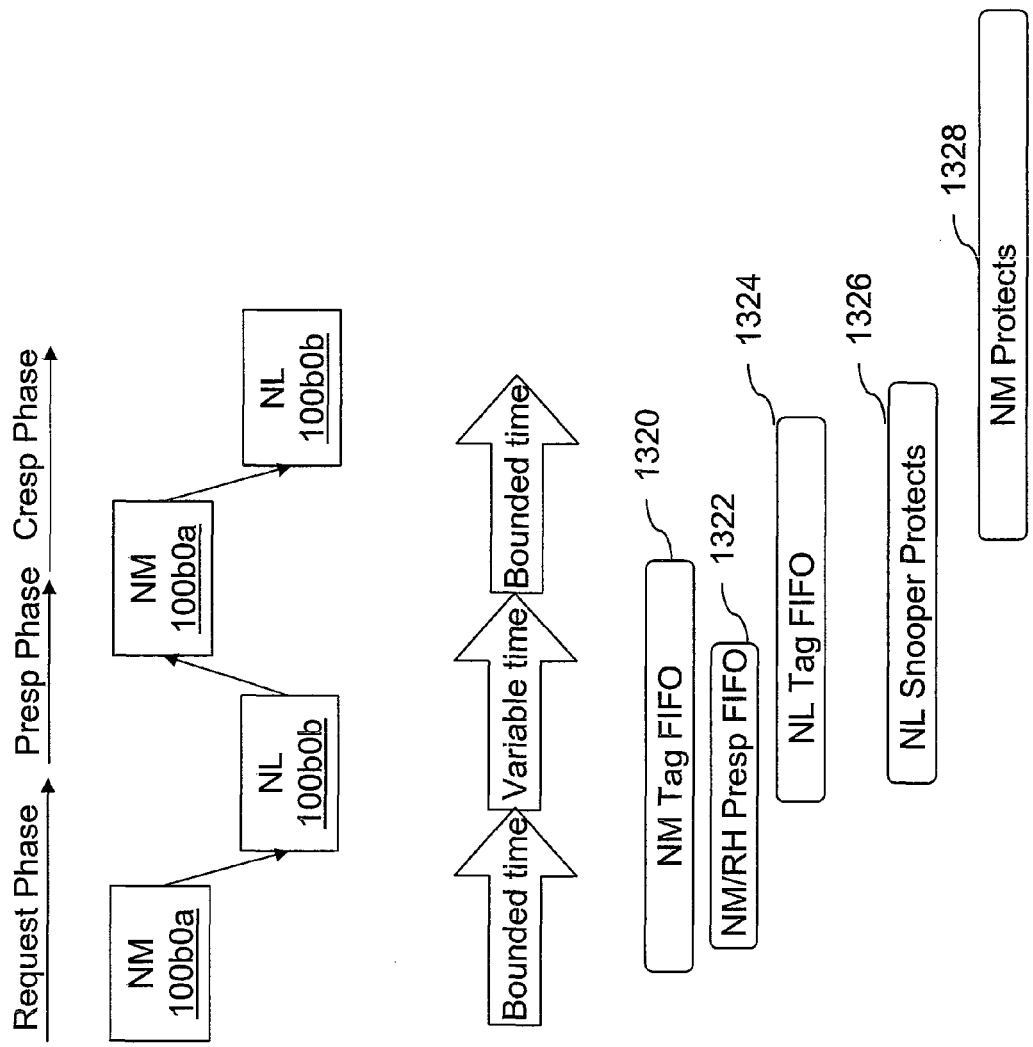

As depicted in FIGS. 13A-13B, which are described below, entries within LH tag FIFO queue 924a have the longest tenures for system-wide broadcast operations, and NM tag FIFO queue 924b2 have the longest tenures for node-only broadcast operations. Consequently, the depths of LH tag FIFO queue 924a and NM tag FIFO queue 924b2 respectively limit the number of concurrent operations of system-wide scope that a processing node 202 can issue on the interconnect fabric and the number of concurrent operations of node-only scope that a given processing unit 100 can issue on the interconnect fabric. These depths have no necessary relationship and may be different. However, the depths of tag FIFO queues 924b0-924b1, 924c0-924c1, 924d0-924d1 and 924e0-924e1 are preferably designed to be equal to that of LH tag FIFO queue 924a, and the depths of tag FIFO queues 924c2, 924d2 and 924e2 are preferably designed to be equal to that of NM tag FIFO queue 924b2.

Figure 12A:
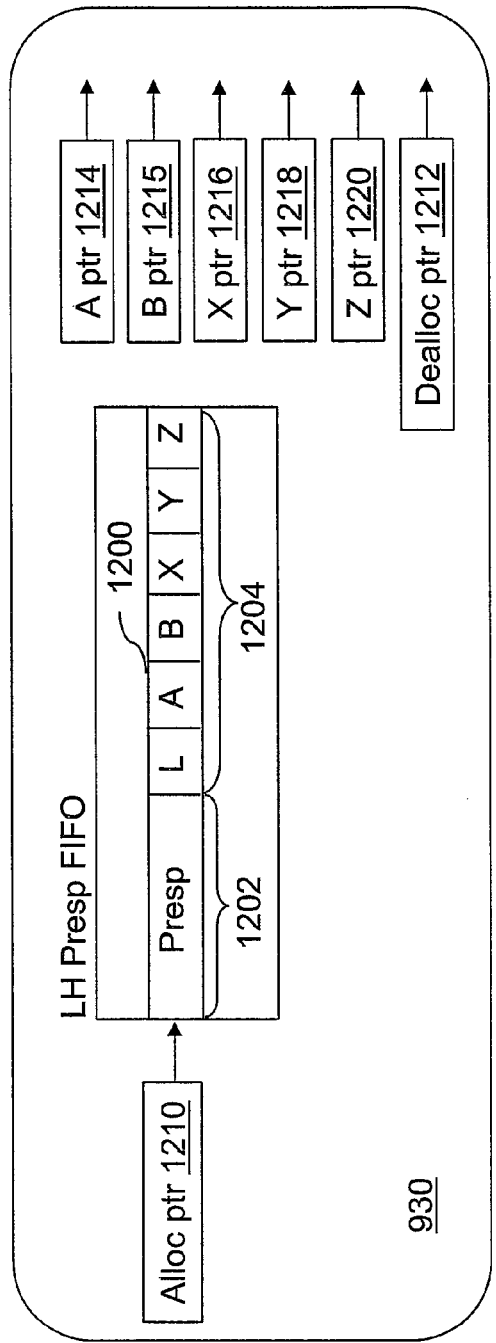
FIGS. 12A and 12B are more detailed block diagrams of the local hub partial response FIFO queue and remote hub partial response FIFO queue of FIG. 9, respectively.
Figure 12B:
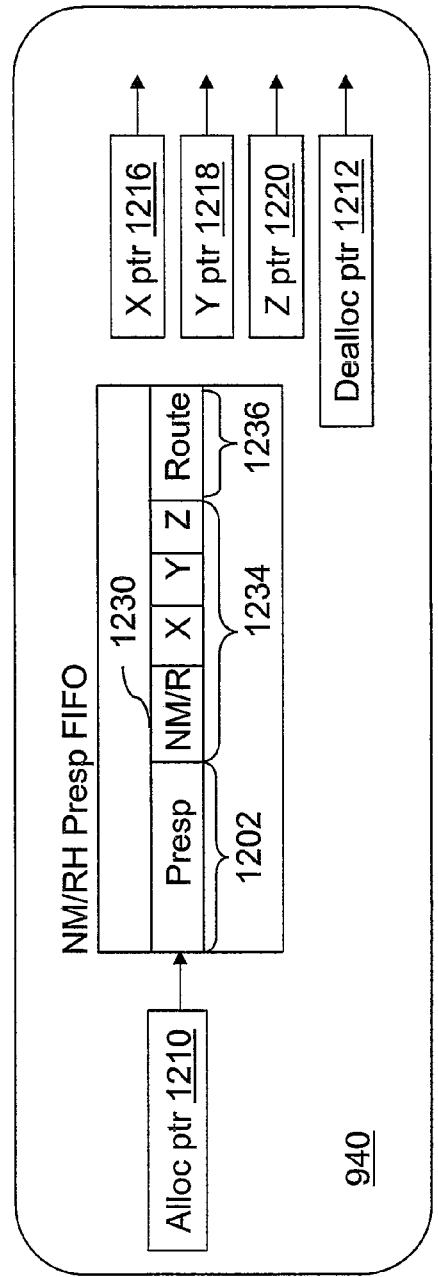

With reference now to FIGS. 12A and 12B, there are illustrated more detailed block diagrams of exemplary embodiments of the local hub (LH) partial response FIFO queue 930 and node master/remote hub (NM/RH) partial response FIFO queue 940 of FIG. 9. As indicated, LH partial response FIFO queue 930 includes a number of entries 1200 that each includes a partial response field 1202 for storing an accumulated partial response for a request and a response flag array 1204 having respective flags for each of the 6 possible sources from which the local hub 100 may receive a partial response (i.e., local (L), first tier X, Y, Z links, and second tier A and B links) at different times or possibly simultaneously. Entries 1200 within LH partial response FIFO queue 930 are allocated via an allocation pointer 1210 and deallocated via a deallocation pointer 1212. Various flags comprising response flag array 1204 are accessed utilizing A pointer 1214, B pointer 1215, X pointer 1216, Y pointer 1218, and Z pointer 1220.

As described further below, when a partial response for a particular request is received by partial response logic 121b at a local hub 100, the partial response is accumulated within partial response field 1202, and the link from which the partial response was received is recorded by setting the corresponding flag within response flag array 1204. The corresponding one of pointers 1214, 1215, 1216, 1218 and 1220 is then advanced to the subsequent entry 1200.

Of course, as described above, each processing unit 100 need not be fully coupled to other processing units 100 by each of its 5 inbound (X, Y, Z, A and B) links. Accordingly, flags within response flag array 1204 that are associated with unconnected links are ignored. The unconnected links, if any, of each processing unit 100 may be indicated, for example, by the configuration indicated in configuration register 123, which may be set, for example, by boot code at system startup or by the operating system when partitioning data processing system 200.

As can be seen by comparison of FIG. 12B and FIG. 12A, NM/RH partial response FIFO queue 940 is constructed similarly to LH partial response FIFO queue 930. NM/RH partial response FIFO queue 940 includes a number of entries 1230 that each includes a partial response field 1202 for storing an accumulated partial response and a response flag array 1234 having respective flags for each of the up to 4 possible sources from which the node master or remote hub 100 may receive a partial response (i.e., node master (NM)/remote (R), and first tier X, Y, and Z links). In addition, each entry 1230 includes a route field 1236 identifying whether the operation is a node-only or system-wide broadcast operation and, for system-wide broadcast operations, which of the inbound second tier links the request was received upon (and thus which of the outbound second tier links the accumulated partial response will be transmitted on). Entries 1230 within NM/RH partial response FIFO queue 940 are allocated via an allocation pointer 1210 and deallocated via a deallocation pointer 1212. Various flags comprising response flag array 1234 are accessed and updated utilizing X pointer 1216, Y pointer 1218, and Z pointer 1220.

As noted above with respect to FIG. 12A, each processing unit 100 need not be fully coupled to other processing units 100 by each of its first tier X, Y, and Z links. Accordingly, flags within response flag array 1204 that are associated with unconnected links are ignored. The unconnected links, if any, of each processing unit 100 may be indicated, for example, by the configuration indicated in configuration register 123.

Referring now to FIG. 13A, there is depicted a time-space diagram illustrating the tenure of an exemplary system-wide broadcast operation with respect to the exemplary data structures depicted in FIG. 9 through FIG. 12B. As shown at the top of FIG. 13A and as described previously with reference to FIG. 4A, the operation is issued by local master 100a0c to each local hub 100, including local hub 100a0b. Local hub 100a0b forwards the operation to remote hub 100b0a, which in turn forwards the operation to its remote leaves, including remote leaf 100b0d. The partial responses to the operation traverse the same series of links in reverse order back to local hubs 100a0a-100a0d, which broadcast the accumulated partial responses to each of local hubs 100a0a-100a0d. Local hubs 100a0a-100a0c, including local hub 100a0b, then distribute the combined response following the same transmission paths as the request. Thus, local hub 100a0b transmits the combined response to remote hub 100b0a, which transmits the combined response to remote leaf 100b0d.

As dictated by the timing constraints described above, the time from the initiation of the operation by local master 100a0c to its launch by the local hubs 100a0a, 100a0b, 100a0c and 100a0d is a variable time, the time from the launch of the operation by local hubs 100 to its receipt by the remote leaves 100 is a bounded time, the partial response latency from the remote leaves 100 to the local hubs 100 is a variable time, and the combined response latency from the local hubs 100 to the remote leaves 100 is a bounded time.

Against the backdrop of this timing sequence, FIG. 13A illustrates the tenures of various items of information within various data structures within data processing system 200 during the request phase, partial response phase, and combined response phase of an operation. In particular, the tenure of a request in a LH launch buffer 910 (and hence the tenure of a local hub token) is depicted at reference numeral 1300, the tenure of an entry in LH tag FIFO queue 924a is depicted at reference numeral 1302, the tenure of an entry 1200 in LH partial response FIFO queue 930 is depicted at block 1304, the tenure of an entry in a RH tag FIFO 924b0 or 924b1 is depicted at reference numeral 1306, the tenure of an entry 1230 in a NM/RH partial response FIFO queue 940 is depicted at reference numeral 1308, and the tenure of entries in RL tag FIFO queues 924c0-924c1, 924d0-924d1 and 924e0-924e1 is depicted at reference numeral 1310. FIG. 13A further illustrates the duration of a protection window 1312a and window extension 1312b (also 312a-312b of FIGS. 3 and 6) extended by the snooper within remote leaf 100b0d to protect the transfer of coherency ownership of the memory block to local master 100a0c from generation of its partial response until after receipt of the combined response. As shown at reference numeral 1314 (and also at 313 of FIGS. 3 and 6), local master 100a0c also protects the transfer of ownership from receipt of the combined response.

As indicated at reference numerals 1302, 1306 and 1310, the entries in the LH tag FIFO queue 924a, RH tag FIFO queues 924b0-924b1 and RL tag FIFO queues 924c0-924c1, 924d0-924d1 and 924e0-924e1 are subject to the longest tenures. Consequently, the minimum depth of tag FIFO queues 924 (which are generally designed to be the same) limits the maximum number of requests that can be in flight in data processing system 200 at any one time. In general, the desired depth of tag FIFO queues 924 can be selected by dividing the expected maximum latency from snooping of a request by an arbitrarily selected processing unit 100 to receipt of the combined response by that processing unit 100 by the maximum number of requests that can be issued given the selected link information allocation. Although the other queues (e.g., LH partial response FIFO queue 930 and NM/RH partial response FIFO queue 940) may safely be assigned shorter queue depths given the shorter tenure of their entries, for simplicity it is desirable in at least some embodiments to set the depth of LH partial response FIFO queue 930 to be the same as tag FIFO queues 924, and to set the depth of NM/RH partial response FIFO queue 940 to be equal to the depth of NM tag FIFO 924b2 plus t2/2 times the depth of RL tag FIFO queues 924.

FIG. 13B is a time-space diagram illustrating the tenure of an exemplary node-only broadcast operation with respect to the exemplary data structures depicted in FIG. 9 through FIG. 12B. As shown at the top of FIG. 13B and as described previously with reference to FIG. 4B, the operation is issued by node master 100b0a via its first tier links to each of its node leaves 100, including node leaf 100b0b. The partial responses to the operation traverse the first tier links back to node master 100b0a. Node master 100b0a then broadcasts the combined response via its first tier links to each of its node leaves 100, including node leaf 100b0b.

As dictated by the timing constraints described above, the time from the initiation of the operation by node master 100b0a to its transmission within the node leaves 100b0b, 100b0c, 100b0d is a bounded time, the partial response latency from the node leaves 100 to the node master 100b0a is a variable time, and the combined response latency from the node master 100b0a to the remote leaves 100 is a bounded time.

FIG. 13B further illustrates the tenures of various items of information within various data structures within data processing system 200 during the request phase, partial response phase, and combined response phase of a node-only broadcast operation. In particular, the tenure of an entry in NM tag FIFO 924b2 is depicted at reference numeral 1320, the tenure of an entry 1230 in a NM/RH partial response FIFO queue 940 is depicted at reference numeral 1322, and the tenure of the entries in NL tag FIFO queues 924c2, 924d2 and 924e2 is depicted at reference numeral 1324. No tenures are shown for LH launch buffer 910 (or the associated local hub token), LH tag FIFO queue 924a, or LH partial response FIFO queue 930 because these structures are not utilized for node-only broadcast operations.

FIG. 13B finally illustrates the duration of a protection window 1326 (also 312a of FIGS. 3 and 6) extended by the snooper within node leaf 100b0b, if necessary to protect the transfer of coherency ownership of the memory block to node master 100b0a from generation of its partial response until receipt of the combined response. As shown at reference numeral 1328 (and also at 313 of FIGS. 3 and 6), node master 100b0a also protects the transfer of ownership from receipt of the combined response. For node-only broadcast operations, no window extension 312b is required to meet the timing constraints set forth above.

Figure 14A:
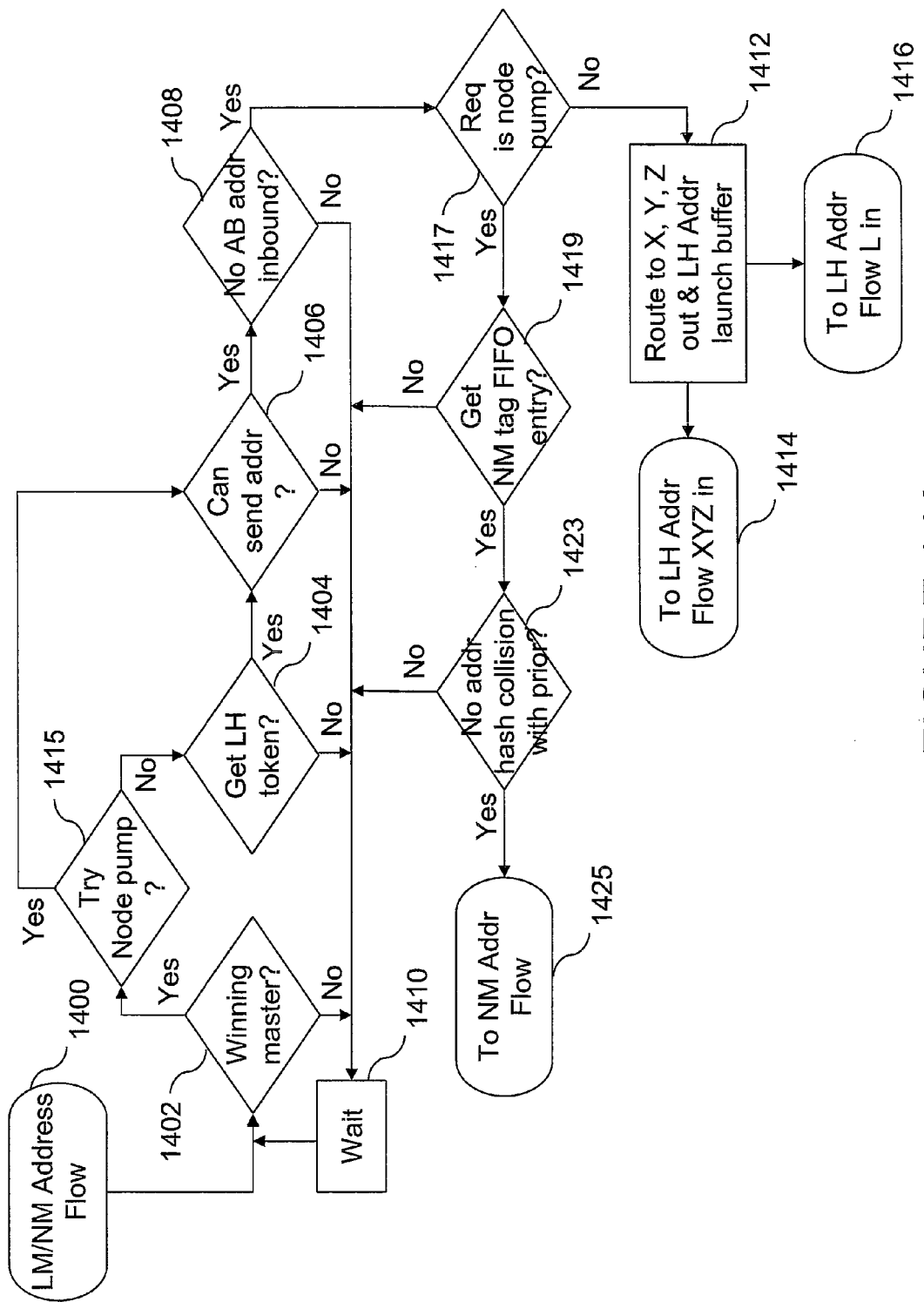
FIGS. 14A-14D are flowcharts respectively depicting the request phase of an operation at a local master, local hub, remote hub, and remote leaf.

With reference now to FIG. 14A-14D, flowcharts are given that respectively depict exemplary processing of an operation during the request phase at a local master (or node master), local hub, remote hub (or node master), and remote leaf (or node leaf) in accordance with an exemplary embodiment of the present invention. Referring now specifically to FIG. 14A, request phase processing at the local master (or node master, if a node-only broadcast) 100 begins at block 1400 with the generation of a request by a particular master 300 (e.g., one of masters 112 within an L2 cache 110 or a master within an I/O controller 128) within a local master 100. Following block 1400, the process proceeds to blocks 1402, 1404, 1406, and 1408, each of which represents a condition on the issuance of the request by the particular master 300. The conditions illustrated at blocks 1402 and 1404 represent the operation of master multiplexer 900, and the conditions illustrated at block 1406 and 1408 represent the operation of request multiplexer 904.

Turning first to blocks 1402 and 1404, master multiplexer 900 outputs the request of the particular master 300 if the fair arbitration policy governing master multiplexer 900 selects the request of the particular master 300 from the requests of (possibly) multiple competing masters 300 (block 1402) and, if the request is a system-wide broadcast, if a local hub token is available for assignment to the request (block 1404). As indicated by block 1415, if the master 300 selects the scope of its request to have a node-only scope (for example, by reference to a setting of configuration register 123 and/or a scope prediction mechanism, such as that described in above-referenced U.S. patent application Ser. No. 11/055,305, no local hub token is required, and the condition illustrated at block 1404 is omitted.

Assuming that the request of the particular master 300 progresses through master multiplexer 900 to request multiplexer 904, request multiplexer 904 issues the request on request bus 905 only if a address tenure is then available for a request in the outbound first tier link information allocation (block 1406). That is, the output of request multiplexer 904 is timeslice aligned with the selected link information allocation and will only generate an output during cycles designed to carry a request (e.g., cycle 0 or 2 of the embodiment of FIG. 7A or cycle 0 of the embodiment of FIG. 8A). As further illustrated at block 1408, request multiplexer 904 will only issue a request if no request from the inbound second tier A and B links is presented by remote hub multiplexer 903 (block 1406), which is always given priority. Thus, the second tier links are guaranteed to be non-blocking with respect to inbound requests. Even with such a non-blocking policy, requests by masters 300 can prevented from "starving" through implementation of an appropriate policy in the arbiter 1032 of the upstream hubs that prevents "brickwalling" of requests during numerous consecutive address tenures on the inbound A and B link of the downstream hub.

If a negative determination is made at any of blocks 1402-1408, the request is delayed, as indicated at block 1410, until a subsequent cycle during which all of the determinations illustrated at blocks 1402-1408 are positive. If, on the other hand, positive determinations are made at all of blocks 1402-1408, the process proceeds to block 1417. Block 1417 represents that requests of node-only scope (as indicated by scope indicator 730 of Ttype field 700 or scope indicator 830 of Ttype field 800) are subject to two additional conditions illustrated at blocks 1419 and 1423. First, as shown at block 1419, if the request is a node-only broadcast request, request multiplexer 904 will issue the request only if an entry is available for allocation to the request in NM tag FIFO queue 924b2. If not, the process passes from block 1419 to block 1410, which has been described.

Second, as depicted at block 1423, request multiplexer 904 will issue a request of node-only scope only if the request address does not hash to the same bank 1912 of a banked resource 1910 as any of a selected number of prior requests buffered within previous request FIFO buffer 907. For example, assuming that a snooping device 1900 and its associated resource 1910 are constructed so that snooping device 1900 cannot service requests at the maximum request arrival rate, but can instead service requests at a fraction of the maximum arrival rate expressed as 1/R, the selected number of prior requests with which the current node-only request vying for launch by request multiplexer 904 is compared to determine if it falls in the same address slice is preferably R-1. If multiple different snooping devices 1900 are to be protected in this manner from request overrun, the selected number of requests R-1 is preferably set to the maximum of the set of quantities R-1 calculated for the individual snooping devices 1900. Because processing units 100 preferably do not coordinate their selection of requests for broadcast, the throttling of requests in the manner illustrated at block 1423 does not guarantee that the arrival rate of requests at a particular snooping device 1900 will not exceed the service rate of the snooping device 1900. However, the throttling of node-only broadcast requests in the manner shown will limit the number of requests that can arrive in a given number of cycles, which can be expressed as:

$$\text{throttled\_arr\_rate} = PU \text{ requests per } R \text{ cycles}$$

where PU is the number of processing units 100 per processing node 202. Snooping devices 1900 are preferably designed to handle node-only broadcast requests arriving at such a throttled arrival rate without retry.

If the condition shown at block 1423 is not satisfied, the process passes from block 1423 to block 1410, which has been described. However, if both of the conditions illustrated at blocks 1419 and 1423 are satisfied, request multiplexer 904 issues the node-only broadcast request on request bus 905, and the process passes through page connector 1425 to block 1427 of FIG. 14C.

Returning again to block 1417, if the request is system-wide broadcast request rather than a node-only broadcast request, the process proceeds to block 1412, beginning tenure 1300 of FIG. 13. Block 1412 depicts request multiplexer 904 broadcasting the request on request bus 905 to each of the outbound X, Y and Z links and to the local hub address launch buffer 910. Thereafter, the process bifurcates and passes through page connectors 1414 and 1416 to FIG. 14B, which illustrates the processing of the request at each of the local hubs 100.

Figure 14B:
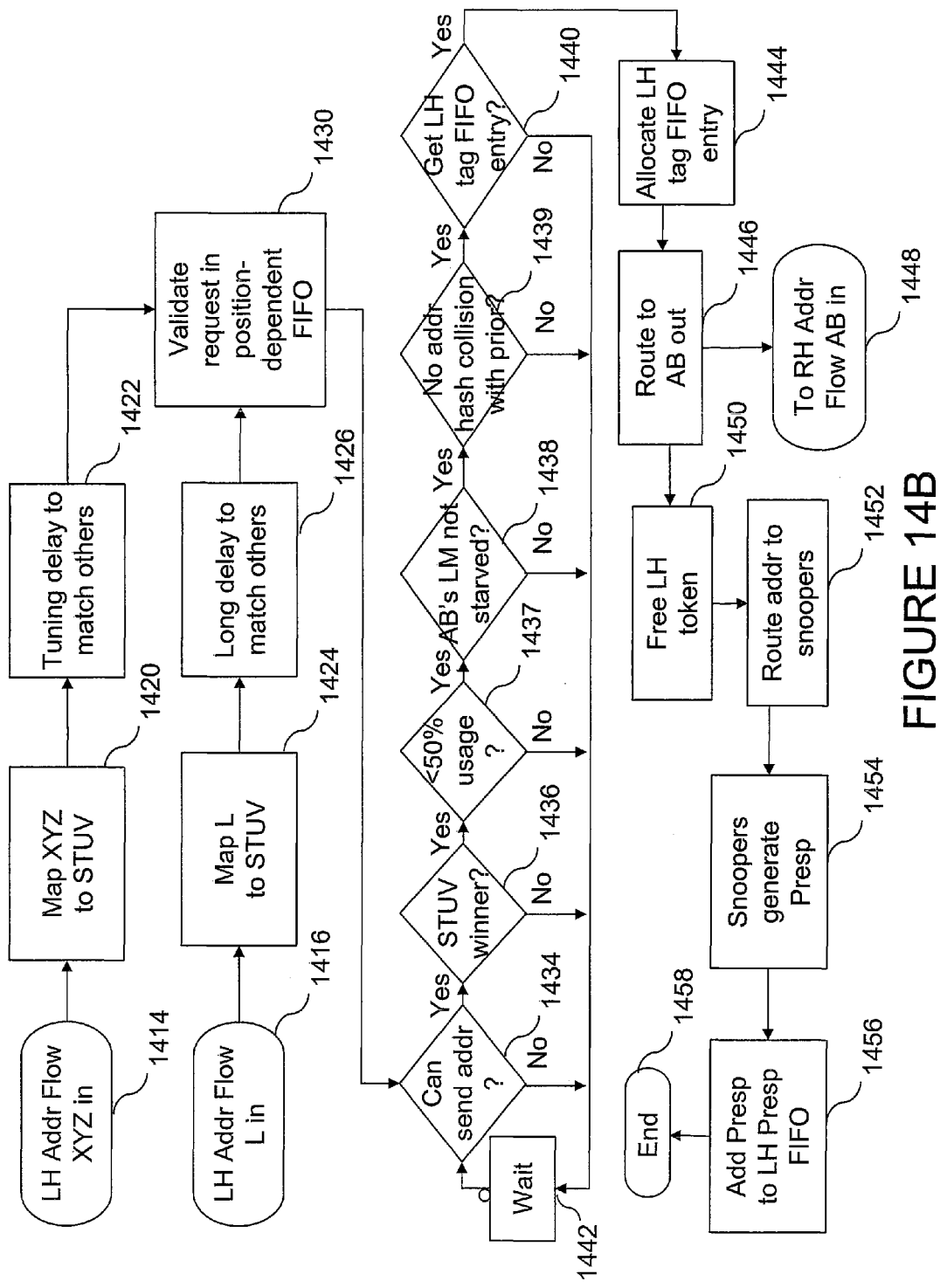

With reference now to FIG. 14B, processing of the request at the local hub 100 that is also the local master 100 is illustrated beginning at block 1416, and processing of the request at each of the other local hubs 100 in the same processing node 202 as the local master 100 is depicted beginning at block 1414. Turning first to block 1414, requests received by a local hub 100 on the inbound X, Y and Z links are received by LH address launch buffer 910. As depicted at block 1420 and in FIG. 10, map logic 1010 maps each of the X, Y and Z requests to the appropriate ones of position-dependent FIFO queues 1020a-1020d for buffering. As noted above, requests received on the X, Y and Z links and placed within position-dependent queues 1020a-1020d are not immediately validated. Instead, the requests are subject to respective ones of tuning delays 1000a-1000d, which synchronize the handling of the X, Y and Z requests and the local request on a given local hub 100 with the handling of the corresponding requests at the other local hubs 100 in the same processing node 202 (block 1422). Thereafter, as shown at block 1430, the tuning delays 1000 validate their respective requests within position-dependent FIFO queues 1020a-1020d.

Referring now to block 1416, at the local master/local hub 100, the request on request bus 905 is fed directly into LH address launch buffer 910. Because no inter-chip link is traversed, this local request arrives at LH address launch FIFO 910 earlier than requests issued in the same cycle arrive on the inbound X, Y and Z links. Accordingly, following the mapping by map logic 1010, which is illustrated at block 1424, one of tuning delays 1000a-100d applies a long delay to the local request to synchronize its validation with the validation of requests received on the inbound X, Y and Z links (block 1426). Following this delay interval, the relevant tuning delay 1000 validates the local request, as shown at block 1430.

Following the validation of the requests queued within LH address launch buffer 910 at block 1430, the process then proceeds to blocks 1434-1440, each of which represents a condition on the issuance of a request from LH address launch buffer 910 enforced by arbiter 1032. As noted above, the arbiters 1032 within all processing units 100 are synchronized so that the same decision is made by all local hubs 100 without inter-communication. As depicted at block 1434, an arbiter 1032 permits local hub request multiplexer 1030 to output a request only if an address tenure is then available for the request in the outbound second tier link information allocation. Thus, for example, arbiter 1032 causes local hub request multiplexer 1030 to initiate transmission of requests only during cycle 0 or 2 of the embodiment of FIG. 7B or cycle 0 of the embodiment of FIG. 8B. In addition, a request is output by local hub request multiplexer 1030 if the fair arbitration policy implemented by arbiter 1032 determines that the request belongs to the position-dependent FIFO queue 1020a-1020d that should be serviced next (block 1436).

As depicted further at blocks 1437 and 1438, arbiter 1032 causes local hub request multiplexer 1030 to output a request only if it determines that it has not been outputting too many requests in successive address tenures. Specifically, at shown at block 1437, to avoid overdriving the request buses 905 of the hubs 100 connected to the outbound A and B links, arbiter 1032 assumes the worst case (i.e., that the upstream hub 100 connected to the other second tier link of the downstream hub 100 is transmitting a request in the same cycle) and launches requests during no more than half (i.e., 1/t2) of the available address tenures. In addition, as depicted at block 1438, arbiter 1032 further restricts the launch of requests below a fair allocation of the traffic on the second tier links to avoid possibly "starving" the masters 300 in the processing units 100 coupled to its outbound A and B links.

For example, given the embodiment of FIG. 2, where there are 2 pairs of second tier links and 4 processing units 100 per processing node 202, traffic on the request bus 905 of the downstream hub 100 is subject to contention by up to 9 processing units 100, namely, the 4 processing units 100 in each of the 2 processing nodes 202 coupled to the downstream hub 100 by second tier links and the downstream hub 100 itself. Consequently, an exemplary fair allocation policy that divides the bandwidth of request bus 905 evenly among the possible request sources allocates 4/9 of the bandwidth to each of the inbound A and B links and 1/9 of the bandwidth to the local masters 300. Generalizing for any number of first and second tier links, the fraction of the available address frames allocated consumed by the exemplary fair allocation policy employed by arbiter 1032 can be expressed as:

$$\text{fraction}=(t1/2+1)/(t2/2*(t1/2+1)+1)$$

where t1 and t2 represent the total number of first and second tier links to which a processing unit 100 may be coupled, the quantity "t1/2+1" represents the number of processing units 100 per processing node 202, the quantity "t2/2" represents the number of processing nodes 202 to which a downstream hub 100 may be coupled, and the constant quantity "1" represents the fractional bandwidth allocated to the downstream hub 100.

As shown at block 1439, arbiter 1032 further throttles the transmission of system-wide broadcast requests by issuing a system-wide broadcast request only if the request address does not hash to the same bank 1912 of a banked resource 1910 as any of a R-1 prior requests buffered within previous request FIFO buffer 911, where 1/R is the fraction of the maximum arrival rate at which the slowest protected snooping device 1900 can service requests. Thus, the throttling of system-wide broadcast requests in the manner shown will limit the number of requests that can arrive at a given snooping device 1900 in a given number of cycles, which can be expressed as:

$$\text{throttled\_arr\_rate}=N \text{ requests per R cycles}$$

where N is the number of processing nodes 202. Snooping devices 1900 are preferably designed to handle requests arriving at such a throttled arrival rate without retry.

Referring finally to the condition shown at block 1440, arbiter 1032 permits a request to be output by local hub request multiplexer 1030 only if an entry is available for allocation in LH tag FIFO queue 924a (block 1440).

If a negative determination is made at any of blocks 1434-1440, the request is delayed, as indicated at block 1442, until a subsequent cycle during which all of the determinations illustrated at blocks 1434-1440 are positive. If, on the other hand, positive determinations are made at all of blocks 1434-1440, arbiter 1032 signals local hub request multiplexer 1030 to output the selected request to an input of multiplexer 920, which always gives priority to a request, if any, presented by LH address launch buffer 910. Thus, multiplexer 920 issues the request on snoop bus 922. It should be noted that the other ports of multiplexer 920 (e.g., RH, RLX, RLY, and RLZ) could present requests concurrently with LH address launch buffer 910, meaning that the maximum bandwidth of snoop bus 922 must equal 10/8 (assuming the embodiment of FIG. 7B) or 5/6 (assuming the embodiment of FIG. 8B) of the bandwidth of the outbound A and B links in order to keep up with maximum arrival rate.

It should also be observed that only requests buffered within local hub address launch buffer 910 are transmitted on the outbound A and B links and are required to be aligned with address tenures within the link information allocation. Because all other requests competing for issuance by multiplexer 920 target only the local snoopers 304 and their respective FIFO queues rather than the outbound A and B links, such requests may be issued in the remaining cycles of the information frames. Consequently, regardless of the particular arbitration scheme employed by multiplexer 920, all requests concurrently presented to multiplexer 920 are guaranteed to be transmitted within the latency of a single information frame.

As indicated at block 1444, in response to the issuance of the request on snoop bus 922, LH tag FIFO queue 924a records the master tag specified in the request in the master tag field 1100 of the next available entry, beginning tenure 1302. The request is then routed to the outbound A and B links, as shown at block 1446. The process then passes through page connector 1448 to FIG. 14B, which depicts the processing of the request at each of the remote hubs during the request phase.

The process depicted in FIG. 14B also proceeds from block 1446 to block 1450, which illustrates local hub 100 freeing the local hub token allocated to the request in response to the removal of the request from LH address launch buffer 910, ending tenure 1300. The request is further routed to the snoopers 304 in the local hub 100, as shown at block 1452. In response to receipt of the request, snoopers 304 generate a partial response (block 1454), which is recorded within LH partial response FIFO queue 930, beginning tenure 1304 (block 1456). In particular, at block 1456, an entry 1200 in the LH partial response FIFO queue 930 is allocated to the request by reference to allocation pointer 1210, allocation pointer 1210 is incremented, the partial response of the local hub is placed within the partial response field 1202 of the allocated entry, and the local (L) flag is set in the response flag field 1204. Thereafter, request phase processing at the local hub 100 ends at block 1458.

Figure 14C:
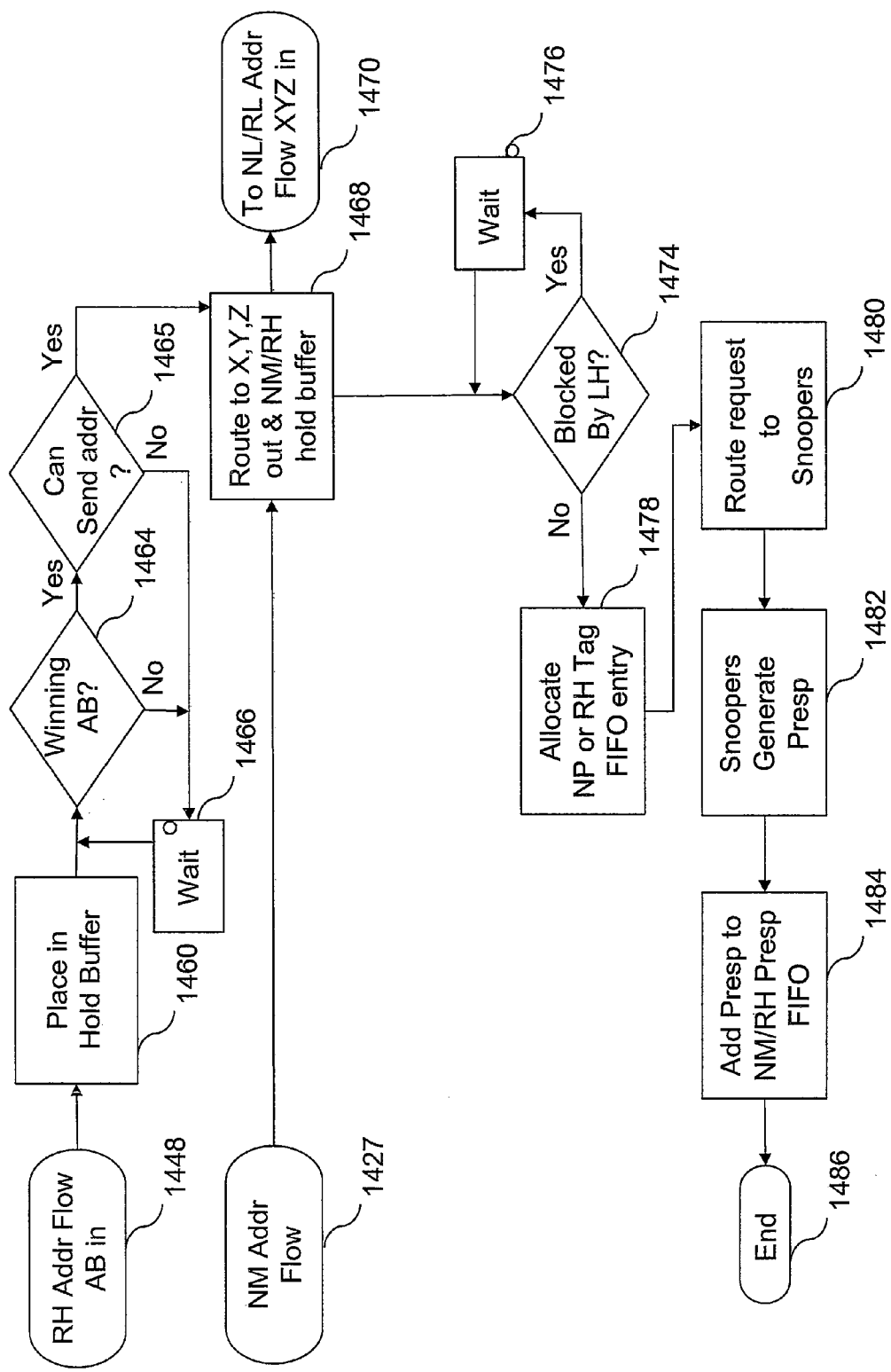

Referring now to FIG. 14C, there is depicted a high level logical flowchart of an exemplary method of request processing at a remote hub (or for a node-only broadcast request, a node master) 100 in accordance with the present invention. As depicted, for a system-wide broadcast request, the process begins at page connector 1448 upon receipt of the request at the remote hub 100 on one of its inbound A and B links. As noted above, after the request is latched into a respective one of hold buffers 902a-902b as shown at block 1460, the request is evaluated by remote hub multiplexer 903 and request multiplexer 904 for transmission on request bus 905, as depicted at blocks 1464 and 1465. Specifically, at block 1464, remote hub multiplexer 903 determines whether to output the request in accordance with a fair allocation policy that evenly allocates address tenures to requests received on the inbound second tier links. In addition, at illustrated at block 1465, request multiplexer 904, which is timeslice-aligned with the first tier link information allocation, outputs a request only if an address tenure is then available. Thus, as shown at block 1466, if a request is not a winning request under the fair allocation policy of multiplexer 903 or if no address tenure is then available, multiplexer 904 waits for the next address tenure. It will be appreciated, however, that even if a request received on an inbound second tier link is delayed, the delay will be no more than one frame of the first tier link information allocation.

If both the conditions depicted at blocks 1464 and 1465 are met, multiplexer 904 launches the request on request bus 905, and the process proceeds from block 1465 to block 1468. As indicated, request phase processing at the node master 100, which continues at block 1423 from block 1421 of FIG. 14A, also passes to block 1468. Block 1468 illustrates the routing of the request issued on request bus 905 to the outbound X, Y and Z links, as well as to NM/RH hold buffer 906. Following block 1468, the process bifurcates. A first path passes through page connector 1470 to FIG. 14D, which illustrates an exemplary method of request processing at the remote (or node) leaves 100. The second path from block 1468 proceeds to block 1474, which illustrates the snoop multiplexer 920 determining which of the requests presented at its inputs to output on snoop bus 922. As indicated, snoop multiplexer 920 prioritizes local hub requests over remote hub requests, which are in turn prioritized over requests buffered in NL/RL hold buffers 914a-914c. Thus, if a local hub request is presented for selection by LH address launch buffer 910, the request buffered within NM/RH hold buffer 906 is delayed, as shown at block 1476. If, however, no request is presented by LH address launch buffer 910, snoop multiplexer 920 issues the request from NM/RH hold buffer 906 on snoop bus 922.

In response to detecting the request on snoop bus 922, the appropriate one of tag FIFO queues 924b (i.e., for node-only broadcast requests, NM tag FIFO queue 924b2, and for system-wide broadcast request, the one of RH tag FIFO queues 924b0 and 924b1 associated with the inbound second tier link on which the request was received) places the master tag specified by the request into master tag field 1100 of its next available entry, beginning tenure 1306 or 1320 (block 1478). As noted above, node-only broadcast requests and system-wide broadcast requests are differentiated by a scope indicator 730 or 830 within the Ttype field 700 or 800 of the request. The request is further routed to the snoopers 304 in the remote hub 100, as shown at block 1480. In response to receipt of the request, snoopers 304 generate a partial response at block 1482, which is recorded within NM/RH partial response FIFO queue 940, beginning tenure 1308 or 1322 (block 1484). In particular, an entry 1230 in the NM/RH partial response FIFO queue 940 is allocated to the request by reference to its allocation pointer 1210, the allocation pointer 1210 is incremented, the partial response of the remote hub is placed within the partial response field 1202, and the node master/remote flag (NM/R) is set in the response flag field 1234. It should be noted that NM/RH partial response FIFO queue 940 thus buffers partial responses for operations of differing scope in the same data structure. Thereafter, request phase processing at the remote hub 100 ends at block 1486.

Figures 14D, 14E:
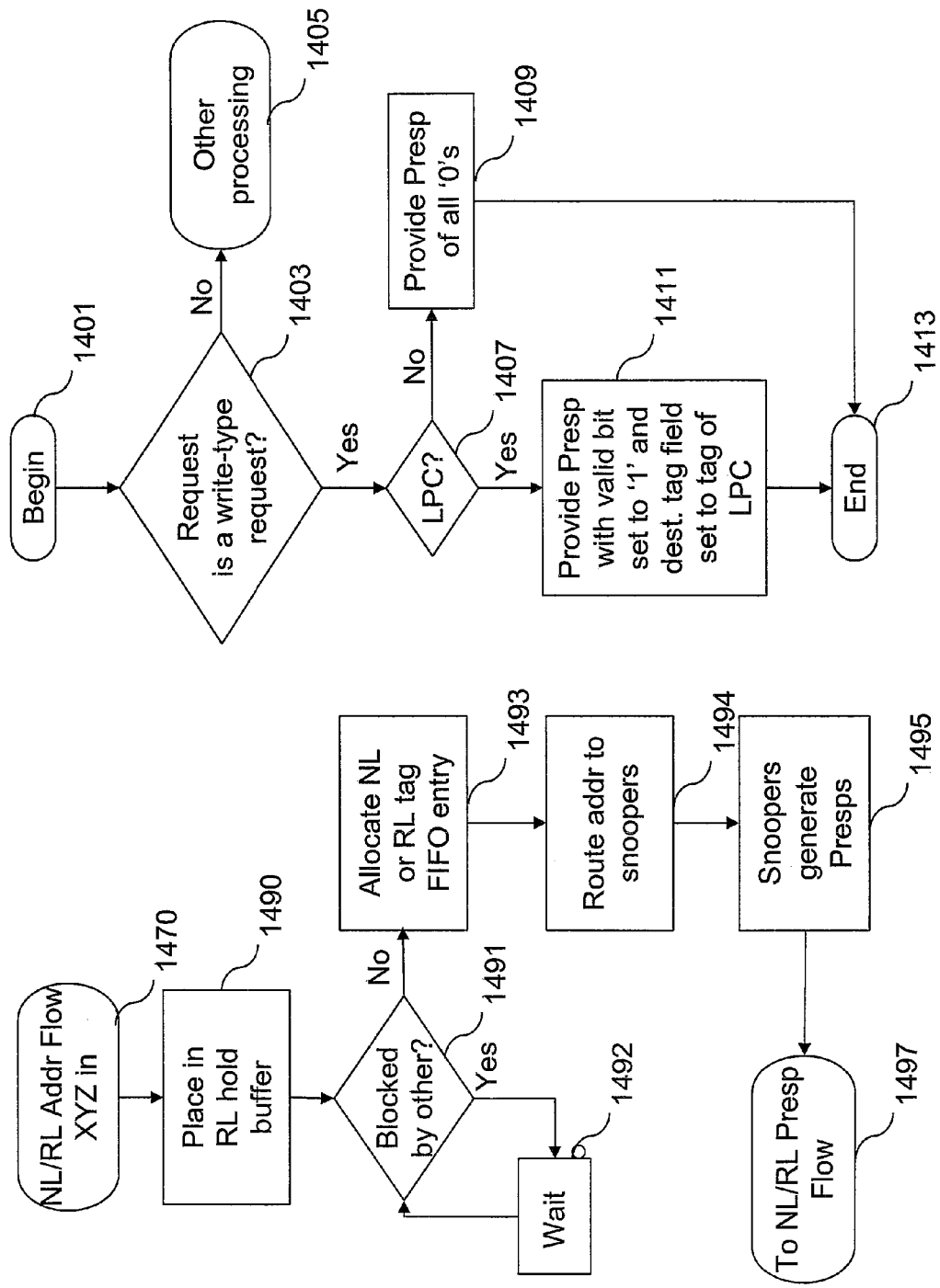
FIG. 14E is a high level logical flowchart of an exemplary method of generating a partial response at a snooper in accordance with the present invention.

With reference now to FIG. 14D, there is illustrated a high level logical flowchart of an exemplary method of request processing at a remote leaf (or node leaf) 100 in accordance with the present invention. As shown, the process begins at page connector 1470 upon receipt of the request at the remote leaf or node leaf 100 on one of its inbound X, Y and Z links. As indicated at block 1490, in response to receipt of the request, the request is latched into of the particular one of NL/RL hold buffers 914a-914c associated with the first tier link upon which the request was received. Next, as depicted at block 1491, the request is evaluated by snoop multiplexer 920 together with the other requests presented to its inputs. As discussed above, snoop multiplexer 920 prioritizes local hub requests over remote hub requests, which are in turn prioritized over requests buffered in NL/RL hold buffers 914a-914c. Thus, if a local hub or remote hub request is presented for selection, the request buffered within the NL/RL hold buffer 914 is delayed, as shown at block 1492. If, however, no higher priority request is presented to snoop multiplexer 920, snoop multiplexer 920 issues the request from the NL/RL hold buffer 914 on snoop bus 922, fairly choosing between X, Y and Z requests.

In response to detecting request on snoop bus 922, the particular one of tag FIFO queues 924c0-924c2, 924d0-924c2 and 924e0-924e2 associated with the scope of the request and the route by which the request was received places the master tag specified by the request into the master tag field 1100 of its next available entry, beginning tenure 1310 or 1324 (block 1493). That is, the scope indicator 730 or 830 within the Ttype field 700 or 800 of the request is utilized to determine whether the request is of node-only or system-wide scope. As noted above, for node-only broadcast requests, the particular one of NL tag FIFO queues 924c2, 924d2 and 924e2 associated with the inbound first tier link upon which the request was received buffers the master tag. For system-wide broadcast requests, the master tag is placed in the particular one of RL tag FIFO queues 924c0-924c1, 924d0-924d1 and 924e0-924e1 corresponding to the combination of inbound first and second tier links upon which the request was received. The request is further routed to the snoopers 304 in the remote leaf 100, as shown at block 1494. In response to receipt of the request, the snoopers 304 process the request, generate their respective partial responses, and accumulate the partial responses to obtain the partial response of that processing unit 100 (block 1495). As indicated by page connector 1497, the partial response of the snoopers 304 of the remote leaf or node leaf 100 is handled in accordance with FIG. 16A, which is described below.

FIG. 14E is a high level logical flowchart of an exemplary method by which snooper s304 generate partial responses for requests, for example, at blocks 1454, 1482 and 1495 of FIGS. 14B-14D. The process begins at block 1401 in response to receipt by a snooper 304 (e.g., an IMC snooper 126, L2 cache snooper 116 or a snooper within an I/O controller 128) of a request. In response to receipt of the request, the snooper 304 determines by reference to the transaction type specified by the request whether or not the request is a write-type request, such as a castout request, write request, or partial write request. In response to the snooper 304 determining at block 1403 that the request is not a write-type request (e.g., a read or RWITM request), the process proceeds to block 1405, which illustrates the snooper 304 generating the partial response for the request, if required, by conventional processing. If, however, the snooper 304 determines that the request is write-type request, the process proceeds to block 1407.

Block 1407 depicts the snooper 304 determining whether or not it is the LPC for the request address specified by the write-type request. For example, snooper 304 may make the illustrated determination by reference to one or more base address registers (BARs) and/or address hash functions specifying address range(s) for which the snooper 304 is responsible (i.e., the LPC). If snooper 304 determines that it is not the LPC for the request address, the process passes to block 1409. Block 1409 illustrates snooper 304 generating a write request partial response 720 (FIG. 7C) in which the valid field 722 and the destination tag field 724 are formed of all '0's, thereby signifying that the snooper 304 is not the LPC for the request address. If, however, snooper 304 determines at block 1407 that it is the LPC for the request address, the process passes to block 1411, which depicts snooper 304 generating a write request partial response 720 in which valid field 722 is set to '1' and destination tag field 724 specifies a destination tag or route that uniquely identifies the location of snooper 304 within data processing system 200. Following either of blocks 1409 or 1411, the process shown in FIG. 14E ends at block 1413.

VII. Partial Response Phase Structure and Operation

Figure 15:
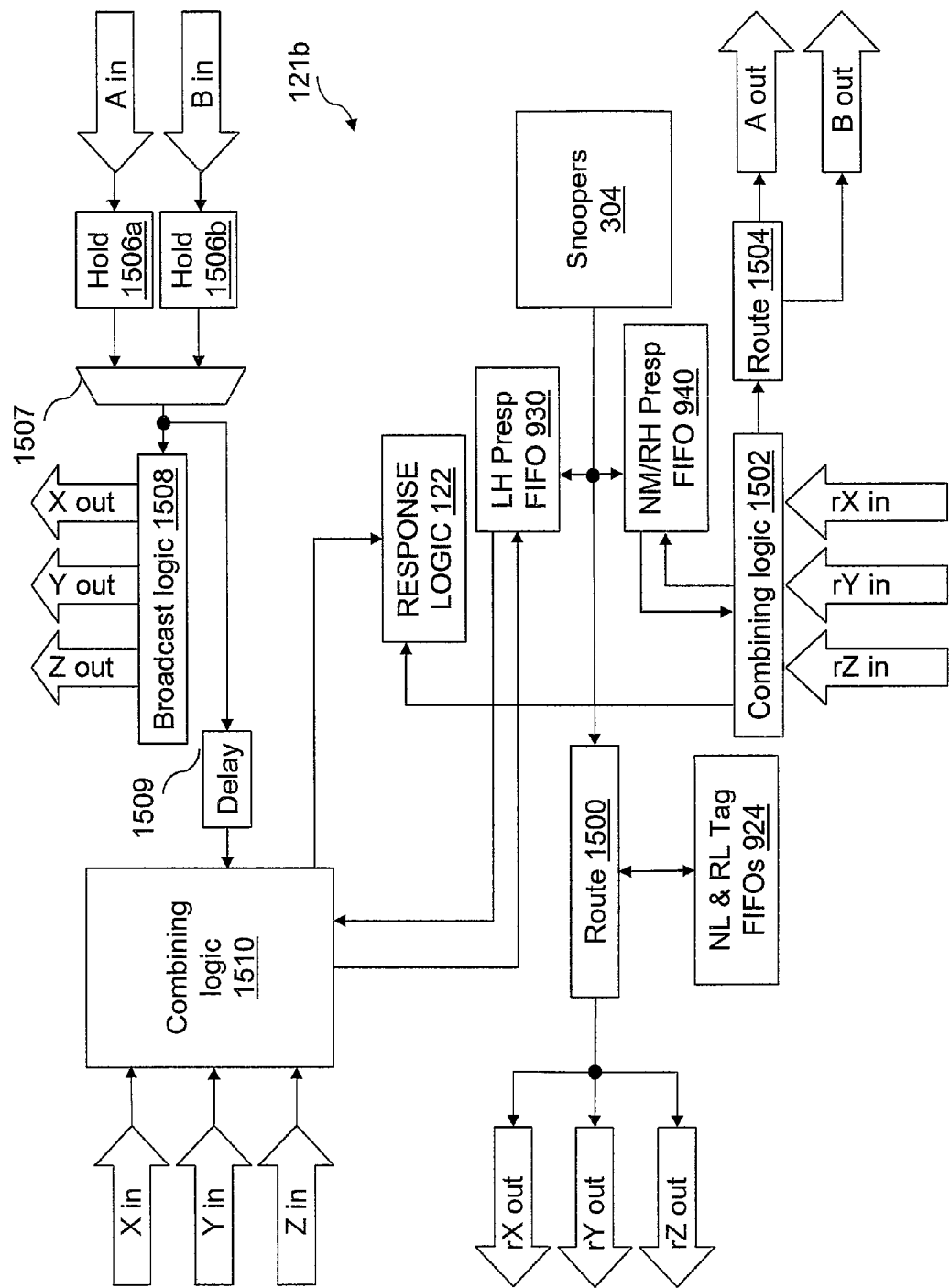
FIG. 15 is a block diagram illustrating a portion of the interconnect logic of FIG. 1 utilized in the partial response phase of an operation.

Referring now to FIG. 15, there is depicted a block diagram illustrating an exemplary embodiment of the partial response logic 121b within interconnect logic 120 of FIG. 1. As shown, partial response logic 121b includes route logic 1500 that routes a remote partial response generated by the snoopers 304 at a remote leaf (or node leaf) 100 back to the remote hub (or node master) 100 from which the request was received via the appropriate one of outbound first tier X, Y and Z links. In addition, partial response logic 121b includes combining logic 1502 and route logic 1504. Combining logic 1502 accumulates partial responses received from remote (or node) leaves 100 with other partial response(s) for the same request that are buffered within NM/RH partial response FIFO queue 940. For a node-only broadcast operation, the combining logic 1502 of the node master 100 provides the accumulated partial response directly to response logic 122. For a system-wide broadcast operation, combining logic 1502 supplies the accumulated partial response to route logic 1504, which routes the accumulated partial response to the local hub 100 via one of outbound A and B links.

Partial response logic 121b further includes hold buffers 1506a-1506b, which receive and buffer partial responses from remote hubs 100, a multiplexer 1507, which applies a fair arbitration policy to select from among the partial responses buffered within hold buffers 1506a-1506b, and broadcast logic 1508, which broadcasts the partial responses selected by multiplexer 1507 to each other processing unit 100 in its processing node 202. As further indicated by the path coupling the output of multiplexer 1507 to programmable delay 1509, multiplexer 1507 performs a local broadcast of the partial response that is delayed by programmable delay 1509 by approximately one first tier link latency so that the locally broadcast partial response is received by combining logic 1510 at approximately the same time as the partial responses received from other processing units 100 on the inbound X, Y and Z links. Combining logic 1510 accumulates the partial responses received on the inbound X, Y and Z links and the locally broadcast partial response received from an inbound second tier link with the locally generated partial response (which is buffered within LH partial response FIFO queue 930) and passes the accumulated partial response to response logic 122 for generation of the combined response for the request.

Figure 16C:
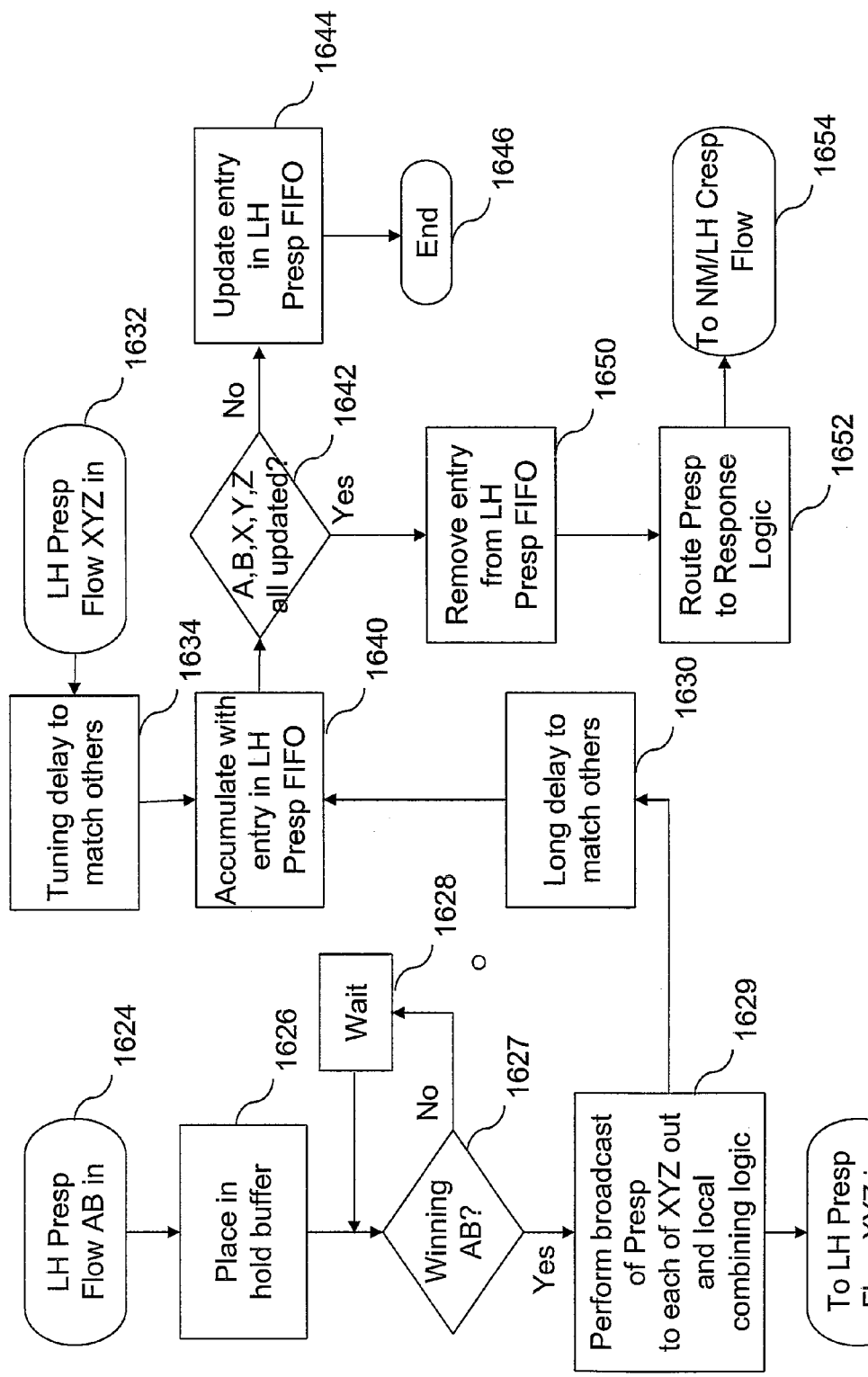

With reference now to FIGS. 16A-16C, there are illustrated flowcharts respectively depicting exemplary processing during the partial response phase of an operation at a remote leaf (or node leaf), remote hub (or node master), and local hub. In these figures, transmission of partial responses may be subject to various delays that are not explicitly illustrated. However, because there is no timing constraint on partial response latency as discussed above, such delays, if present, will not induce errors in operation and are accordingly not described further herein.

Referring now specifically to FIG. 16A, partial response phase processing at the remote leaf (or node leaf) 100 begins at block 1600 when the snoopers 304 of the remote leaf (or node leaf) 100 generate partial responses for the request. As shown at block 1602, route logic 1500 then routes, using the remote partial response field 712 or 812 of the link information allocation, the partial response to the remote hub 100 for the request via the outbound X, Y or Z link corresponding to the inbound first tier link on which the request was received. As indicated above, the inbound first tier link on which the request was received is indicated by which one of tag FIFO queues 924c0-924c2, 924d0-924d2 and 924e0-924e2 holds the master tag for the request. Thereafter, partial response processing continues at the remote hub (or node master) 100, as indicated by page connector 1604 and as described below with reference to FIG. 16B.

With reference now to FIG. 16B, there is illustrated a high level logical flowchart of an exemplary embodiment of a method of partial response processing at a remote hub (or node master) in accordance with the present invention. The illustrated process begins at page connector 1604 in response to receipt of the partial response of one of the remote leaves (or node leaves) 100 coupled to the remote hub (or node master) 100 by one of the first tier X, Y and Z links. In response to receipt of the partial response, combining logic 1502 reads out the entry 1230 within NM/RH partial response FIFO queue 940 allocated to the operation. The entry is identified by the FIFO ordering observed within NM/RH partial response FIFO queue 940, as indicated by the X, Y or Z pointer 1216-1220 associated with the link on which the partial response was received. Combining logic 1502 then accumulates the partial response of the remote (or node) leaf 100 with the contents of the partial response field 1202 of the entry 1230 that was read. As mentioned above, the accumulation operation is preferably a non-destructive operation, such as a logical OR operation. Next, combining logic 1502 determines at block 1614 by reference to the response flag array 1234 of the entry 1230 whether, with the partial response received at block 1604, all of the remote leaves 100 have reported their respective partial responses. If not, the process proceeds to block 1616, which illustrates combining logic 1502 updating the partial response field 1202 of the entry 1230 allocated to the operation with the accumulated partial response, setting the appropriate flag in response flag array 1234 to indicate which remote leaf 100 provided a partial response, and advancing the associated one of pointers 1216-1220. Thereafter, the process ends at block 1618.

Referring again to block 1614, in response to a determination by combining logic 1502 that all remote (or node) leaves 100 have reported their respective partial responses for the operation, combining logic 1502 deallocates the entry 1230 for the operation from NM/RH partial response FIFO queue 940 by reference to deallocation pointer 1212, ending tenure 1308 or 1322 (block 1620). As indicated by blocks 1621 and 1623, if the route field 1236 of the entry indicates that the operation is a node-only broadcast operation, combining logic 1502 provides the accumulated partial response directly to response logic 122. Thereafter, the process passes through page connector 1625 to FIG. 18A, which is described below. Returning to block 1621, if the route field 1236 of the deallocated entry indicates that the operation is a system-wide broadcast operation rather than a node-only broadcast operation, combining logic 1502 instead routes the accumulated partial response to the particular one of the outbound A and B links indicated by the contents of route field 1236 utilizing the remote partial response field 712 or 812 in the link allocation information, as depicted at block 1622. Thereafter, the process passes through page connector 1624 to FIG. 16C.

Referring now to FIG. 16C, there is depicted a high level logical flowchart of an exemplary method of partial response processing at a local hub 100 (including the local master 100) in accordance with an embodiment of the present invention. The process begins at block 1624 in response to receipt at the local hub 100 of a partial response from a remote hub 100 via one of the inbound A and B links. Upon receipt, the partial response is placed within the hold buffer 1506a, 1506b coupled to the inbound second tier link upon which the partial response was received (block 1626). As indicated at block 1627, multiplexer 1507 applies a fair arbitration policy to select from among the partial responses buffered within hold buffers 1506a-1506b. Thus, if the partial response is not selected by the fair arbitration policy, broadcast of the partial response is delayed, as shown at block 1628. Once the partial response is selected by fair arbitration policy, possibly after a delay, multiplexer 1507 outputs the partial response to broadcast logic 1508 and programmable delay 1509. The output bus of multiplexer 1507 will not become overrun by partial responses because the arrival rate of partial responses is limited by the rate of request launch. Following block 1627, the process proceeds to block 1629.

Block 1629 depicts broadcast logic 1508 broadcasting the partial responses selected by multiplexer 1507 to each other processing unit 100 in its processing node 202 via the first tier X, Y and Z links, and multiplexer 1507 performing a local broadcast of the partial response by outputting the partial response to programmable delay 1509. Thereafter, the process bifurcates and proceeds to each of block 1631, which illustrates the continuation of partial response phase processing at the other local hubs 100, and block 1630. As shown at block 1630, the partial response broadcast within the present local hub 100 is delayed by programmable delay 1509 by approximately the transmission latency of a first tier link so that the locally broadcast partial response is received by combining logic 1510 at approximately the same time as the partial response(s) received from other processing units 100 on the inbound X, Y and Z links. As illustrated at block 1640, combining logic 1510 accumulates the locally broadcast partial response with the partial response(s) received from the inbound first tier link and with the locally generated partial response, which is buffered within LH partial response FIFO queue 930.

In order to accumulate the partial responses, combining logic 1510 first reads out the entry 1200 within LH partial response FIFO queue 930 allocated to the operation. The entry is identified by the FIFO ordering observed within LH partial response FIFO queue 930, as indicated by the particular one of pointers 1214, 1215 upon which the partial response was received. Combining logic 1510 then accumulates the locally broadcast partial response of the remote hub 100 with the contents of the partial response field 1202 of the entry 1200 that was read. Next, as shown at blocks 1642, combining logic 1510 further determines by reference to the response flag array 1204 of the entry 1200 whether or not, with the currently received partial response(s), partial responses have been received from each processing unit 100 from which a partial response was expected. If not, the process passes to block 1644, which depicts combining logic 1510 updating the entry 1200 read from LH partial response FIFO queue 930 with the newly accumulated partial response. Thereafter, the process ends at block 1646.

Returning to block 1642, if combining logic 1510 determines that all processing units 100 from which partial responses are expected have reported their partial responses, the process proceeds to block 1650. Block 1650 depicts combining logic 1510 deallocating the entry 1200 allocated to the operation from LH partial response FIFO queue 930 by reference to deallocation pointer 1212, ending tenure 1304. Combining logic 1510 then passes the accumulated partial response to response logic 122 for generation of the combined response, as depicted at block 1652. Thereafter, the process passes through page connector 1654 to FIG. 18A, which illustrates combined response processing at the local hub 100.

Referring now to block 1632, processing of partial response(s) received by a local hub 100 on one or more first tier links begins when the partial response(s) is/are received by combining logic 1510. As shown at block 1634, combining logic 1510 may apply small tuning delays to the partial response(s) received on the inbound first tier links in order to synchronize processing of the partial response(s) with each other and the locally broadcast partial response. Thereafter, the partial response(s) are processed as depicted at block 1640 and following blocks, which have been described.

VIII. Combined Response Phase Structure and Operation

Figure 17:
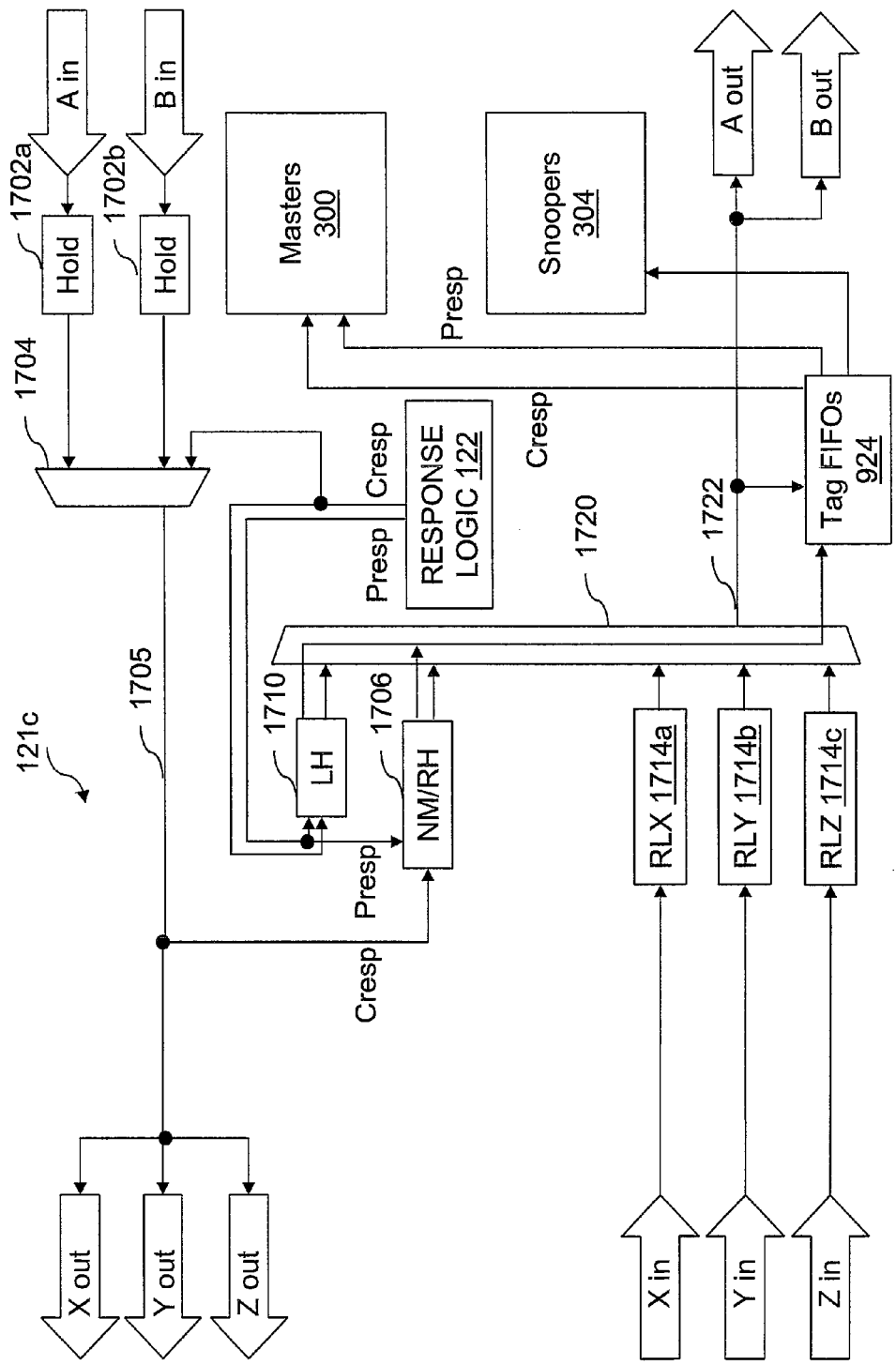
FIG. 17 is a block diagram illustrating a portion of the interconnect logic of FIG. 1 utilized in the combined response phase of an operation.

Referring now to FIG. 17, there is depicted a block diagram of exemplary embodiment of the combined response logic 121c within interconnect logic 120 of FIG. 1 in accordance with the present invention. As shown, combined response logic 121c includes hold buffers 1702a-1702b, which each receives and buffers combined responses from a remote hub 100 coupled to the local hub 100 by a respective one of inbound A and B links. The outputs of hold buffers 1702a-1702b form two inputs of a first multiplexer 1704, which applies a fair arbitration policy to select from among the combined responses, if any, buffered by hold buffers 1702a-1702b for launch onto first bus 1705 within a combined response field 710 or 810 of an information frame.

First multiplexer 1704 has a third input by which combined responses of node-only broadcast operations are presented by response logic 122 for selection and launch onto first bus 1705 within a combined response field 710 or 810 of an information frame in the absence of any combined response in hold buffers 1702a-1702b. Because first multiplexer 1704 always gives precedence to combined responses for system-wide broadcast operations received from remote hubs 100 over locally generated combined responses for node-only broadcast operations, response logic 122 may, under certain operating conditions, have to wait a significant period in order for first multiplexer 1704 to select the combined response it presents. Consequently, in the worst case, response logic 122 must be able to queue a number of combined response and partial response pairs equal to the number of entries in NM tag FIFO queue 924$b2$, which determines the maximum number of node-only broadcast operations that a given processing unit 100 can have in flight at any one time. Even if the combined responses are delayed for a significant period, the observation of the combined response by masters 300 and snoopers 304 will be delayed by the same amount of time. Consequently, delaying launch of the combined response does not risk a violation of the timing constraint set forth above because the time between observation of the combined response by the winning master 300 and observation of the combined response by the owning snooper 304 is not thereby decreased.

First bus 1705 is coupled to each of the outbound X, Y and Z links and a node master/remote hub (NM/RH) buffer 1706. For node-only broadcast operations, NM/RH buffer 1706 buffers a combined response and accumulated partial response (i.e., destination tag) provided by the response logic 122 at this node master 100.

The inbound first tier X, Y and Z links are each coupled to a respective one of remote leaf (RL) buffers 1714$a$-1714$c$. The outputs of NM/RH buffer 1706 and RL buffers 1714$a$-1714$c$ form 4 inputs of a second multiplexer 1720. Second multiplexer 1720 has an additional fifth input coupled to the output of a local hub (LH) hold buffer 1710 that, for a system-wide broadcast operation, buffers a combined response and accumulated partial response (i.e., destination tag) provided by the response logic 122 at this local hub 100. The output of second multiplexer 1720 drives combined responses onto a second bus 1722 to which tag FIFO queues 924 and the outbound second tier links are coupled. As illustrated, tag FIFO queues 924 are further coupled to receive, via an additional channel, an accumulated partial response (i.e., destination tag) buffered in LH hold buffer 1710 or NM/RH buffer 1706. Masters 300 and snoopers 304 are further coupled to tag FIFO queues 924. The connections to tag FIFO queues 924 permits snoopers 304 to observe the combined response and permits the relevant master 300 to receive the combined response and destination tag, if any.

Without the window extension 312$b$ described above, observation of the combined response by the masters 300 and snoopers 304 at substantially the same time could, in some operating scenarios, cause the timing constraint term regarding the combined response latency from the winning master 300 to snooper 304$n$ (i.e., C_lat(WM_S)) to approach zero, violating the timing constraint. However, because window extension 312$b$ has a duration of approximately the first tier link transmission latency, the timing constraint set forth above can be satisfied despite the substantially concurrent observation of the combined response by masters 300 and snoopers 304.

Figure 18A:
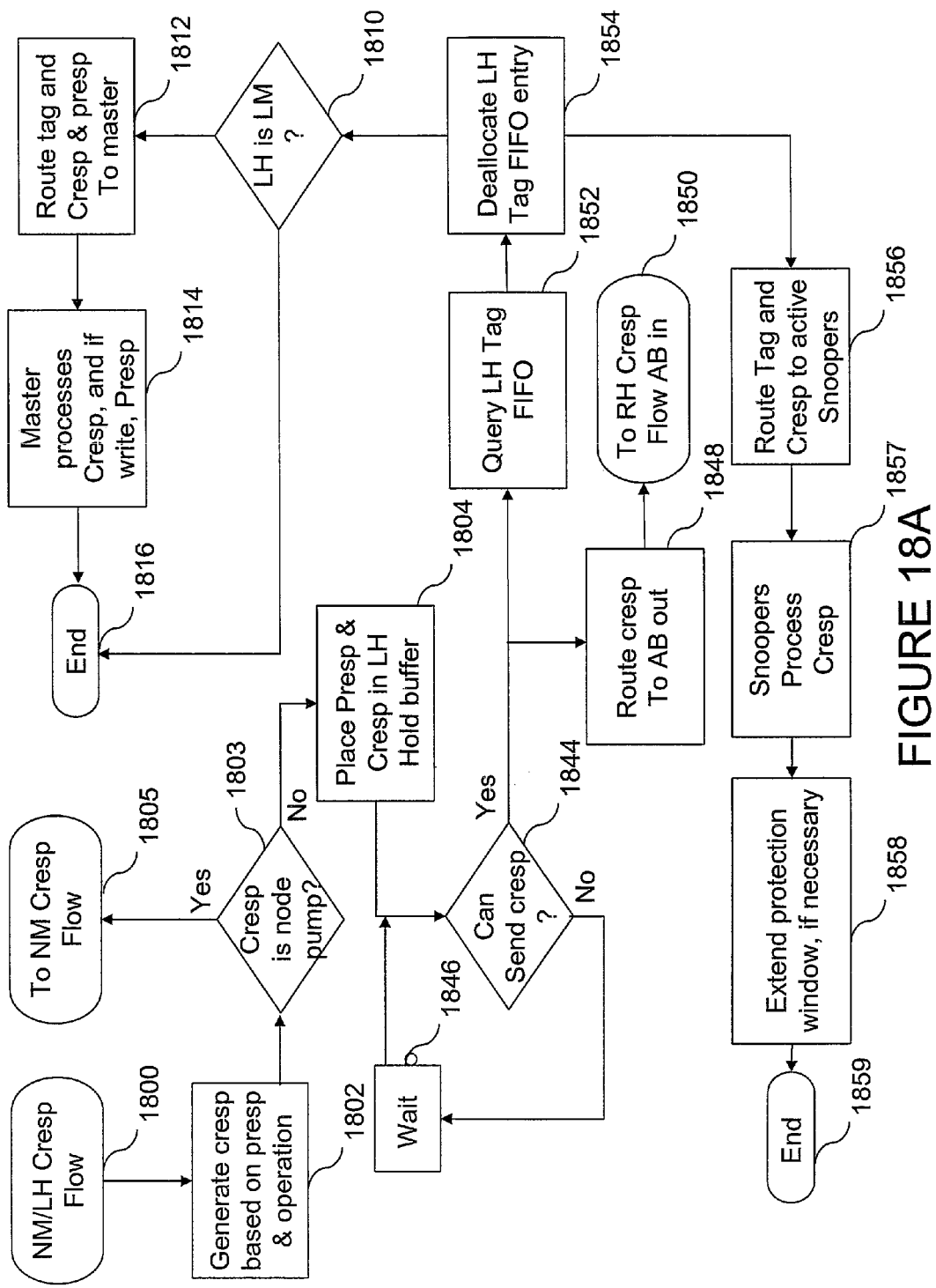
FIGS. 18A-18C are flowcharts respectively depicting the combined response phase of an operation at a local hub, remote hub, and remote leaf.
Figure 18B:
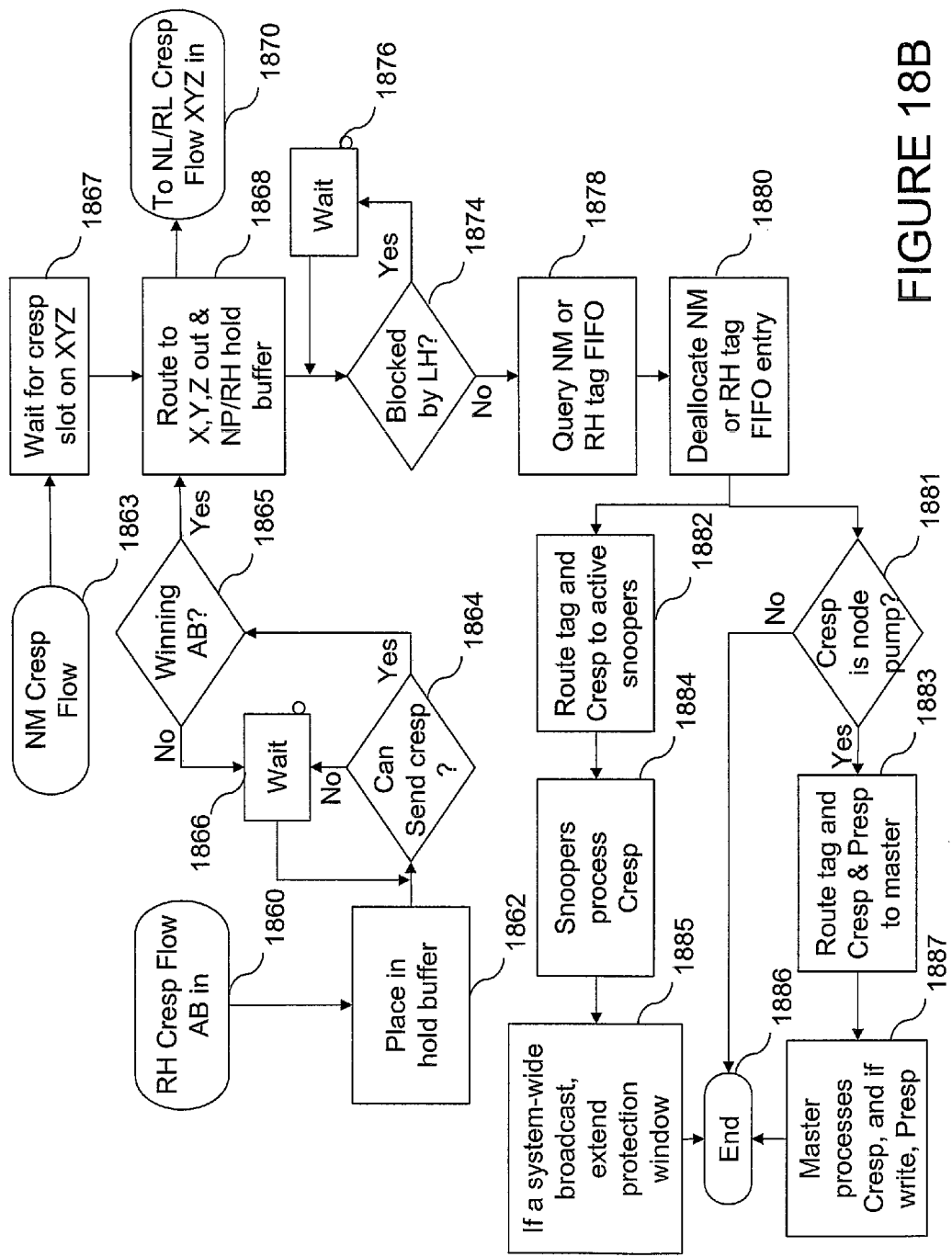
Figure 18C:
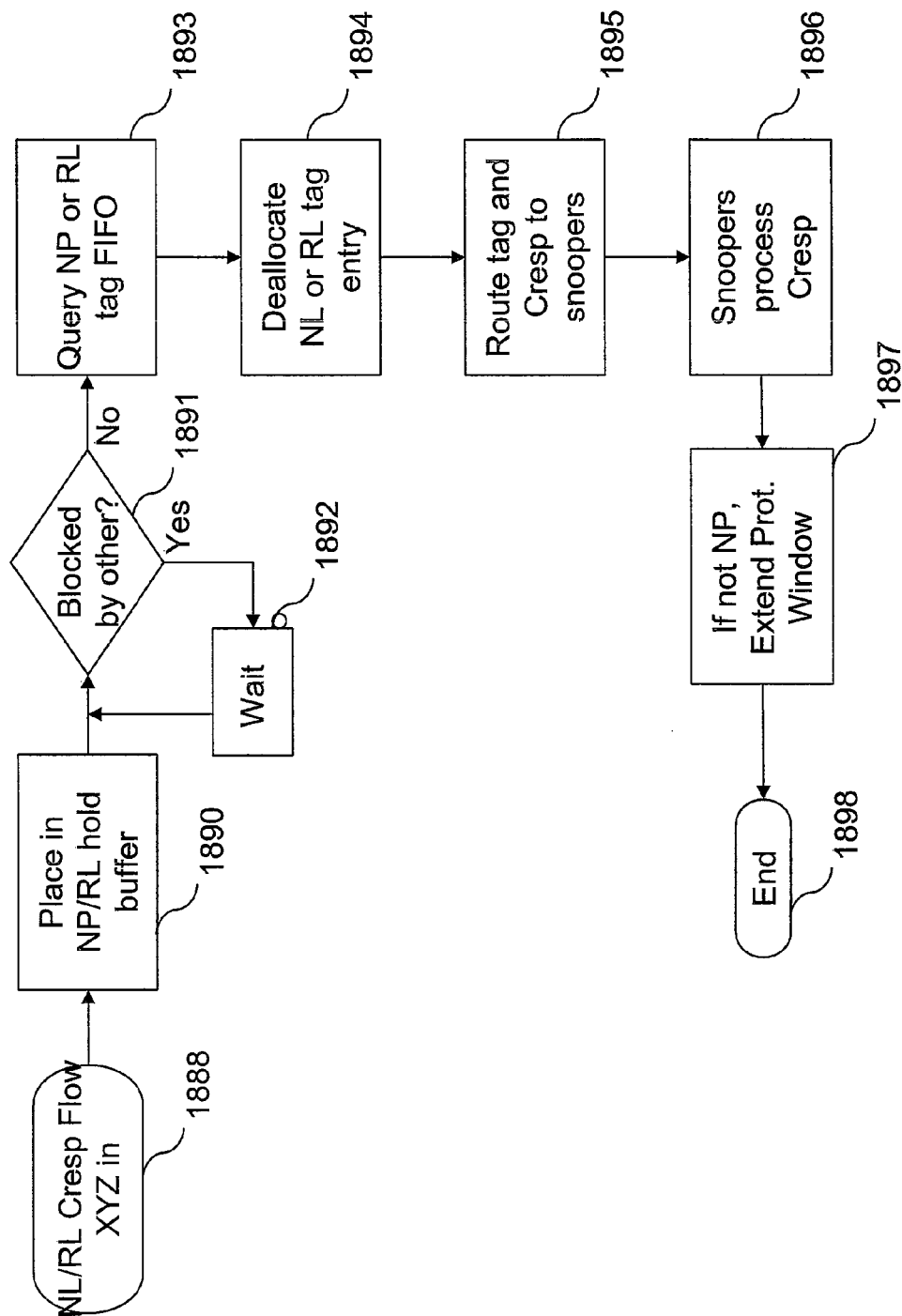

With reference now to FIGS. 18A-18C, there are depicted high level logical flowcharts respectively depicting exemplary combined response phase processing at a local hub (or node master), remote hub (or node master), and remote leaf (or node leaf) in accordance with an exemplary embodiment of the present invention. Referring now specifically to FIG. 18A, combined response phase processing at the local hub (or node master) 100 begins at block 1800 and then proceeds to block 1802, which depicts response logic 122 generating the combined response for an operation based upon the type of request and the accumulated partial response. As indicated at blocks 1803-1805, if the scope indicator 730 or 830 within the combined response 710 or 810 indicates that the operation is a node-only broadcast operation, combined response phase processing at the node master 100 continues at block 1863 of FIG. 18B. However, if the scope indicator 730 or 830 indicates that the operation is a system-wide broadcast operation, response logic 122 of the remote hub 100 places the combined response and the accumulated partial response into LH hold buffer 1710, as shown at block 1804. By virtue of the accumulation of partial responses utilizing an OR operation, for write-type requests, the accumulated partial response will contain a valid field 722 set to '1' to signify the presence of a valid destination tag within the accompanying destination tag field 724. For other types of requests, bit 0 of the accumulated partial response will be set to '0' to indicate that no such destination tag is present.

As depicted at block 1844, second multiplexer 1720 is time-slice aligned with the selected second tier link information allocation and selects a combined response and accumulated partial response from LH hold buffer 1710 for launch only if an address tenure is then available for the combined response in the outbound second tier link information allocation. Thus, for example, second multiplexer 1720 outputs a combined response and accumulated partial response from LH hold buffer 1710 only during cycle 1 or 3 of the embodiment of FIG. 7B or cycle 1 of the embodiment of FIG. 8B. If a negative determination is made at block 1844, the launch of the combined response within LH hold buffer 1710 is delayed, as indicated at block 1846, until a subsequent cycle during which an address tenure is available. If, on the other hand, a positive determination is made at block 1844, second multiplexer 1720 preferentially selects the combined response within LH hold buffer 1710 over its other inputs for launch onto second bus 1722 and subsequent transmission on the outbound second tier links.

It should also be noted that the other ports of second multiplexer 1720 (e.g., RH, RLX, RLY, and RLZ) could also present requests concurrently with LH hold buffer 1710, meaning that the maximum bandwidth of second bus 1722 must equal 10/8 (assuming the embodiment of FIG. 7B) or 5/6 (assuming the embodiment of FIG. 8B) of the bandwidth of the outbound second tier links in order to keep up with maximum arrival rate. It should further be observed that only combined responses buffered within LH hold buffer 1710 are transmitted on the outbound second tier links and are required to be aligned with address tenures within the link information allocation. Because all other combined responses competing for issuance by second multiplexer 1720 target only the local masters 300, snoopers 304 and their respective FIFO queues rather than the outbound second tier links, such combined responses may be issued in the remaining cycles of the information frames. Consequently, regardless of the particular arbitration scheme employed by second multiplexer 1720, all combined responses concurrently presented to second multiplexer 1720 are guaranteed to be transmitted within the latency of a single information frame.

Following the issuance of the combined response on second bus 1722, the process bifurcates and proceeds to each of blocks 1848 and 1852. Block 1848 depicts routing the combined response launched onto second bus 1722 to the outbound second tier links for transmission to the remote hubs 100. Thereafter, the process proceeds through page connector 1850 to FIG. 18C, which depicts an exemplary method of combined response processing at the remote hubs 100.

Referring now to block 1852, the combined response issued on second bus 1722 is also utilized to query LH tag FIFO queue 924a to obtain the master tag from the oldest entry therein. Thereafter, LH tag FIFO queue 924a deallocates the entry allocated to the operation, ending tenure 1302 (block 1854). Following block 1854, the process bifurcates and proceeds to each of blocks 1810 and 1856. At block 1810, LH tag FIFO queue 924a determines whether the master tag indicates that the master 300 that originated the request associated with the combined response resides in this local hub 100. If not, processing in this path ends at block 1816. If, however, the master tag indicates that the originating master 300 resides in the present local hub 100, LH tag FIFO queue 924a routes the master tag, the combined response and the accumulated partial response to the originating master 300 identified by the master tag (block 1812). In response to receipt of the combined response and master tag, the originating master 300 processes the combined response, and if the corresponding request was a write-type request, the accumulated partial response (block 1814).

For example, if the combined response indicates "success" and the corresponding request was a read-type request (e.g., a read, DClaim or RWITM request), the originating master 300 may update or prepare to receive a requested memory block. In this case, the accumulated partial response is discarded. If the combined response indicates "success" and the corresponding request was a write-type request (e.g., a castout, write or partial write request), the originating master 300 extracts the destination tag field 724 from the accumulated partial response and utilizes the contents thereof as the data tag 714 or 814 used to route the subsequent data phase of the operation to its destination, as described below with reference to FIGS. 20A-20C. If a "success" combined response indicates or implies a grant of HPC status for the originating master 300, then the originating master 300 will additionally begin to protect its ownership of the memory block, as depicted at reference numerals 313 and 1314. If, however, the combined response received at block 1814 indicates another outcome, such as "retry", the originating master 300 may be required to reissue the request, perhaps with a different scope (e.g., global rather than local). Thereafter, the process ends at block 1816.

Referring now to block 1856, LH tag FIFO queue 924a also routes the combined response and the associated master tag to the snoopers 304 within the local hub 100. In response to receipt of the combined response, snoopers 304 process the combined response and perform any operation required in response thereto (block 1857). For example, a snooper 304 may source a requested memory block to the originating master 300 of the request, invalidate a cached copy of the requested memory block, etc. If the combined response includes an indication that the snooper 304 is to transfer ownership of the memory block to the requesting master 300, snooper 304 appends to the end of its protection window 312a a programmable-length window extension 312b, which, for the illustrated topology, preferably has a duration of approximately the latency of one chip hop over a first tier link (block 1858). Of course, for other data processing system topologies and different implementations of interconnect logic 120, programmable window extension 312b may be advantageously set to other lengths to compensate for differences in link latencies (e.g., different length cables coupling different processing nodes 202), topological or physical constraints, circuit design constraints, or large variability in the bounded latencies of the various operation phases. Thereafter, combined response phase processing at the local hub 100 ends at block 1859.

Referring now to FIG. 18B, there is depicted a high level logical flowchart of an exemplary method of combined response phase processing at a remote hub (or node master) 100 in accordance with the present invention. As depicted, for combined response phase processing at a remote hub 100, the process begins at page connector 1860 upon receipt of a combined response at a remote hub 100 on one of its inbound A or B links. The combined response is then buffered within the associated one of hold buffers 1702a-1702b, as shown at block 1862. The buffered combined response is then transmitted by first multiplexer 1704 on first bus 1705 as soon as the conditions depicted at blocks 1864 and 1865 are both met. In particular, an address tenure must be available in the first tier link information allocation (block 1864) and the fair allocation policy implemented by first multiplexer 1704 must select the hold buffer 1702a, 1702b in which the combined response is buffered (block 1865).

As shown at block 1864, if either of these conditions is not met, launch of the combined response by first multiplexer 1704 onto first bus 1705 is delayed until the next address tenure. If, however, both conditions illustrated at blocks 1864 and 1865 are met, the process proceeds from block 1865 to block 1868, which illustrates first multiplexer 1704 broadcasting the combined response on first bus 1705 to the outbound X, Y and Z links and NM/RH hold buffer 1706 within a combined response field 710 or 810. As indicated by the connection of the path containing blocks 1863 and 1867 to block 1868, for node-only broadcast operations, first multiplexer 1704 issues the combined response presented by response logic 122 onto first bus 1705 for routing to the outbound X, Y and Z links and NM/RH hold buffer 1706 only if no competing combined responses are presented by hold buffers 1702a-1702b. If any competing combined response is received for a system-wide broadcast operation from a remote hub 100 via one of the inbound second tier links, the locally generated combined response for the node-only broadcast operation is delayed, as shown at block 1867. When first multiplexer 1704 finally selects the locally generated combined response for the node-only broadcast operation, response logic 122 places the associated accumulated partial response directly into NM/RH hold buffer 1706.

Following block 1868, the process bifurcates. A first path passes through page connector 1870 to FIG. 18C, which illustrates an exemplary method of combined response phase processing at the remote leaves (or node leaves) 100. The second path from block 1868 proceeds to block 1874, which illustrates the second multiplexer 1720 determining which of the combined responses presented at its inputs to output onto second bus 1722. As indicated, second multiplexer 1720 prioritizes local hub combined responses over remote hub combined responses, which are in turn prioritized over combined responses buffered in remote leaf buffers 1714a-1714c. Thus, if a local hub combined response is presented for selection by LH hold buffer 1710, the combined response buffered within remote hub buffer 1706 is delayed, as shown at block 1876. If, however, no combined response is presented by LH hold buffer 1710, second multiplexer 1720 issues the combined response from NM/RH buffer 1706 onto second bus 1722.

In response to detecting the combined response on second bus 1722, the particular one of tag FIFO queues 924b0 and 924b1 associated with the second tier link upon which the combined response was received (or for node-only broadcast operations, NM tag FIFO queue 924b2) reads out the master tag specified by the relevant request from the master tag field 1100 of its oldest entry, as depicted at block 1878, and then deallocates the entry, ending tenure 1306 or 1320 (block 1880). The process then bifurcates and proceeds to each of blocks 1882 and 1881. Block 1882 depicts the relevant one of tag FIFO queues 924b routing the combined response and the master tag to the snoopers 304 in the remote hub (or node master) 100. In response to receipt of the combined response, the snoopers 304 process the combined response (block 1884) and perform any required operations, as discussed above. If the operation is a system-wide broadcast operation and if the combined response includes an indication that the snooper 304 is to transfer coherency ownership of the memory block to the requesting master 300, the snooper 304 appends a window extension 312b to its protection window 312a, as shown at block 1885. Thereafter, combined response phase processing at the remote hub 100 ends at block 1886.

Referring now to block 1881, if the scope indicator 730 or 830 within the combined response field 710 or 810 indicates that the operation is not a node-only broadcast operation but is instead a system-wide broadcast operation, no further processing is performed at the remote hub 100, and the process ends at blocks 1886. If, however, the scope indicator 730 or 830 indicates that the operation is a node-only broadcast operation, the process passes to block 1883, which illustrates NM tag FIFO queue 924b2 routing the master tag, the combined response and the accumulated partial response to the originating master 300 identified by the master tag. In response to receipt of the combined response and master tag, the originating master 300 processes the combined response, and if the corresponding request was a write-type request, the accumulated partial response (block 1887).

For example, if the combined response indicates "success" and the corresponding request was a read-type request (e.g., a read, DClaim or RWITM request), the originating master 300 may update or prepare to receive a requested memory block. In this case, the accumulated partial response is discarded. If the combined response indicates "success" and the corresponding request was a write-type request (e.g., a castout, write or partial write request), the originating master 300 extracts the destination tag field 724 from the accumulated partial response and utilizes the contents thereof as the data tag 714 or 814 used to route the subsequent data phase of the operation to its destination, as described below with reference to FIGS. 20A-20C. If a "success" combined response indicates or implies a grant of HPC status for the originating master 300, then the originating master 300 will additionally begin to protect its ownership of the memory block, as depicted at reference numerals 313 and 1314. If, however, the combined response received at block 1814 indicates another outcome, such as "retry", the originating master 300 may be required to reissue the request. Thereafter, the process ends at block 1886.

With reference now to FIG. 18C, there is illustrated a high level logical flowchart of an exemplary method of combined response phase processing at a remote (or node) leaf 100 in accordance with the present invention. As shown, the process begins at page connector 1888 upon receipt of a combined response at the remote (or node) leaf 100 on one of its inbound X, Y and Z links. As indicated at block 1890, the combined response is latched into one of NL/RL hold buffers 1714a-1714c. Next, as depicted at block 1891, the combined response is evaluated by second multiplexer 1720 together with the other combined responses presented to its inputs. As discussed above, second multiplexer 1720 prioritizes local hub combined responses over remote hub combined responses, which are in turn prioritized over combined responses buffered in NL/RL hold buffers 1714a-1714c. Thus, if a local hub or remote hub combined response is presented for selection, the combined response buffered within the NL/RL hold buffer 1714 is delayed, as shown at block 1892. If, however, no higher priority combined response is presented to second multiplexer 1720, second multiplexer 920 issues the combined response from the NL/RL hold buffer 1714 onto second bus 1722.

In response to detecting the combined response on second bus 1722, the particular one of tag FIFO queues 924c0-924c2, 924d0-924d2, and 924e0-924e2 associated with the scope of the operation and the route by which the combined response was received reads out from the master tag field 1100 of its oldest entry the master tag specified by the associated request, as depicted at block 1893. That is, the scope indicator 730 or 830 within the combined response field 710 or 810 is utilized to determine whether the request is of node-only or system-wide scope. For node-only broadcast requests, the particular one of NL tag FIFO queues 924c2, 924d2 and 924e2 associated with the inbound first tier link upon which the combined response was received buffers the master tag. For system-wide broadcast requests, the master tag is retrieved from the particular one of RL tag FIFO queues 924c0-924c1, 924d0-924d1 and 924e0-924e1 corresponding to the combination of inbound first and second tier links upon which the combined response was received.

Once the relevant tag FIFO queue 924 identifies the appropriate entry for the operation, the tag FIFO queue 924 deallocates the entry, ending tenure 1310 or 1324 (block 1894). The combined response and the master tag are further routed to the snoopers 304 in the remote (or node) leaf 100, as shown at block 1895. In response to receipt of the combined response, the snoopers 304 process the combined response (block 1896) and perform any required operations, as discussed above. If the operation is not a node-only operation and if the combined response includes an indication that the snooper 304 is to transfer coherency ownership of the memory block to the requesting master 300, snooper 304 appends to the end of its protection window 312a (also protection window 1312 of FIG. 13) a window extension 312b, as described above and as shown at block 1897. Thereafter, combined response phase processing at the remote leaf 100 ends at block 1898.

IX. Data Phase Structure and Operation

Data logic 121d and its handling of data delivery can be implemented in a variety of ways. In one preferred embodiment, data logic 121d and its operation are implemented as described in detail in co-pending U.S. Patent Application incorporated by reference above.

X. Conclusion

As has been described, the present invention provides an improved processing unit, data processing system and interconnect fabric for a data processing system. The inventive data processing system topology disclosed herein increases in interconnect bandwidth with system scale. In addition, a data processing system employing the topology disclosed herein may also be hot upgraded (i.e., processing nodes may be added during operation), downgraded (i.e., processing nodes may be removed), or repaired without disruption of communication between processing units in the resulting data processing system through the connection, disconnection or repair of individual processing nodes.

The present invention also advantageously supports the concurrent flow of operations of varying scope (e.g., node-only broadcast mode and a system-wide broadcast scope). As will be appreciated, support for operations of less than system-wide scope advantageously conserves bandwidth on the interconnect fabric and enhances overall system performance. Moreover, by throttling the launch of requests in accordance with the servicing rate of snooping devices in the system, snooper retries of operations are advantageously reduced.

While the invention has been particularly shown as described with reference to a preferred embodiment, it will be understood by those skilled in the art that various changes in form and detail may be made therein without departing from the spirit and scope of the invention. For example, although the present invention discloses preferred embodiments in which FIFO queues are utilized to order operation-related tags and partial responses, those skilled in the art will appreciated that other ordered data structures may be employed to maintain an order between the various tags and partial responses of operations in the manner described. In addition, although preferred embodiments of the present invention employ uni-directional communication links, those skilled in the art will understand by reference to the foregoing that bi-directional communication links could alternatively be employed.

What is claimed is:

1. A data processing system, comprising:
   an interconnect fabric;
   a protected resource having a plurality of banks each associated with a respective one of a plurality of address sets;
   a snooper coupled to said interconnect fabric and to said resource that controls access to said resource, wherein a maximum service rate at which said snooper can service requests is less than a maximum request arrival rate supported by the interconnect fabric;
   one or more masters that initiate requests; and
   interconnect logic coupled to said one or more masters and to said interconnect fabric, wherein said interconnect logic regulates a rate of delivery to said snooper via said interconnect fabric of requests that target any one said plurality of banks of said protected resource, wherein said interconnect logic includes a previous request buffer that buffers information regarding one or more previous requests that permits a determination of which of said plurality of banks said one or more previous requests targeted, and wherein said interconnect logic regulates said rate of delivery by reference to said previous request buffer.

2. The data processing system of claim 1, wherein said data processing system includes a processing unit containing said interconnect logic and said one or more masters.

3. The data processing system of claim 1, wherein said data processing system includes a first processing unit containing said one or more masters and a second processing unit coupled to said first processing unit by said interconnect fabric, wherein said second processing unit includes said interconnect logic.

4. The data processing system of claim 1, wherein said previous request buffer includes one or more entries each indicating which if any of said plurality of banks was targeted in a previous address tenure on said interconnect fabric.

5. A processing unit for use in a data processing system including an interconnect fabric and a protected resource having a plurality of banks each associated with a respective one of a plurality of address sets, said processing unit comprising:
   a snooper that controls access to said resource, wherein a maximum service rate at which said snooper can service requests is less than a maximum request arrival rate supported by the interconnect fabric;
   one or more masters that initiate requests; and
   interconnect logic, coupled to said one or more masters and having a connection for the interconnect fabric, that regulates a rate of delivery to said snooper via said interconnect fabric of requests that target any one said plurality of banks of said protected resource, wherein said interconnect logic includes a previous request buffer that buffers information regarding one or more previous requests that permits a determination of which of said plurality of banks said one or more previous requests targeted, and wherein said interconnect logic regulates said rate of delivery by reference to said previous request buffer.

6. The processing unit of claim 5, wherein said interconnect logic regulates a rate of delivery of requests by said one or more masters.

7. The processing unit of claim 5, wherein interconnect logic regulates a rate of delivery of requests received by said processing unit on said interconnect fabric from another processing unit.

8. The processing unit of claim 5, wherein said previous request buffer includes one or more entries each indicating which if any of said plurality of banks was targeted in a previous address tenure on said interconnect fabric.

* * * * *